(12) United States Patent
Adams

(10) Patent No.: US 7,834,883 B2
(45) Date of Patent: Nov. 16, 2010

(54) VIRTUAL DIGITAL IMAGING AND METHOD OF USING THE SAME IN REAL ESTATE

(75) Inventor: Michael Shane Adams, Antioch, TN (US)

(73) Assignee: Total Intellectual Property Protection Services, LLC, Las Vegas, NV (US)

(*) Notice: Subject to any disclaimer, the term of this patent is extended or adjusted under 35 U.S.C. 154(b) by 649 days.

(21) Appl. No.: 11/143,680

(22) Filed: Jun. 3, 2005

(65) Prior Publication Data
US 2005/0273354 A1 Dec. 8, 2005

Related U.S. Application Data

(60) Provisional application No. 60/577,893, filed on Jun. 8, 2004.

(51) Int. Cl.
G09G 5/02 (2006.01)
(52) U.S. Cl. .................. 345/581; 345/582; 345/589; 345/419
(58) Field of Classification Search ........... 345/581, 345/582, 589, 419
See application file for complete search history.

(56) References Cited

U.S. PATENT DOCUMENTS

| | | | | |
|---|---|---|---|---|
| 5,736,977 | A * | 4/1998 | Hughes ................. | 715/716 |
| 6,754,400 | B2 * | 6/2004 | Florin et al. ............ | 382/285 |
| 7,080,096 | B1 * | 7/2006 | Imamura ................ | 707/104.1 |
| 7,430,517 | B1 | 9/2008 | Barton | |
| 2002/0075891 | A1 | 6/2002 | Souissi | |
| 2002/0082965 | A1 | 6/2002 | Loeper | |
| 2002/0091629 | A1 | 7/2002 | Danpour | |
| 2004/0030616 | A1 | 2/2004 | Florance et al. | |
| 2004/0088172 | A1 | 5/2004 | Baglioni | |
| 2004/0098287 | A1 | 5/2004 | Young et al. | |
| 2005/0131657 | A1 * | 6/2005 | Sean Mei ............... | 703/1 |
| 2005/0163356 | A1 * | 7/2005 | Makram-Ebeid et al. | 382/128 |
| 2005/0273458 | A1 * | 12/2005 | Adams .................. | 707/1 |
| 2006/0036513 | A1 * | 2/2006 | Whatley et al. ......... | 705/27 |
| 2007/0234382 | A1 | 10/2007 | Swix et al. | |

OTHER PUBLICATIONS

Demonstration session 1: Route panoramas for city navigation Jiang Yu Zheng, Min Shi, Makoto Kato Nov. 2003 Proceedings of the eleventh ACM international conference on Multimedia Multimedia '03 Publisher: ACM Press.*

The evolution of perspective view in WalkMap Riku Suomela, Kimmo Roimela, Juha Lehikoinen Oct. 2003 Personal and Ubiquitous Computing, vol. 7 Issue 5 Publisher: Springer-Verlag.*

(Continued)

*Primary Examiner*—Javid A Amini
(74) *Attorney, Agent, or Firm*—Andrew P. Lanser

(57) ABSTRACT

The present invention concerns a user-friendly software or internet platform that allows potential buyers and sellers visiting the virtual tour website to manipulate the digital images for virtual decorating purposes. The present invention allows the user to take a pre-existing photo image of a building exterior or an interior and ready it for manipulation. The present invention allows a user to conduct in-depth, prepurchase planning and designing of a home to virtually configure the home to his or her exact desires.

31 Claims, 61 Drawing Sheets

OTHER PUBLICATIONS

QuickTime VR: an image-based approach to virtual environment navigation Shenchang Eric Chen Sep. 1995 Proceedings of the 22nd annual conference on Computer graphics and interactive techniques SIGGRAPH '95 Publisher: ACM Press.*

Modelling urban environments: a guided tour to virtual Sagalassos Marc Pollefeys, Luc Van Gool, Ive Akkermans, Dirk De Becker, Kris Demuynck Nov. 2001 Proceedings of the 2001 conference on Virtual reality, archeology, and cultural heritage VAST '01 Publisher: ACM Press.*

Session 1: Guiding visitors of Web3D worlds through automatically generated tours Luca Chittaro, Roberto Ranon, Lucio Ieronutti Mar. 2003 Proceeding of the eighth international conference on 3D Web technology Web3D '03 Publisher: ACM Press.*

Non-photorealistic virtual environments Allison W. Klein, Wilmot Li, Michael M. Kazhdan, Wagner T. Corrêa, Adam Finkelstein, Thomas A. Funkhouser Jul. 2000 Proceedings of the 27th annual conference on Computer graphics and interactive techniques SIGGRAPH '00 Publisher: ACM Press/Addison-Wesley Publishing Co.*

8-3 Navigation: Easy tour: a new image-based virtual tour system Zhigeng Pan, Xianyong Fang, Jiaoying Shi, Dan Xu Jun. 2004 Proceedings of the 2004 ACM SIGGRAPH international conference on Virtual Reality continuum and its applications in industry VRCAI '04 Publisher: ACM Press.*

Image-based modeling and rendering: Interactive reconstruction of virtual environments from photographs, with application to scene-of-crime analysis Simon Gibson, Toby Howard Oct. 2000 Proceedings of the ACM symposium on Virtual reality software and technology VRST '00 Publisher: ACM Press.*

Interactive augmented reality techniques for construction at a distance of 3D geometry Wayne Piekarski, Bruce H. Thomas May 2003 Proceedings of the workshop on Virtual environments 2003 EGVE '03 Publisher: ACM Press.*

Session 2: environments: Incorporating dynamic real objects into immersive virtual environments Benjamin Lok, Samir Naik, Mary Whitton, Frederick P. Brooks Apr. 2003 Proceedings of the 2003 symposium on Interactive 3D graphics I3D '03 Publisher: ACM Press.*

7-3 Modeling: Semantic modeling project: building vernacular house of southeast China Liu Yong, Xu Congfu, Pan Zhigeng, Pan Yunhe Jun. 2004 Proceedings of the 2004 ACM SIGGRAPH international conference on Virtual Reality continuum and its applications in industry VRCAI '04 Publisher: ACM Press.*

Improving interaction: A visual tool for tracing users' behavior in Virtual Environments Luca Chittaro, Lucio Ieronutti May 2004 Proceedings of the working conference on Advanced visual interfaces AVI '04 Publisher: ACM Press.*

Development consortium: Magic Home: exploiting the duality between the physical and the virtual worlds Dadong Wan Apr. 2000 CHI '00 extended abstracts on Human factors in computing systems CHI '00 Publisher: ACM Press.*

See www.showoff.com dated Feb. 2, 2003, Imagine, pp. 1-4.*

Emarketing Group, Previews2 User Guide, 2003, 78 pages, Sough, Berkshire, England.

* cited by examiner

Edit Tour Option Charges

| ChargeIndex | ChargeAmt | ChargeDescr |
|---|---|---|
| 1 | $10.00 | Extra Photography Disk |
| 2 | $20.00 | Rush - Photography |
| 3 | $30.00 | Rush - Tour Processing |
| 4 | $50.00 | Brochure Template |
| 5 | $30.00 | Voice Description |
| 6 | $50.00 | Floor Plan Inclusion |
| 7 | ($50.00) | Photos Only (Credit) |
| 8 | ($40.00) | Tour Processing Only (Credit) |

Record: 1 of 12

Close frmOptionsEdit : Form

FIG 4

Global Parameters Configuration

| Field | Value |
|---|---|
| Office Name: | VIP Tours |
| Office Address Line 1: | 5717 Murphywood Crossing |
| Office Address Line 2: | |
| City, State, Zip Code: | Antioch, TN, 37013-2374 |
| Office Phone: | 999-888-7777 |
| Office Fax: | 666-555-4444 |
| Office Manager: | Michael Adams |
| Office Support Contact: | Kevin Spaight |
| Office Support Phone: | 817-703-8212 |
| Office VIP Prefix: | BNA |
| Local Sales Tax Rate: | 0.00% |
| Single Tour Price: | $45.00 |
| E-mail Address: | michaelcli@comcast.net |
| E-mail Address: | kspaight@comcast.net |
| Root Address for Tours: | www.VIPToursUS.com\Tours\BNA |
| Root Address for Ads: | www.VIPToursUS.com\Tours\Ads\BNA |
| Location of Tour Photos: | c:\VIPToursUS\Photos\Tours\BNA |
| Location of Personnel Photos: | c:\VIPToursUS\Photos\Personnel\BNA |

[ Save ]  [ Cancel ]

Tour Information Update Form

*Note: dbl-click on TourID co-Photographer to select a new one*

Tour Info Update

| Field | Value | | Field | Value |
|---|---|---|---|---|
| Tour ID: | 100 | | | |
| Date Requested: | 5/25/2004 | | Date Assigned: | 5/26/2004 |
| Photographer: | Pete Pentax | | Date Due: | 5/28/2004 |
| Disk Received by: | Kevin Spaight | | Date Received: | 5/11/2005 |
| Storage Location: | c:\VIPToursUS\Photos\Tours\BNA\2005\000100 | | | |
| URL of Tour: | www.VIPToursUS.com\Tours\BNA\2005\000100 | | | |
| Uploaded by: | Taylor Michael | | Date Uploaded: | 5/11/2005 |
| Customer: | Abigail Agent | | | |
| Date E-Mail Sent: | | | E-Mail Customer | |

Close

Record: ◄ ◄ 4 ► ►► ►* of 7

VIP Pass Purchase

Tour Block Purchase

Date Purchased: 05/11/05

Purchaser: Abigail Agent

VIP Pass Package: RE 100 tours for Mortgage1 Company

Sale Made By: Kevin Spaight

Total Price: $3,200.00

Serial No. Start: dfw-100951M

Serial No. End: dfw-101050M

[View Customer Info] [Process] [Cancel]

Microsoft Excel - VIP-Abigail Agent-05-11-2005.xls

| | A | B | C | D | E | F | G |
|---|---|---|---|---|---|---|---|
| 1 | VIPSerial | DatePurch | Purchaser | RedeemedBy | DateRedeemed | TourID | Seller |
| 2 | DFW-100951M | 11-May-05 | Abigail Agent | | | 0 | Kevin Spaight |
| 3 | DFW-100952M | 11-May-05 | Abigail Agent | | | 0 | Kevin Spaight |
| 4 | DFW-100953M | 11-May-05 | Abigail Agent | | | 0 | Kevin Spaight |
| 5 | DFW-100954M | 11-May-05 | Abigail Agent | | | 0 | Kevin Spaight |
| 6 | DFW-100955M | 11-May-05 | Abigail Agent | | | 0 | Kevin Spaight |
| 7 | DFW-100956M | 11-May-05 | Abigail Agent | | | 0 | Kevin Spaight |
| 8 | DFW-100957M | 11-May-05 | Abigail Agent | | | 0 | Kevin Spaight |
| 9 | DFW-100958M | 11-May-05 | Abigail Agent | | | 0 | Kevin Spaight |
| 10 | DFW-100959M | 11-May-05 | Abigail Agent | | | 0 | Kevin Spaight |
| 11 | DFW-100960M | 11-May-05 | Abigail Agent | | | 0 | Kevin Spaight |
| 12 | DFW-100961M | 11-May-05 | Abigail Agent | | | 0 | Kevin Spaight |
| 13 | DFW-100962M | 11-May-05 | Abigail Agent | | | 0 | Kevin Spaight |
| 14 | DFW-100963M | 11-May-05 | Abigail Agent | | | 0 | Kevin Spaight |
| 15 | DFW-100964M | 11-May-05 | Abigail Agent | | | 0 | Kevin Spaight |
| 16 | DFW-100965M | 11-May-05 | Abigail Agent | | | 0 | Kevin Spaight |

Property Tour Information

Tour ID: 93  
Date Requested: 5/24/2004

Request Information:
- Customer Name: Abigail Agent
- Property: 5309 bright star trail, arlington, TX 76017
- Contact Name: Kevin Spaight
- Access Method: Owner Provides Access
- Property Price: $150,000
- School District: arlington
- Square Footage: 1,700
- Bedrooms: 3    Bathrooms - Full: 2    - Half: 0
- Subdivision: indian oaks
- Photographer Name: Harry Nikon
- Notes To Photog: notes to photog

- Date Email Sent: 10/26/2004
- Contact Phone: 817-478-2242    Alt. Phone: 817-703-8212
- Mapsco: kjlljkjl
- MLS No: 987654
- Property Status: For Sale    ☑ Detached?
- Garage: 2 - car
- School District: arlington
- Date Assigned: 10/26/2004    Date Due: 10/27/2004

Image Information:
- Date Received:
- Date Uploaded: 5/11/2005
- Storage Location: c:\VIPToursUS\Photos\Tours\BNA\2005\000093
- URL Tour: www.VIPToursUS.com\Tours\BNA\2005\000093

- Received By:
- Uploaded By: Kevin Spaight

Advertisement Information:
- Agent:
- Agency:
- Mortgage Company: #Error
- Insurance Company: #Error
- "Other":
- "Other":
- Paint Company:
- Furniture Company:
- "Other":

- Banner: www.VIPToursUS.com\Tours\Ads\BNA\jnichols938
- Banner: www.VIPToursUS.com\Tours\Ads\BNA\itybit560R
- Banner: www.VIPToursUS.com\Tours\Ads\BNA\mortgge965M
- Banner: www.VIPToursUS.com\Tours\Ads\BNA\dewcyche5631
- Banner: www.VIPToursUS.com\Tours\Ads\BNA\fadedgem937P
- Banner: www.VIPToursUS.com\Tours\Ads\BNA\expensiv843F
- Button: www.VIPToursUS.com\Tours\Ads\BNA\expensiv843P
- Button: www.VIPToursUS.com\Tours\Ads\BNA\ickypain179P
- Button: www.VIPToursUS.com\Tours\Ads\BNA\unopensi916P

Other Information:
- Date CD Sent to Agent:
- Date Photographer Paid:
- Date Sales Rep Paid:
- Date Status Changed:
- Days on Tour:
- Date Tour Removed:

Invoice Information:
- Invoice No.: BNA20040524002
- Invoice Date: 10/25/2004
- Date Tour Paid:

Tour Base Price: $0.00  
VIP Pass Applied: BNA-I00001P

Optional Charges:
| | | Charge |
|---|---|---|
| ☑ Extra Disk | Charge: | $10.00 |
| ☐ Rush Photography | Charge: | $0.00 |
| ☑ Rush Tour Processing | Charge: | $30.00 |
| ☐ Brochure Template | Charge: | $0.00 |
| ☑ Voice Description | Charge: | $30.00 |
| ☑ Floor Plan Inclusion | Charge: | $0.00 |
| 4 Rooms/4 Looks Each | | $800.00 |
| Total Cost: | | $870.00 |

Partial Packages:
- ☐ Photos Only    Credit: $0.00
- ☐ Tour Processing Only    Credit: $0.00

Tour Notes:

Customer Information

Abigail Agent

Contact Info | Billing Info | Pref. Partners

- Last Name: Agent
- Company: Mortgage1
- Branch: American Mortgage Conglomerate
- Affiliation:
- Address: 123 pleasant avenue
- City, State, Zip: Arlington  TX  76016-
- Home Phone: (999) 888-7777
- Cell Phone: (777) 666-5555
- Fax: (555) 444-3333
- Primary E-mail: kspaight@comcast.net
- Secondary E-mail: abigail_agent@hotmail.com
- Website:
- Notes:

- First Name: Abigail
- Mortgage Company

- Business Phone: (888) 777-6666
- Pager: (666) 555-4444

- Customer ID: 1
- HTUS Login ID: aagent597
- Start Date: 1/1/2004
- End Date:

○ Residential  ○ Commercial  ○ Both

Contact Preference
- ○ Home Phone    ○ Business Phone
- ○ Cell Phone    ○ Pager
- ○ Fax           ● E-mail Sales Associate: Taylor Michael Delong Record: 1 of 3

Real Estate Agencies

Bighonkin Realty

Agency Info | Billing Info | VIP Packages

VIP Package Pricing

| PkgName | Description | Tours | Pkg Price |
|---|---|---|---|
| BIGHN025 | RE 25 tours for Bighonkin Realty | 25 | $950.00 |
| BIGHN100 | RE 100 tours for Bighonkin Realty | 100 | $3,200.00 |
| BIGHN175 | RE 175 tours for Bighonkin Realty | 175 | $4,800.00 |
| BIGHN250 | RE 250 tours for Bighonkin Realty | 250 | $5,500.00 |
| * | | 0 | $0.00 |

Record: 1 of 3

Close

Enter Branch Information

Enter Branch Information

Bighonkin North

Branch Info | Billing Info

- Contact Last: Hughes  First: Howard
- Address 1: 2316 Park Ridge
- Address 2: Accounting Dept.
- City, State, Zip: Nashville  TN  37019-
- Contact Phone: 615-999
- Email: 8887
- Tax ID #: 123456789

Close

Record: |◀|◀| 1 |▶|▶|*| of 8

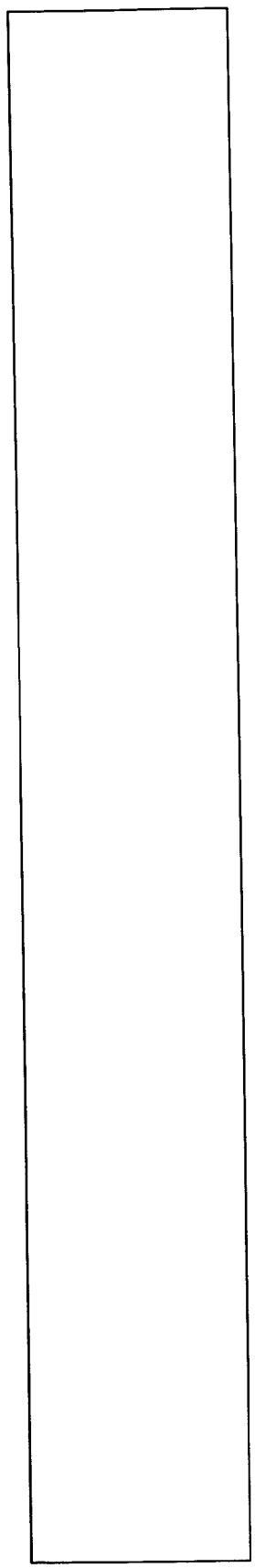
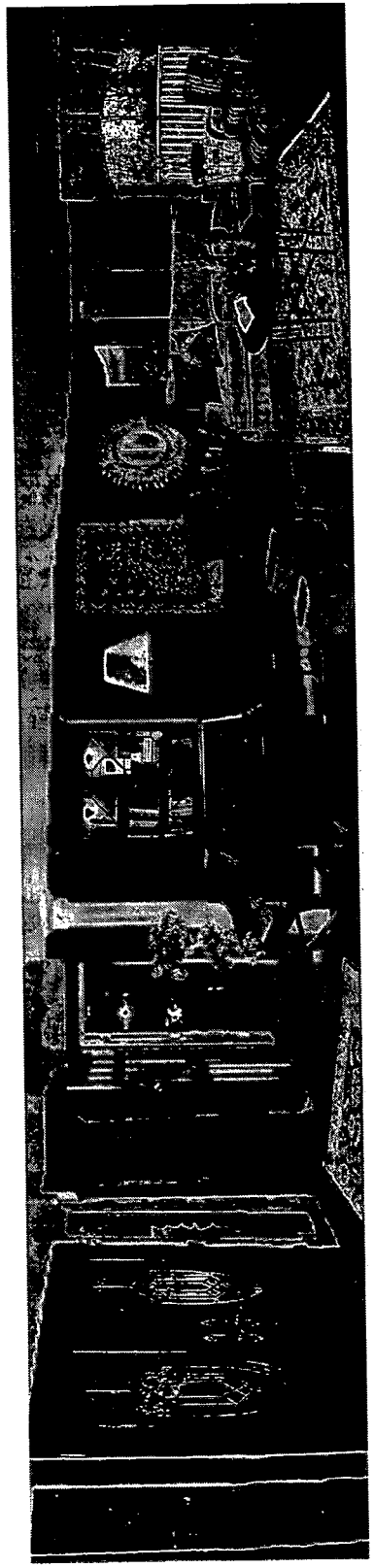
FIG 45

FIG 64

VIRTUAL DIGITAL IMAGING AND METHOD OF USING THE SAME IN REAL ESTATE

CROSS REFERENCE TO RELATED APPLICATIONS

This patent application is related to and claims the benefit and priority of a previously filed provisional patent application entitled "Virtual Digital Imaging and Method of Using the Same in Real Estate," filed on Jun. 8, 2004, and assigned Ser. No. 60/577,893. The provisional patent application is incorporated herein by reference.

This patent application also incorporates by reference another co-pending utility patent application, U.S. patent application Ser. No. 11/143,679, filed Jun. 3, 2005, entitled "Virtual Digital Imaging and Method of Using the Same in Real Estate," which also claims benefit of and priority to the previously filed provisional patent application entitled "Virtual Digital Imaging and Method of Using the Same in Real Estate," filed on Jun. 8, 2004, and assigned Ser. No. 60/577, 893.

BACKGROUND OF INVENTION

The real estate industry has continued to thrive since the late 1990's. With favorable interest rates and market conditions, the real estate industry has continued to strengthen. Record numbers of personal and commercial real estate properties are being bought and sold each year. The present invention concerns all types of personal and commercial real estate.

As indicated by the 2000 United States census, approximately 66% of total households in the United States are single family homes. Some sources indicate that approximately 25-35% of these homes go on sale annually. Currently, increasing numbers of these homes are being listed on the Internet as "virtual tours". Furthermore, more and more commercial real estate properties use virtual tours. Virtual tours will continue to increase in popularity.

Traditionally, a seller of real estate retains a real estate agent to help sell the property. In the United States, the real estate agent advertises the property and is paid a percentage of the final sale price of the home upon sale. The most predominant advertising service in the United States is known as the "MLS" or the Multiple Listing Service. Real estate agents and buyers examine MLS listings to see what is available on the market. After narrowing their choices, actual home visits are arranged. The time consuming nature of actual visits limit the number of potential houses that can be viewed by a potential buyer.

With the widespread use of the Internet, more and more home owners are advertising on the Internet. Recently, Internet advertising has developed more sophisticated features. Unlike traditional MLS listings, which featured only one still image of the home, Internet advertising allows multiple photo images of the real estate property on sale. Additionally, some listings enable the potential buyer to take "virtual tours" of the property through multiple photos, panoramic images, and 360 degree images of the homes. Virtual tours give the potential buyer a better sense of the property without having spent the time required to actually visit individual homes. The buyer virtually sees and visits the real estate property at the comfort of his or her computer.

A typical real estate transaction involves numerous parties, including buyers and sellers, real estate brokers and agents, lenders and mortgage brokers, insurance companies and agents, home inspectors, settlement attorneys, title companies, and vendors of all kind. These real estate related businesses have also grown with the real estate market.

SUMMARY OF INVENTION

The present invention concerns virtual tours for use in the real estate industry, whether commercial, residential or otherwise. Virtual tours increase the visual impact of the property being sold. Virtual tours showcase the real estate property directly to potential buyers who sits at comfort of their computer. Because of the increased ease of viewing a property virtually, more potential buyers view the property, and in turn, increased viewing traffic increases the likelihood of sale.

The present invention concerns an all-inclusive Virtual Tour website that features virtual tours of real estate properties. The present invention further concerns methods for allowing real estate related businesses to advertise on the website while complying with applicable guidelines. The present invention further allows various product and service vendors to advertise on the website. The present invention also provides information about various neighborhoods, civic, and other important information to potential home buyers. The present invention also contemplates lead generation services, such as generating loan application information, which may then be provided to lending institutions for bidding or sale. The present inventor also concerns related software, business methods, and Internet websites, platforms or other portals. The present invention may be referred to herein as VIP Tour and/or Virtual Tour, among other names.

Furthermore, the present invention also allows potential buyers to modify the digital images of the property featured on the virtual tours. Potential buyers will be able to change room colors and add or remove items such as carpet, texture, and moldings while maintaining the realistic feel of the property. The software and business methods are referred to herein as Virtual Colorization.

Moreover, the present invention contemplates an interactive virtual tour, where the digital images may be modified to suit the viewer's choices, including furniture, adding or removing fixtures, landscaping, and much more. The present invention allows potential buyers to easily add or remove such items to suit the potential buyer's tastes and to design the home as the buyer wishes. These inventions, which concern methods, software, and the business methods, may be referred to herein as Virtual Décor.

The Virtual Décor tour may provide a ready database of images that the end user may insert into the digital image of the property in the VIP Tour using the Virtual Décor software. The present invention allows for these modifications of photo images while maintaining the realistic look of the digital image while preserving the realistic look of the images. Whereas currently available technology may allow for such insertions or edits to be made to photo images, they are difficult to implement and are not practicably available to an average computer user.

In one embodiment, the end users may work with Virtual Décor and Virtual Colorization without having special software other than the usual software present on an average computer system. In another embodiment, the end user may download software, either through the Internet or other means, onto the user's computer to facilitate using the Virtual Décor and Virtual Colorization.

The present invention also provides information regarding and allows transaction with various real-estate related goods and services, such as paint companies, furniture companies, or landscaping companies to the potential real estate buyers (end users). In addition, the present invention contemplates allowing manufacturers or sellers of good such as furniture to advertise on the platform. Additionally, furniture items available from the manufacturer may be selected and inserted into the photo image of the property being viewed. For example, a link to a furniture manufacturer may showcase furniture items to be added to the image of the photo image of a room. By clicking on the furniture maker's name, a list of available items, optionally categorized according to types and prices, may be available. Furniture may be purchased directly from the sellers or through the platform contemplated in the invention. A link may be provided to the manufacturer's website directly, wherein the user will be able to order featured products and goods. In other embodiments, the real-estate platform of the present invention will allow ordering process to occur directly within the platform.

Additionally, the present invention also contemplates that the webpage displaying the featured home display useful information regarding the property, optionally including but not limited to civic information, neighborhood demographic information, comparable sale values of homes in the neighborhood, property ownership history and recorded information, tax records, information about nearby restaurants and shops, and any related promotional information, with or without hyperlinks.

Furthermore, the present invention concerns a method of allowing various parties involved in the real estate transactions such as mortgage brokers and insurance brokers to come together in a platform to facilitate the real estate transaction while complying with the applicable regulatory guidelines. The Virtual Tour advertising platform contemplated in the present invention is preferably independently owned and not owned by parties involved in the real estate transaction, i.e., real estate brokers or agents. Sellers and their agents may advertise their real estate as virtual tours by contracting with the independently owned advertising platform or by purchasing virtual tour packages.

The independent advertising platform of the present invention allows real estate agents to list preferred third-party service providers, such as mortgage brokers, insurance brokers, title companies, and settlement agents without violating real estate regulations that prohibit certain kick-backs. Although real estate agents are allowed to select certain number of preferred third-party service providers, the platform randomizes the frequency with which the preferred providers will appear with a property being advertised. This avoids violating any regulations that prohibit kick-backs since payment is made directly to the advertising platform and is not tied to leads.

The independent advertising platform may optionally generate leads for mortgage companies. For example, an end user may apply for a mortgage directly on the Virtual Tour website and receive a quote. For example, an end user may input application information to apply for a mortgage. The end user may optionally agree to allow the application information to be sent to additional mortgage service providers. Thus, for example, after 15 days, the independent advertising platform may sell the application information or leads to other mortgage lenders. The various mortgage lenders may then bid on the application or may directly contact the end user. These leads, which may be sold, preferably have no correlation to actual consummation of loans, and therefore are within the applicable guidelines.

In optional embodiments, the end user's credit or application information may be used for generating leads for other financial service providers. For example, the end user's application (preferably with the end user's consent) may be used to generate leads for credit card companies. In additional embodiments, the end user's financial information, credit information or application information may be used by a product retailer, such as a furniture company, to pre-approve a credit line for the end user.

As an additional embodiment, the present invention tracks rates at which various vendors, such as mortgage brokers, insurance brokers, title companies, and settlement agents, are selected from the website advertisement. Furthermore, the present invention also optionally allows the end user to apply for a loan directly (or insurance or other services) on the website. The virtual tour platform may in return take the application information and solicits bids from various lenders. The lenders may compensate the virtual tour platform in a variety of way while staying within the guidelines.

The present invention also concerns business methods involving present invention discussed herein. The present invention also contemplates software programs concerning said present invention.

Preferred embodiments are discussed below. As the present invention may be embodied in several forms without departing from the spirit or essential characteristics thereof, it should also be understood that the description contained herein is not limited by the details of the foregoing description, unless otherwise stated. The present invention should be construed within its spirit and scope, and therefore all changes and modifications that fall within the meets and bounds of the claims, or equivalences of such meets and bounds are therefore intended to be embraced by the invention.

BRIEF DESCRIPTION OF THE DRAWINGS

A preferred embodiment of the present invention has been depicted for illustrative purposes wherein:

FIG. 4 is an Edit Tour Options Charges menu, which shows the pricing of tour items and which is selected from the Maintenance menu of FIG. 3.

FIG. 5 is a Global Parameters Configuration menu, which inserts internal employee information and which is selected from the Maintenance menu of FIG. 3.

FIG. 8 is a Tour Request menu, which is selected from the Tour Information menu of FIG. 7 and which concern Property information.

FIG. 9 is a Tour Request menu, which is selected from the Tour Information menu of FIG. 7 and which concerns Tour Options information.

FIG. 10 is a Tour Request menu, which is selected from the Tour Information menu of FIG. 7 and which concerns Banners information.

FIG. 11 is a Tour Request menu, which is selected from the Tour Information menu of FIG. 7 and which concerns Buttons information.

FIG. 12 is a Tour Info Update menu, which is selected from the Tour Information menu of FIG. 7.

FIG. 14 is a Photographer Assignment menu, which is selected from the Tour Information menu of FIG. 7 and which is used to assign a photographer for the Virtual Tour request.

FIG. 15 is a Tour Block Purchase menu, which is selected from the Tour Information menu of FIG. 7 and which is used for purchasing a block of Virtual Tours.

FIG. 17 is an example of an Excel spreadsheet used by the Virtual Tour to track a variety of information about Virtual Tour activity.

FIG. 19 is a sheet report of information concerning Virtual Tour.

FIG. 20 is a VIP Tour Invoice.

FIG. 22 is a Contact Info menu selected from the Customer Information menu of FIG. 21.

FIG. 23 is the Billing Info menu, which is selected from the Customer Information menu of FIG. 21.

FIG. 24 is Preferred Partner menu, which is selected from the Customer Information menu of FIG. 21 and which is used by the real estate agents to choose preferred mortgage and insurance agents or companies.

FIG. 26 is an Agency Info menu, which is selected from the Agency Info menu of FIG. 25.

FIG. 27 is a Billing Info menu, which is selected from the Agency Info menu of FIG. 25.

FIG. 28 is a VIP Packages menu, which is selected from the Agency Info menu of FIG. 25.

FIG. 30 is a Branch Info menu for real estate branches and regional offices, which is selected from the Branch Info menu of FIG. 6.

FIG. 31 is a Billing Info menu for real estate branches and regional offices, which is selected from the Branch Info menu of FIG. 6.

FIG. 33 is a Contact Info menu of the Personnel Info menu, which is selected from the menu of FIG. 32.

FIG. 35 is a Photographer Information menu, which is selected from the menu of FIG. 32.

FIG. 45 shows the chair in FIG. 44 having been placed in its desired location within the image in the desired position.

FIG. 64 is another example of a Virtual Tour webpage showing an interior view of a house and having the Virtual Colorization and Virtual Décor capabilities.

DETAILED DESCRIPTION

Figure 1:
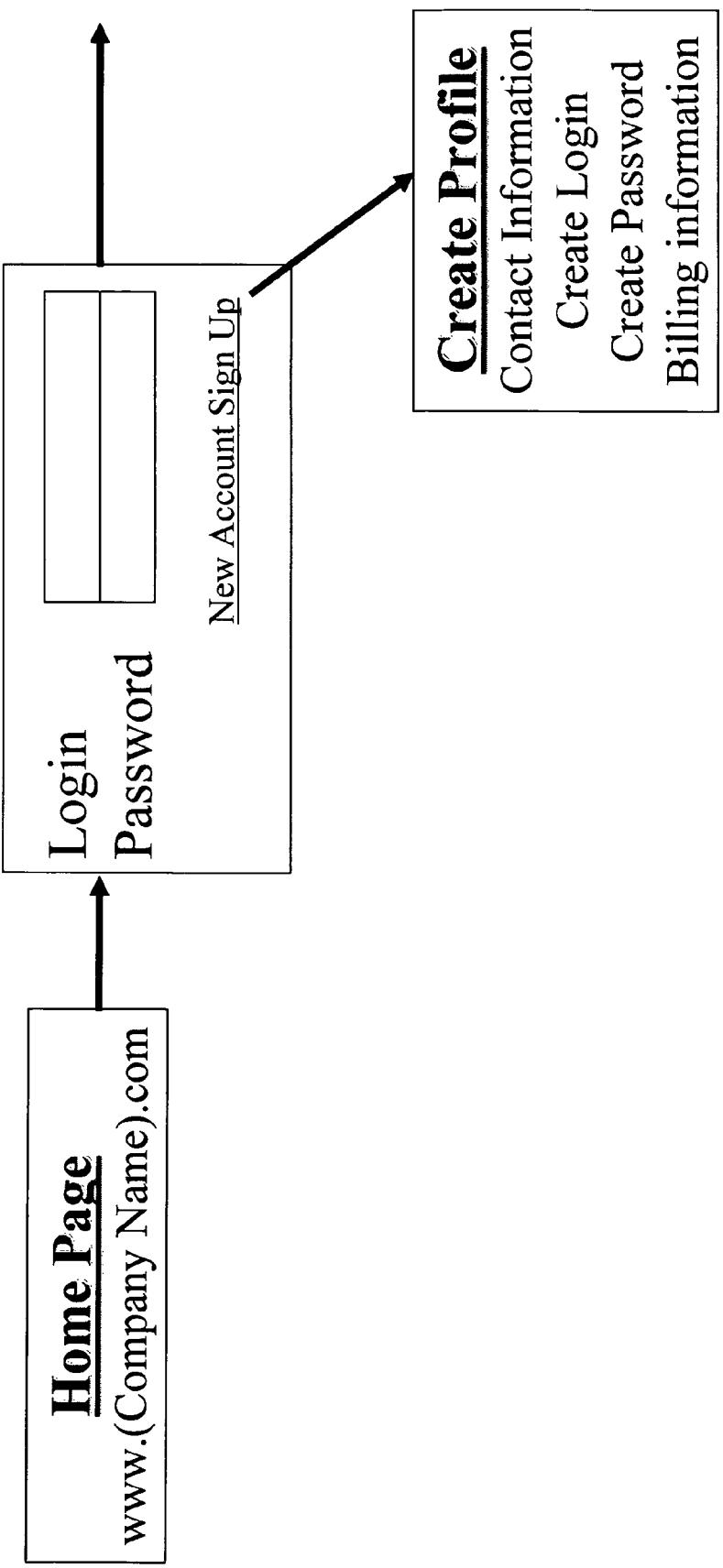
FIG. 1 is a login menu of the Virtual Tour.

Independently Owned Advertising Platform that Complies with Applicable Regulations Certain regulations that govern the real estate industry make it unlawful for a person to give or receive any fees, kickbacks or a thing of value incident to or as part of a settlement service involving federally related mortgage loans for referrals. See e.g., HUD's Regulations X, Sec. 3500.14, Section 8 of RESPA (12 U.S.C. 2607) ("anti kickback law"). Thus, a real estate agent cannot receive a 'kickback' for referral of settlement services where the real estate agent does not do work reasonably related for the compensation received. There are some loan origination programs that offer real estate agents incentives for little or no work, which often can be illegal under the applicable rules. The applicable law's aim is to prohibit fees that would drive up the cost for the consumers. Mortgage lenders may not give real estate agents, and the agents may not receive fees or a thing of value for referrals where the compensation is not reasonably related to actual work.

But in the real estate industry, real estate agents and mortgage brokers often work closely together in transactions and develop lasting relationships. Because the applicable rules make it illegal for real estate agents to receive referral fees or kickbacks under most situations when there is little or no work rendered by the realtor, a real estate agent must be very careful to abide by the regulations. Because of the criminal and regulatory nature of such prohibitions, it becomes important that real estate agents comply scrupulously with the law.

One such example of a prohibited transaction is a situation where a mortgage lender or broker advertises on the website of a real estate broker. For example, next to the property listings, the real estate broker advertises the services of a mortgage lender or broker. The mortgage lender must make payments to the real estate broker for the advertisement fee, and the payments must be reasonable and commensurate with the value of the advertisement. But if the mortgage lender makes payments only when there is a "referral" that results in business for the mortgage lender, such an arrangement may be found to violate the anti kickback laws.

To avoid any appearance of impropriety, there is a need in the industry for an independently owned advertising platform, where payments by advertisers are paid directly to an independent advertising platform. Furthermore, the advertisement fees must not be a disguised form of referral payments.

Furthermore, there are certain restrictions governing real estate broker owning a mortgage company. For example, although realtors can be mortgage brokers, they may have to be in real estate sales for a term of two years. Also, although some mortgage brokers work at a real estate agency office to help expedite the mortgage loans, under such circumstances, they are not allowed to work also as a selling realtor.

Thus, there is a need in the industry for an independent advertising platform that complies with the applicable regulations and allows realtors, associated service providers, other participants and vendors to interact in a single platform to buy and sell real estate while advertising the associated services and products.

The present invention concerns a method of allowing buyers, seller and real-estate service providers, including mortgage lenders and brokers, insurance brokers and agents, title insurance companies, settlement companies and others, to come together in an independent platform, such as a Virtual Tour or VIP Tour of the present invention, wherein advertisement fees are paid directly to the independent platform by the service providers in consideration for listing and advertising their services. The independent platform does not tie the advertisement fees in any way to the amount of leads generated, and the fees are reasonable and commensurate with the type of advertisement to conform to the applicable regulations.

The advantage of the Virtual Tour of the present invention is that it allows service providers, such as mortgage companies, to pay advertising fees to an independent third party. Because the realtor does not receive any fees or a thing of value from the mortgage company, it complies with the applicable regulations and does not create even the appearance of impropriety. The independent platform charges the real estate agents a fee for featuring their property and for providing a virtual tour for the public. In addition, mortgage companies that subscribe to be listed also pay the independent platform. The mortgage broker is not in any way paying the realtor by advertising on the independent platform.

Example of Randomly Selecting Mortgage and Insurance Companies for Advertising on the Virtual Tour Described below is a detailed description of a preferred embodiment, wherein the realtor selects preferred mortgage brokers for advertising alongside the featured property. This embodiment described the method used to generate a random selection of service providers to conform within regulation requirements. Although this embodiment is described concerning mortgage companies and insurance companies, this invention may also be applied with other real-estate related services or products.

After a real estate agent signs and contracts with the independent Virtual Tour platform, the agent selects a number of preferred mortgage brokers that he or she prefers to be featured on the Virtual Tour showcasing the agent's real estate property. Due to the close working relationship with lenders, a real estate agent may wish that certain brokers be used. To avoid even the appearance of impropriety, however, the Virtual Tour does not give the real estate agent direct control over which brokers are actually listed with the Virtual Tour. The Virtual Tour randomizes the selection process and receives advertisement payments from the real estate agent as well as the service providers. The Virtual Tour platform of the present invention is independently owned, and not owned by the real estate agent or agency or the mortgage brokers.

In one example, the real estate agent preferably selects a fixed number of mortgage brokers and insurance agents. Each listing agent has the option of changing his or her preferred mortgage brokers, which may then be added to the pool for random selection. Once the listing agent selects his or her preferred service providers, the advertising platform checks the service providers' qualification. Assuming that the service providers are qualified to conduct business in the state, for example, they are added to a pool of additional randomly selected service providers.

Mortgage companies are then randomly picked from such a pool and featured on the Virtual Tour webpage that showcase the listed property. Service providers, such as mortgage brokers, may also have banners that link the Virtual Tour directly to the mortgage broker's website. The potential buyer will be able to select a mortgage broker directly from the Virtual Tour website. The Virtual Tour may also display the real estate agent's and the agency's banner on the Virtual Tour webpage. Potential buyers may click on these banners to visit the agent's or the agency's websites directly.

In the random selection process, a hit probability factor may first be determined. This preset factor tells the real estate agent the probability that one of its preferred brokers will be featured on the page advertising the listed home for sale. For example, the probability of a pre-selected mortgage company being featured with the advertised home may be represented by a number "N", which represents a one-in-N probability. Thus, where the probability N is set at 5, there is a 1 in 5 or a 20% probability that one of the pre-selected companies may be featured in the virtual tour. This is by way of an example only and the probability can be adjusted, for example so as to meet the standards of the applicable regulations.

Using the total number of available mortgage companies in the state of interest (optionally chosen from subscribing mortgage companies, including pre-selected and unselected companies), the number of additional mortgage companies that are needed to generate the predetermined rate of pre-selected companies appearing is calculated. For example, if N is set at 5 and there is one in five or a 20% chance of the pre-selected companies appearing, then with a pre-selection of 3 companies, an additional 12 mortgage companies are added to the list. And from this list of a total of 15 mortgage companies, the chances of any of the three pre-selected companies being selected at random is 1 in 5 (N).

The 15 different mortgage companies are then picked at random by the independent advertising platform. For example, a number is assigned to each of the 15 mortgage brokers, and numbers may be picked at random, and the corresponding mortgage brokers are then displayed with the virtual tours. Thus, if three mortgage broker advertisements are included within the webpage advertisement for the sale property, there is a one in five chance that one of the three pre-selected mortgage providers may be picked. There is a chance that all three of the pre-selected mortgage providers may be listed, and there is also a chance that none of the pre-selected mortgage providers may be listed. These probabilities may be adjusted to increase the likelihood of a pre-selected mortgage broker being listed in the advertisement. Any adjustments may be made, for example so that the applicable regulations prohibiting 'kickbacks' are not violated.

Also, the total number of mortgage company banners appearing with the virtual tours can also be adjusted, which may increase or decrease the likelihood of a pre-selected service provider appearing. In the example described above for example, the total number of mortgage broker banners appearing may be increased to five and thus further affect the chances of a pre-selected broker appearing within the advertisement.

Optionally, the selection process may be automated to vary from time to time. For example, every time a user accesses the webpage featuring the advertised property, the mortgage brokers listed may change. In other embodiments, changes may be made on an hourly, daily or weekly basis. Thus, the pre-selected mortgage broker will have an increased chance of minimal appearance during the advertisement period.

Similarly, additional service providers, including but not limited to insurance companies, title companies, home inspectors, closing agents, and other, can also be randomly selected. As described, a real estate agent can pre-select a set number of insurance companies. By adding additional qualified unselected insurance companies to this list, featured companies are picked at random to be displayed with the virtual tour. Again, randomly selected insurance agents may have a preset probability rate of appearing in the listed property page.

In this manner, there is a double guarantee that the applicable 'anti-kick back' rules are being followed. First, as described, the various advertisers, whether real estate agents or other service providers, pay the independent platform directly for their advertisements. These payments are not related or contingent on a referral being made. Second, the various service providers such as mortgage brokers and insurance agents are picked from a randomized list that provides only a set probability of the pre-selected provider being listed.

This does not mean, however, that the virtual tour platform may not have a specific vendor that may always be present on a virtual tour. For example, the independent virtual tour platform may have an advertisement agreement with one or more specific companies to feature their product or services at all times. Again, advertisement fees for such exclusive listings are paid directly to the independent platform and are not paid to the real estate agents or brokers.

Optionally, the text boxes which display the banner and button URLs are locked to prevent any editing or deletion of the addresses other than by the Virtual Tour personnel.

Virtual Tour May Feature Additional Product and Service Providers and Provide Tracking of Information In addition, real estate agents often recommend goods and services involved in the purchase of a home. For example, a real estate agent may recommend a local landscaper for a buyer after buying a property. But real estate agents can sometimes become directly or indirectly liable for the recommendation in various situations. Depending on the circumstance, especially if there is an ongoing and a profit driven relationship, a homeowner may attempt to hold a real estate agent liable for the damages caused by a recommended service provider. These considerations make it unfavorable for a realtor to be an advertiser. Thus, the present invention provides for a third-party advertising platform.

The Virtual Tour of the present invention also optionally allows for collection of data on what banners are being accessed. Information may be gathered as known in the art, according to demographics, economic status, property type, etc. Information gathered reveals what consumers are looking for out of entire real estate market. Additionally as an optional embodiment, the present invention tracks rates at which various vendors, such as mortgage brokers, insurance brokers, title companies, and settlement agents, are selected from the website advertisement. Optional service packages may provide feedback to the advertisers on viewing information.

The present invention also optionally contemplates an embodiment wherein additional service and product providers, such as paint companies, furniture companies, decorators, contractors, and landscaping companies, may advertise on the platform featuring the real estate for sale. Thus, the realtors and the third-party service providers do not violate any regulations against kick-backs by paying advertisement fees directly to the platform.

The present invention concerns business methods of providing a host website that allows various real-estate related service and product providers to come together along with the realtors and the buyers and sellers to advertise and coexist while complying with the applicable regulations.

Third party companies may be national or regional, and the Virtual Tour platform may enter into contracts to feature a specific vendor on the virtual websites. Furthermore, selection of vendors and products may be influenced by geographical concerns. For example, a local furniture company can only advertise in specific locations, whereas national furniture companies can advertise nationally.

In an alternative embodiment, the virtual tour may also offer advertisements, information and/or links regarding retail stores, restaurants, and other local vendors (such as automobile repair shops, jewelry shops, key stores, hardware stores, etc.) The virtual tour may also list helpful information such as information about the city, the school system, the crime rate, area demographics, average home sale prices for comparables, etc. Where a vendor advertises directly on the Virtual Tour platform's website, the vendor does not need to invest in and maintain its own website, and therefore is economically beneficial to the vendor. In one embodiment, the virtual tour website may communicate the order to the vendor directly. Thus, present invention also contemplates a one-stop inclusive virtual real-estate website.

Virtual Tour Platform from Contract to Set Up of Each Tour

There are various ways in which a seller or a seller's real estate agent can upload the desired information about the property onto the advertising platform. The description below describes only one embodiment, and any obvious or known modifications are contemplated by the present invention.

Once the seller or the real estate agent has contracted with the independent platform to advertise its property, information and images of the home may be uploaded for advertising. For example, the advertising platform may be configured so that the seller or the seller's agent may take photo images of the listed property and upload the images directly onto the advertising website. In another embodiment, there may be an optional choice between the seller directly uploading images or using a provided photographer to take photos of the property for uploading. Any combination may be used.

Generally, sales representatives sell advertising services to real estate agencies. Sales representatives also target any of the other real estate related service providers, such as mortgage companies, insurance companies, home inspectors or title companies, and any other real estate related product and service companies, such as furniture companies, paint companies or landscaping companies. Any means of known advertising methods can be used. In addition, the independent platform may advertise directly on its websites.

When a real estate agent enters into a contract with the virtual-tour company, various purchase modes are contemplated. Available contracts may vary from purchases in set-priced quantities, on a one-at-a-time basis, bulk deals, or an unlimited usage basis. Prices structures may differ accordingly. When a realtor or a seller makes the decision to advertise, they can notify the virtual tour company of their decision in a number of different ways including by logging directly onto the virtual-tour company's website and filling out an order form. Furthermore, any known modes of communication, such as through emails, facsimiles and telephones, may be used to place an order.

Information initially gathered from the seller/agent may include the address and location of the property, a brief description, the seller's information and the agent's information. Additional detailed information generally listed in an MLS, such as the square footage of the property, detailed features of the home, number of rooms, options, school information, neighborhood information, age of house, etc. This information can be provided at the time or at any time prior to the virtual tour being made available to the public.

With the property address, the virtual tour company may dispatch a photographer to visit the property and obtain digital images of the property. Access to a home, for example, may be obtained through the generally used real estate lock box even though an agent may not be able to show the property to the photographer. Optionally, an appointment may be made with the agent or the seller to show the property to the photographer.

Photographers can be assigned to geographic zone for faster service, or if preferred, realtors can request specific photographers for specific assignments. Instructions are then sent to the photographer.

Photographers then visit the property and take digital photographs. If preferred, traditional photographic methods may also be used. Generally, digital photos of the property are taken. A set price may include a set number of digital images with increasing number of images adding additional costs. The seller of the realtor can direct or make specific requests to the photographer.

For specialized 360 degree views, panoramic views, or fish-eye type of digital images of the property, there may be a different pricing mechanism. The present invention contemplates using photographic equipment and digital image manipulation software as known in the art to best capture the desired views and such images may be priced accordingly.

Once the photographer captures the photographic or digital images of the property, the photographer transmits the information back to the virtual tour company. This may be accomplished through hand delivering the images, for example on a compact disc or any other known memory device, or through other electronic means such as emails sent from laptops through conventional means or by using wireless transmitting means for faster delivery as known in the art. The photographer may also access the independent platform directly and upload the images from his or her office or home.

Once the advertising site/platform receives the images of the property, it then processes the images prior to uploading them into the final virtual-tour website. Processing may include adjustments for resizing, touching up of images to remove glare, refocusing, sharpening of lines, etc.

As discussed below, additional preparations may ready the images for manipulation by potential buyers, such as for Virtual Décor use and Virtual Colorization use as discussed. A potential buyer visiting the website may be able to modify the final images on the website, i.e. to change the color of the walls, to add or remove furniture, to add shrubbery, etc.

Once all the necessary information is uploaded and the images have been prepared, the seller or the realtor is notified and a print out, as requested, may be sent to the realtor with a package indicating additional information described herein (i.e., randomly selected mortgage brokers, furniture companies listed, etc). Optionally, mail, email and/or any other communication methods may be used.

Periodically or automatically, update or changes may be made at the request of the seller/realtor. For example, the realtor may provide new descriptions of each image, and the realtor may edit the description as desired.

In addition to a caption and a description of the images, additional features may include an auto-play feature that will take the viewer from scene to scene. Furthermore, the viewer may optionally enlarge the image and maneuver within the image. For panoramic and 360 degree images, the user may be able to maneuver the image to view any portion of the images. Information about the real estate agent may be displayed in a banner with the agent's name and contact information. Optionally the banner may be hyper-linked to the agent's own website.

Additional features of a site featuring a property may include means for mailing the links of the tour to families and friends or prospective clients. Furthermore, additional means as known in the art for downloading information regarding the property may also be made available.

Optionally, prospective buyer can contact the agent directly from the tour website by email or a message, either text or voice, may be sent directly or indirectly by the user from the website. Furthermore, links to additional real-estate hosting websites or the MLS, may be added for convenience.

Example of a Virtual Tour Website Set Up

Described below is an embodiment of the present invention as demonstrated as an Internet website. The following figures represent Internet web pages or menus for inserting information.

FIG. 1 shows an initial log-in page. Users sign on and gain access to the Internet website by entering login identification and password. For first time users, they are required to set up a new account by clicking on the New Account Sign Up link, which may take the user to a different page. At the New Account Sign Up link, first time users can create their profile by entering a variety of information, including for example, the contact information, login identification, personal password (which is made confidential), and billing information. Contact information also may include the user's name, address, phone number, email, and other contact information. For the billing information, the user provides the payment method to be used for purchasing the services provided by the virtual tour platform. Pre-existing users are also allowed to modify their account information.

The virtual tour platform allows the individual real estate agents, real estate agencies, real estate company branches, and real estate companies to track various information about the virtual tours. For example, as will be explained in more detail below, real estate agents are able to track the number of times each virtual tour is accessed and the type of activity associated with each virtual tour. In addition, real estate agencies and companies are able to track individual real estate agent performance within any specified parameters.

According to the type of user, whether an individual real estate agent, an internal virtual tour platform employee, a local real estate agency branch, or a national real estate company, each user type may have access to different information. Generally, internal tour platform employees may have access to all of the information contained in the virtual tour platform in addition to internal information needed to run and maintain the platform. National real estate agencies may also have access preferably to all information available to regional and local real estate branches and agencies, as well as individual real estate agents, in addition to information exclusive to the national real estate agencies. But they may not be given access to internal information needed to run and maintain the platform. Likewise, regional and local real estate agencies may have access to all information available to individual agents, in addition to some information not available to the individual agents. Thus, depending on the user type, different levels of available information may be accessed.

In this embodiment, there are generally three types of virtual tours that may be made available. The first type, as an example called Virtual (or VIP) Tour, may represent a virtual tour package. A VIP Tour may contain for example, information about the property normally listed in an MLS listing, but may also contain as described herein, virtual tours of the property (static, moving or 360 images), preferred mortgage brokers and insurance agents as described herein (within the applicable guidelines), links to vendors and other real estate professionals, links to the real estate agency's website, etc.

The second type of virtual tour, for example called the VIP Colorization Tour or Virtual Colorization, may preferably provide the added benefit of allowing the user to modify and manipulate the colors and the surfaces of the homes in the digital images. The third type, for example called the VIP Décor or Virtual Decor, may preferably allow the user to perform virtual décor changes and edits as described to manipulate the featured property.

Figure 2:
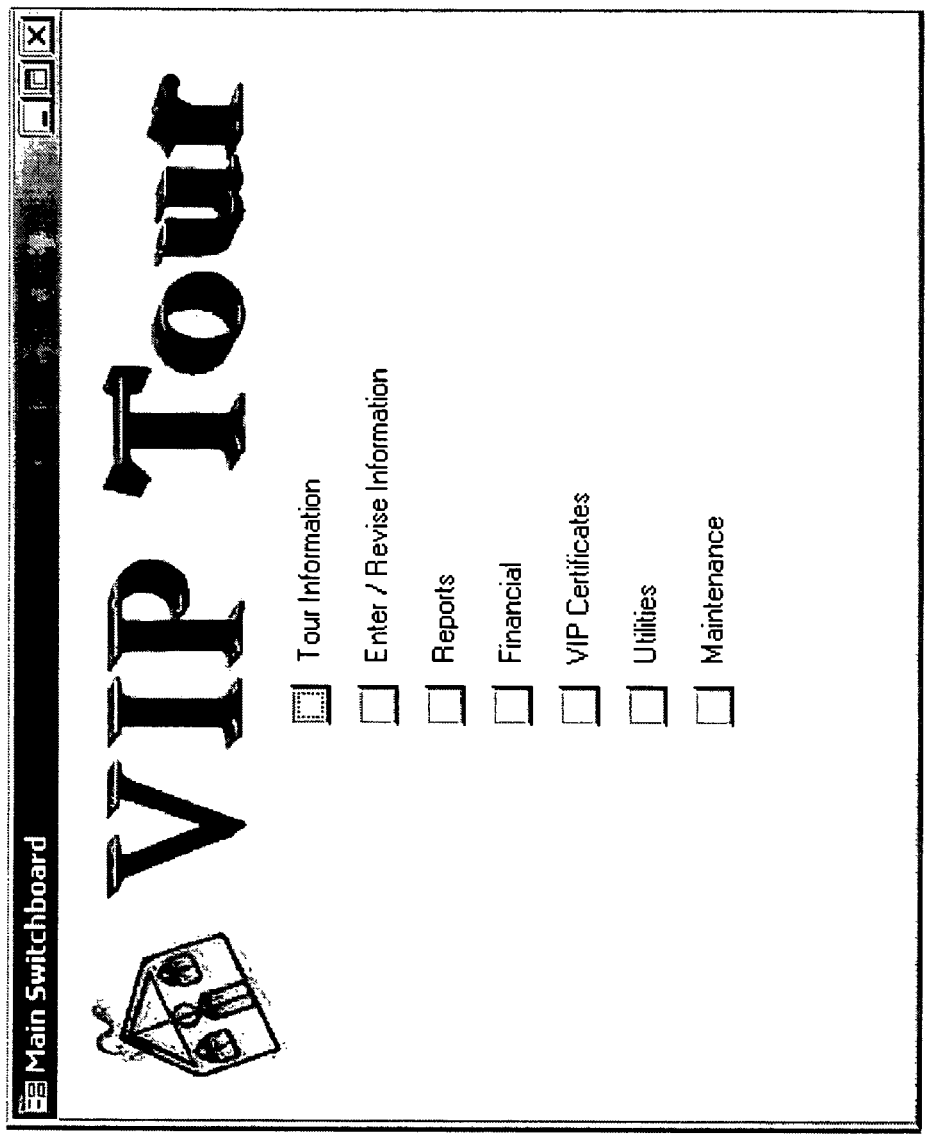
FIG. 2 is a main menu for the Virtual Tour.

FIG. 2 shows the webpage preferably displayed after the user gains access to the site after log in. As known in the art, a user is able to navigate between these various pages, for example by using a forward or backward buttons. FIG. 2 shows an example of a VIP Tour. The user may select any of the displayed categories for viewing, updating, editing, and reporting. These categories may be modified as needed.

Figure 3:
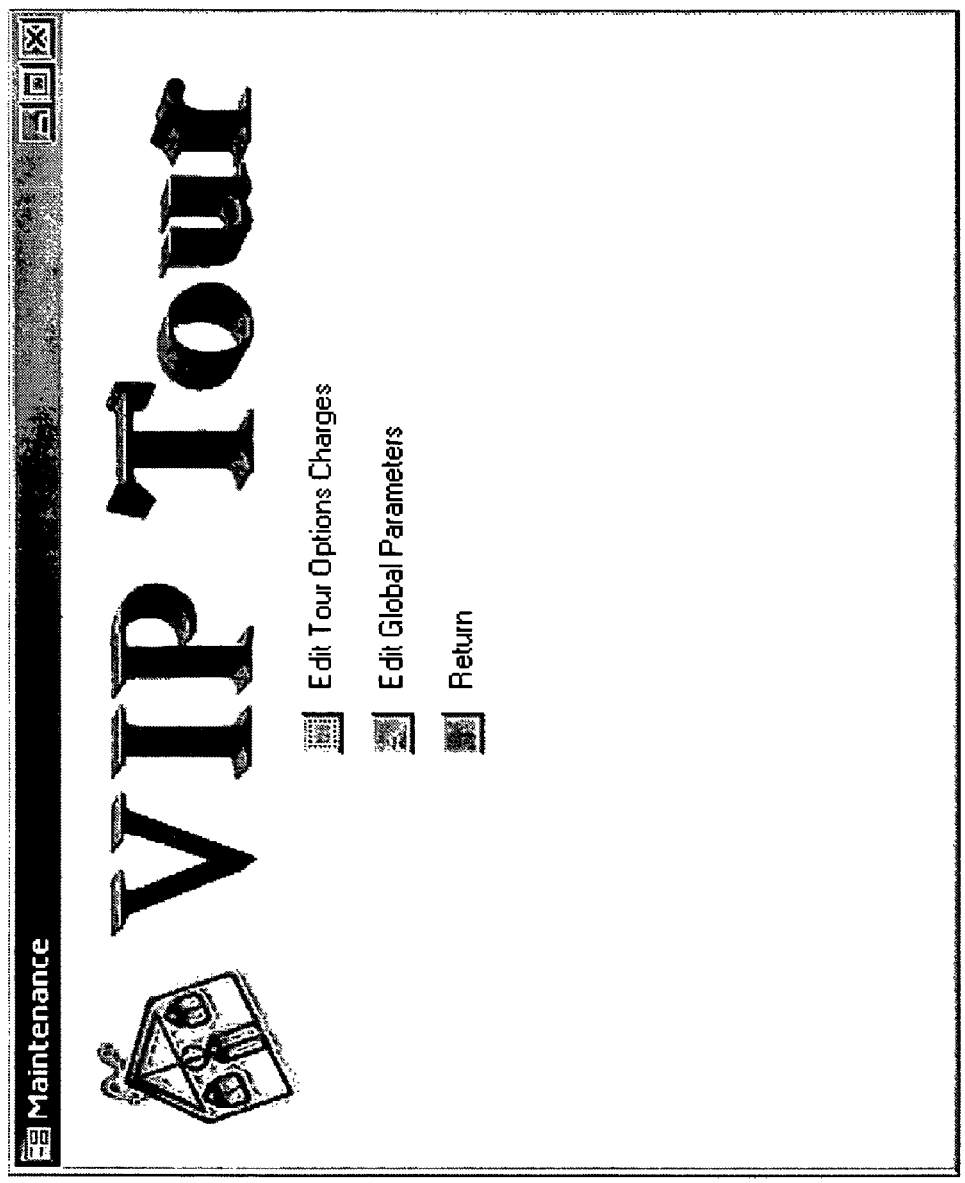
FIG. 3 is a Maintenance menu of the Virtual Tour, for use by internal employees.

As an example, an internal virtual tour employee may select "Maintenance" in FIG. 2 to see FIG. 3. FIG. 3 shows the page that may allow the user to "Edit Tour Options Charges" and "Edit Global Parameters." These pages will allow the internal employee to enter information that will customize the database for a particular real estate office.

By selecting "Edit Tour Options Charges" in FIG. 3, the internal tour employee is directed to FIG. 4. This page lists the different tour charges that are available for a given real estate client. These charges may be modified according to individual contracts or may be fixed for each client. The different charges are assigned a Charge Index with corresponding Charge Amounts and Charge Descriptions. For example, Charge Index 1 costs $10, which is the charge rate for ordering an extra photography disc. Additional charges may include for example, rush charges for photography, rush charges for tour processing, a basic brochure template fee, voice descriptions added to the tour, floor plan inclusion, etc. FIG. 4 also preferably allows internal employees to add or delete optional charge items or revise and add additional pricing charges. As real estate clients make specific requests for each virtual tour, charges may be made according to these tour Options Charges. Optionally, real estate clients may also under appropriate circumstances gain access to the webpage of FIG. 4 to view the different pricing structure. Optionally, a national or regional real estate company may gain access to the webpage of FIG. 4 to modify what charge and options may be available for its real estate agents.

By selecting "Global Parameters Configuration" in FIG. 3, the internal employee gains access to FIG. 5. The webpage of FIG. 5 allows input of information relating to a particular office of the virtual tour platform, such as the name and address of the office, telephone and fax numbers, and name and contact information for the office manager and other support personnel. In addition to the address and contact information, office prefix (Office VIP Prefix) is assigned to appear with every VIP Tour number that is issued by the office. This information may be used as an identifier for billing and tracking purposes. Local sales tax is also defined on this screen as well as the base price for a single virtual tour. Finally, the root addresses define whether the office's virtual tours, advertisements, tour photos and personnel information are stored on the web or on the tour platform server. FIG. 5 shows internal housekeeping matters for the virtual tour platform and thus is accessed by internal employees.

Figure 6:
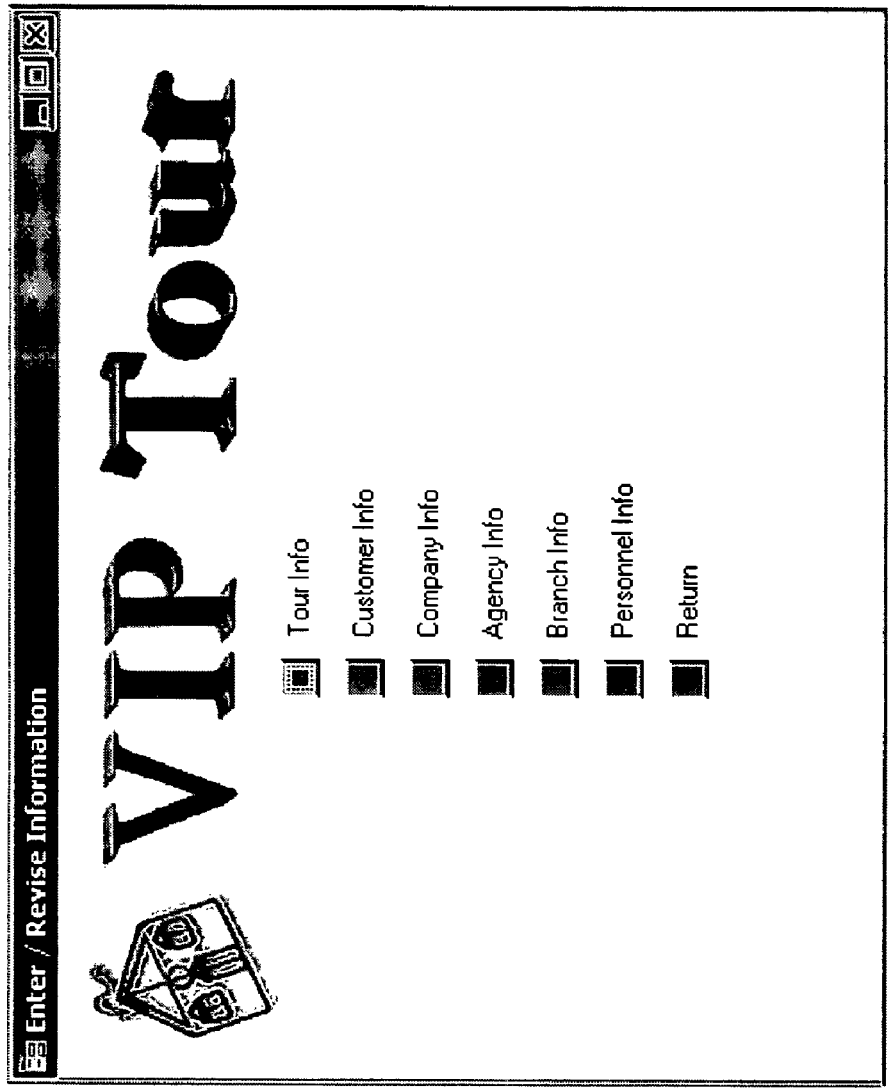
FIG. 6 is a Tour Information menu, which is selected from the main menu of FIG. 2.
Figure 7:
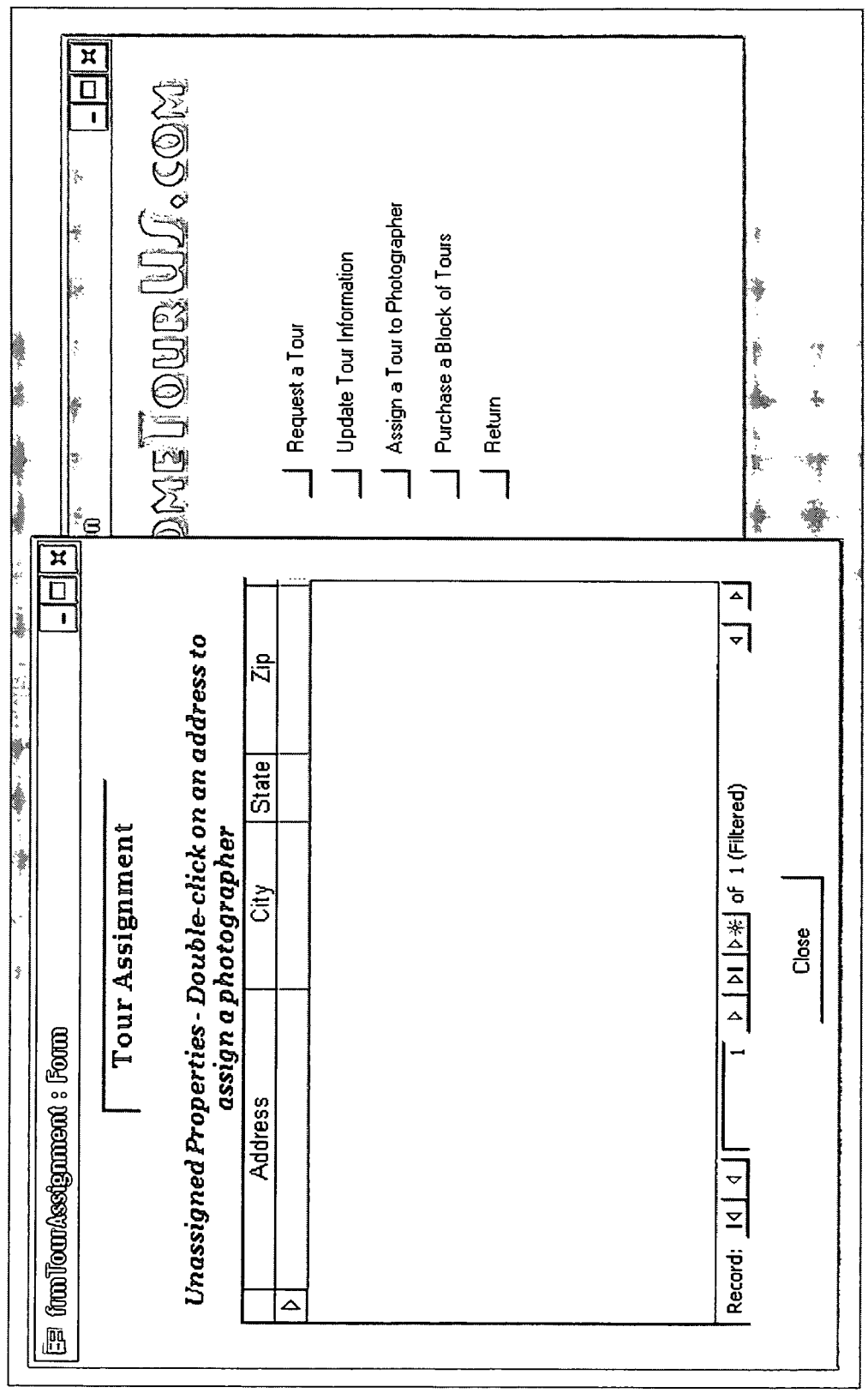
FIG. 7 is a Tour Info menu, which is selected from the Tour Information menu of FIG. 6.

Selecting "Tour Information" in FIG. 2 brings users to the webpage of FIG. 6. This page allows the users to input, modify, and view information about the virtual tours. "Tour Info" allows users to request a tour, update tour information, assign a tour to a photographer, and purchase a block of tours (FIG. 7). "Customer Info" is used to input specific information about individual real estate agents, "Company Info" is for national or corporate real estate companies, "Agency Info" is for local real estate agencies, "Branch Info" is for regional or branch real estate agencies, and "Personnel Info" is for internal virtual tour platform personnel. As described, different users are given different access. For example a national real estate company may have access to "Company Info", "Branch Info", "Agency Info", and "Customer Info", whereas a real estate agent may have access to only the "Customer Info" of these four categories.

By selecting "Tour Info" in FIG. 6, users are brought to the webpage of FIG. 7. From this page, users will be able to request a tour, update tour information, assign a tour to a particular photographer, and/or purchase a block of tours.

Selecting "Request a Tour" in FIG. 7 will allow the users to input information to request individual virtual tours. FIGS.

8-11 show the different pages that are available. FIGS. 8-11 may be selected by selecting "Property", "Tour Options", "Banners", or "Buttons".

Figure 8:
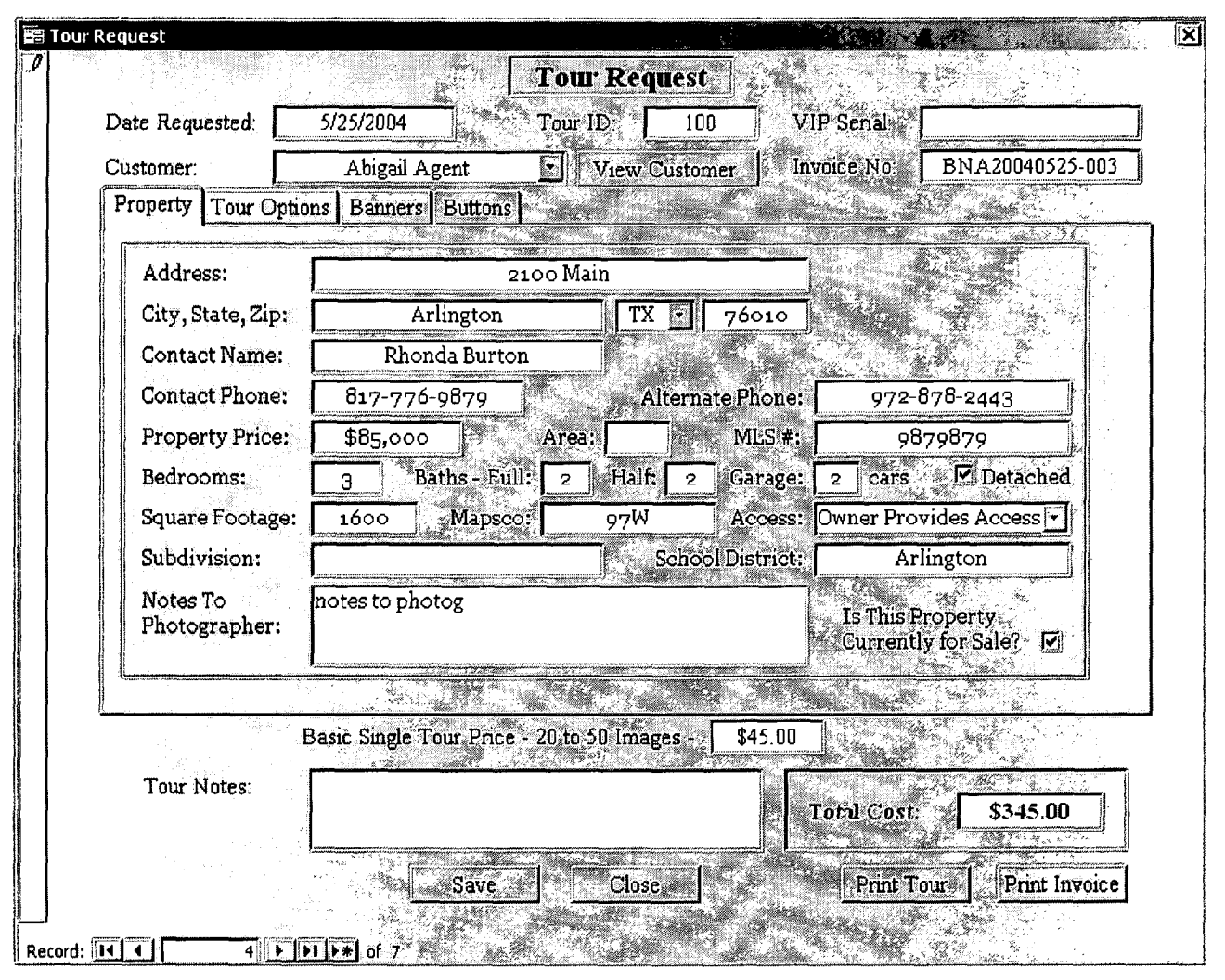

As shown in FIG. 8, users enter the date of the initial tour request. Tour identification is assigned along with the VIP Tour serial number. The specific customer or real estate agent information and invoice number is also assigned for the virtual tour. A link for "View Customer" allows users to see information on the real estate agent. By selecting the "Property" button, users input the specific information about the property being covered by the virtual tour. Information shown in FIG. 8, along with additional information as otherwise available for example in MLS listings, may be inserted. Specific information about the real estate property will be featured on the final virtual tour, which is available for viewing by the public. In addition, tour prices, notes about the particular tour, and the total costs are also shown.

Figure 9:
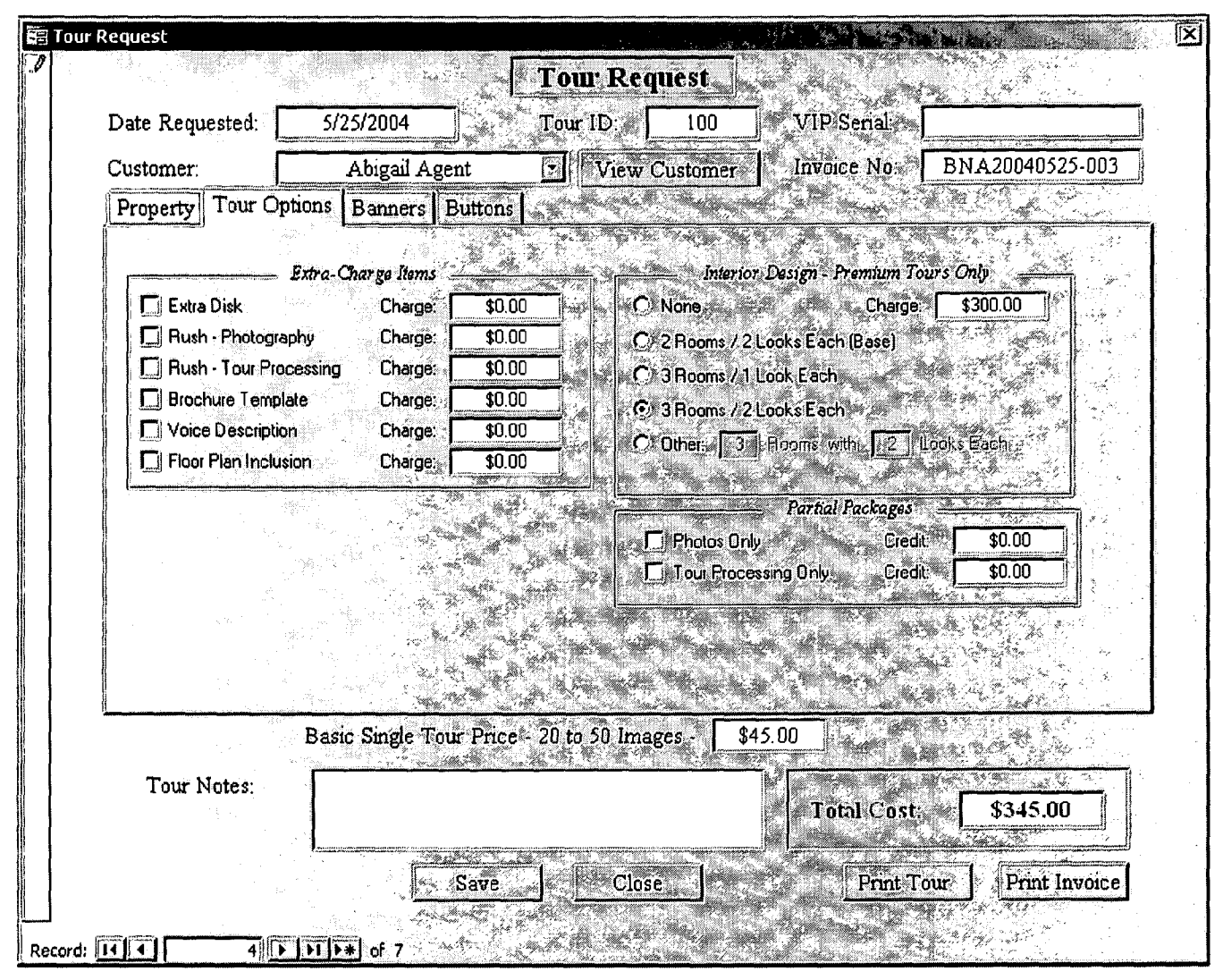

Selecting the "Tour Options" as in FIG. 9 will allow the user to select from the displayed options when ordering or requesting a tour. If no options are selected, the total costs for the tour will be assigned the "Basic Single tour Price" as defined for the particular customer in the "Global Parameters Configuration" of FIG. 5. Optionally, the charge for each optional item may not be editable in this form, with the exception of the "Other" option in the "Interior Design—Premium Tours Only" category. The user will then be allowed to enter the number of rooms and the number of images ("Looks") per room, and the cost is calculated based on the fixed value per room. The Total Cost is displayed in the lower-right corner of this screen and reflected the charges incurred.

Figure 10:
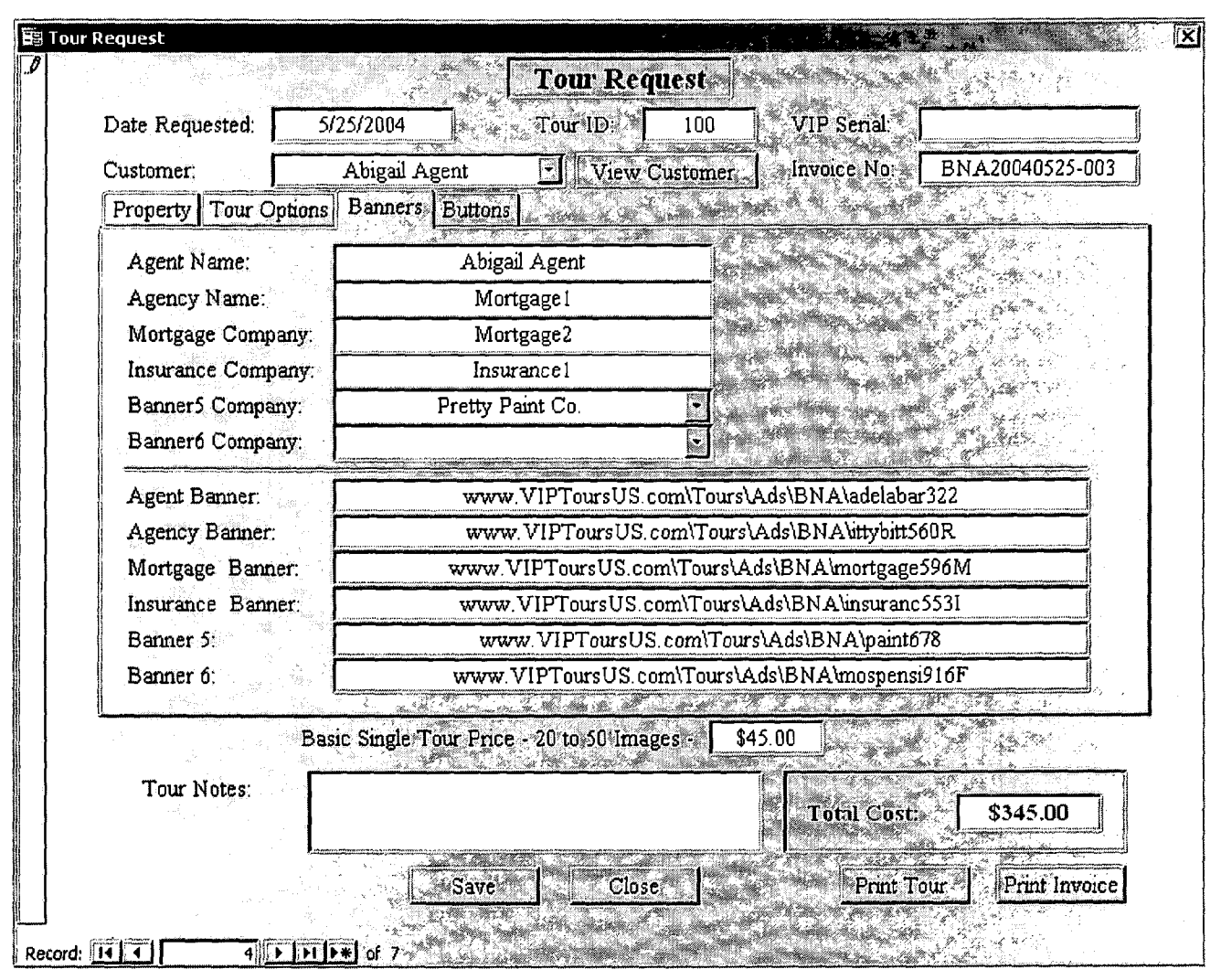

FIG. 10 shows the website for selecting the "Banners" to be displayed in a virtual tour. As new tours are being created, the real estate agent's and his or her agency's banners are incorporated into the virtual tour. In addition, a banner for a mortgage company and another for an insurance company are selected randomly as discussed above for inclusion in the tour. As will be seen in FIG. 11, agents are allowed to designate a fixed number of mortgage companies and insurance companies as preferred partners, meaning that the probably of selection is greater than that of purely random selection as discussed previously in one in N. In additional real-estate related service providers and vendors, such as paint companies may also be selected to be featured as discussed. The virtual tour platform tracks the overall activity associated with each virtual tour. Thus, at a later time, a real estate agent may generate reports that may show the number of times the public accessed each of these vendors, mortgage companies, and insurance companies were selected while viewing each virtual tour.

Figure 11:
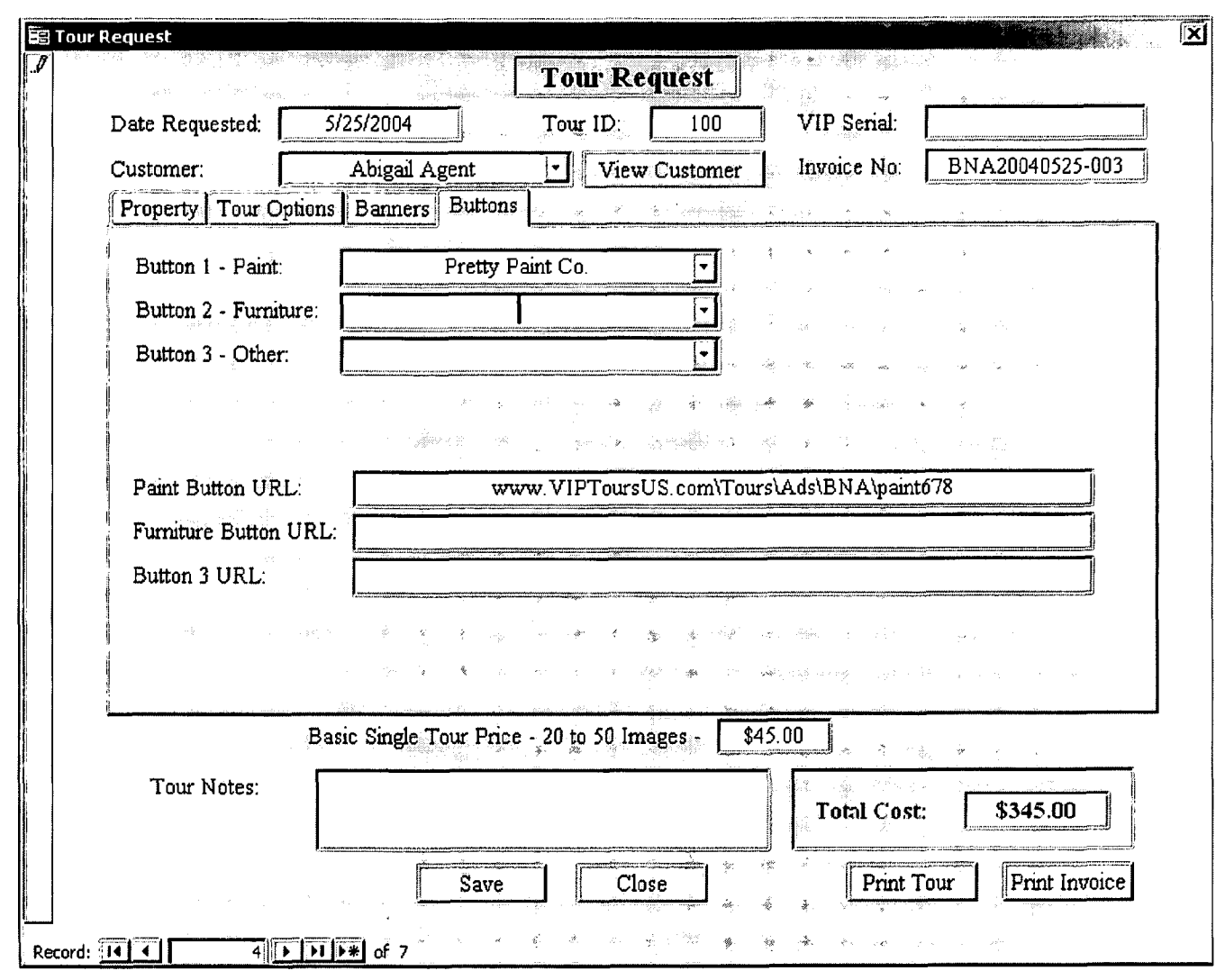

FIG. 11 shows the "Buttons" page of "Tour Request" which allows the user to designate a number of advertisers. In the example shown, users may choose paint companies and suppliers, furniture companies and vendors, and an additional vendor of choice.

FIG. 12 shows the website for identifying where the virtual tour is located internally and on the Internet. The "Virtual Tour Update" page is accessed by selecting "Update Tour Information" from FIG. 7. The virtual tour's storage location internally as well as the URL identifies where the virtual tour resides. As the tour photography and processing progresses, the "Tour Info Update" form allows the user to update the tour's status by entering the date that the disk was received from the photographer, the location of the files on the server, the name of employee uploading the files, etc. Once the tour has been completed and linked to the Internet, selecting the "E-mail Customer" button will send the customer an email notification that the tour is ready for viewing.

Figure 13:
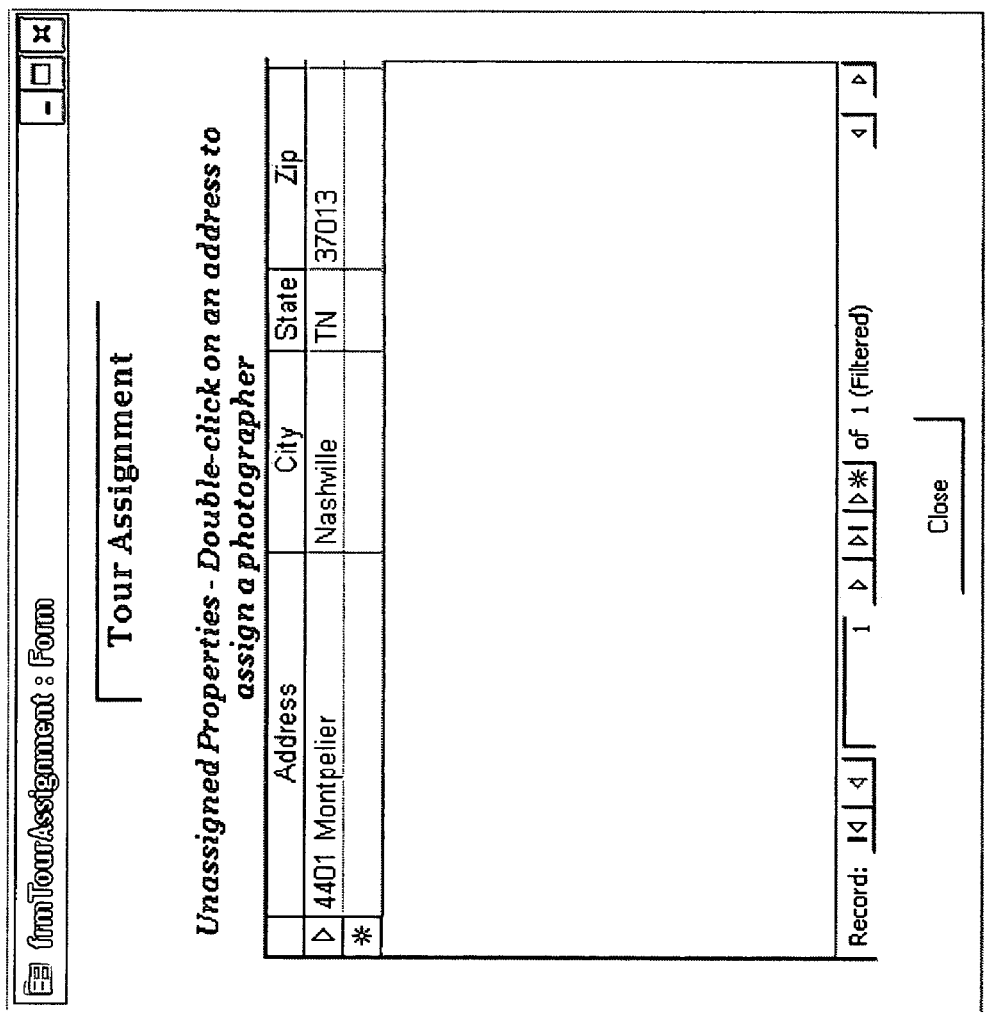
FIG. 13 is a Tour Assignment menu, which is selected from the Tour Information menu of FIG. 7 and which is used to assign the Virtual Tour to specific internal personnel.
Figure 14:
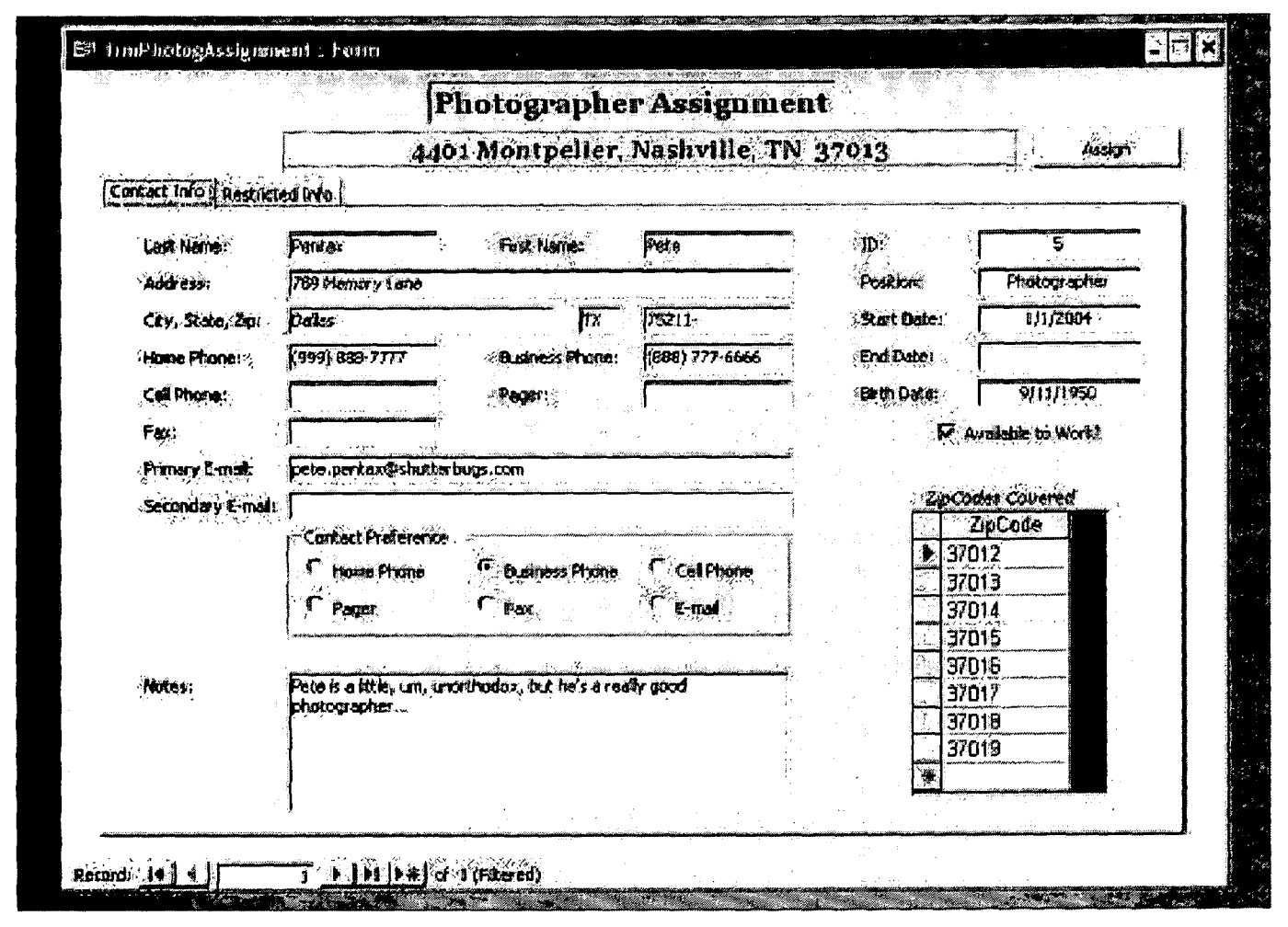

FIG. 13 "Tour Assignment" is selected from FIG. 5's "Tour Information" menu to assign a photographer to prepare the real estate property. This screen may be used to list the pending status of the tours, for example, to indicate which tours have yet to be assigned a photographer. By selecting on the address of the unassigned Tour, the "Photographer Assignment" form of FIG. 14 is displayed. Photographers are assigned to different zip codes, and thus, only the photographers that cover the specific zip code may be available for assignment. To assign a photographer to a tour, the user may click on the "Assign" button on the upper-right corner of the form.

FIG. 15 shows the "Tour Block Purchase" page, which is selected from the "Tour Information" menu of FIG. 5. Tours may be purchased by the agents in blocks. These blocks of tours as described VIP Tours. Alternative tours include VIP Colorization Tours and VIP Colorization Décor Tours. The pricing may be set as agreed between the virtual tour company and the real estate companies, agencies or agents. When a real estate agent purchases a block of tours, the purchaser's name may be selected from the "Purchaser" combo box. The user may click on the "View Customer Info" button to view the customer's information. Selecting the "VIP Pass Package" will display a list of all of the VIP packages that are available to the customer. The sales agent is also indicated along with the total purchase price and the identification assigned to the serial number of blocks.

Figure 16:
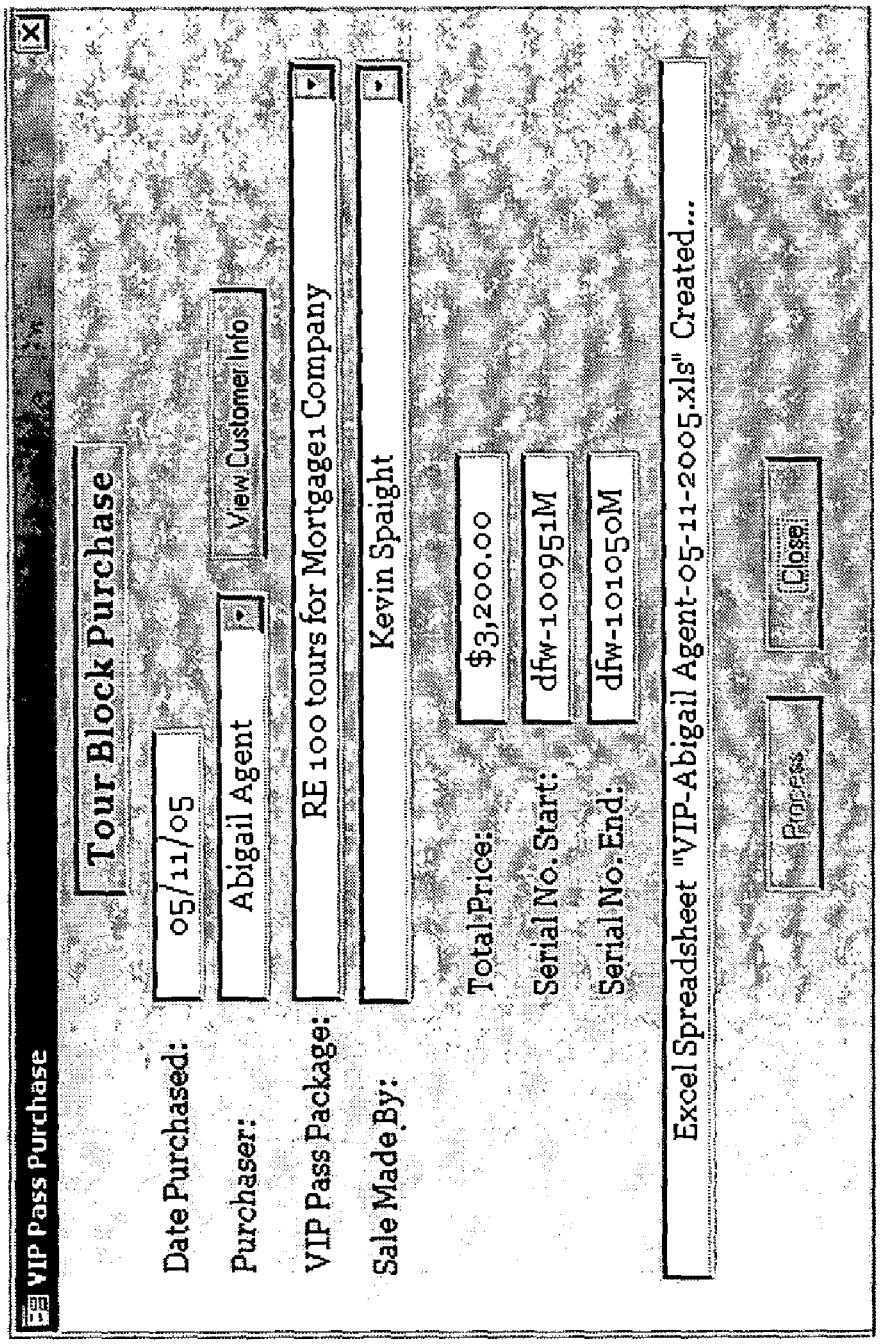
FIG. 16 is another Tour Block Purchase menu, which shows the Excel spreadsheet for gathering information for tracking all types of Virtual Tour activity.

Once the block sale is processed, the purchased VIP Tour passes are stored in the appropriate table, and an Excel spread sheet is created as shown in FIG. 16. The Excel spreadsheet contains various information about the virtual tour, such as the VIP serial numbers, date purchased, purchaser name, seller name, as well as information about how the passes were redeemed. Thus, a real estate agency may keep track of how its agents are using the block purchased virtual tours.

In addition, however, the Excel spreadsheet shown at the bottom of FIG. 16 may also track various useful information about the virtual tour. The information available may be categorized in the Excel spreadsheet as known in the art. Some useful information include categorizing the number of hits for each individual tours, data as categorized by each agency, branch or national offices, detailed tour hits for each individual agents, tracking individual agents' performance, leads generated for advertising and banner promotion on each tour, leads generated to agency from each tour, tour type, the average time for sale completion, MLS listing information, account identifications, grouping by geographic regions, etc. Real estate agencies, branches, and national corporations are thus able to gather useful information and analyze the effectiveness of their activities. Hit counters and lead generation counters give immediate feedback to the real estate industry members to better serve their clients. FIG. 17 is one example of such an Excel spreadsheet report, which may be modified as described.

Figure 18:
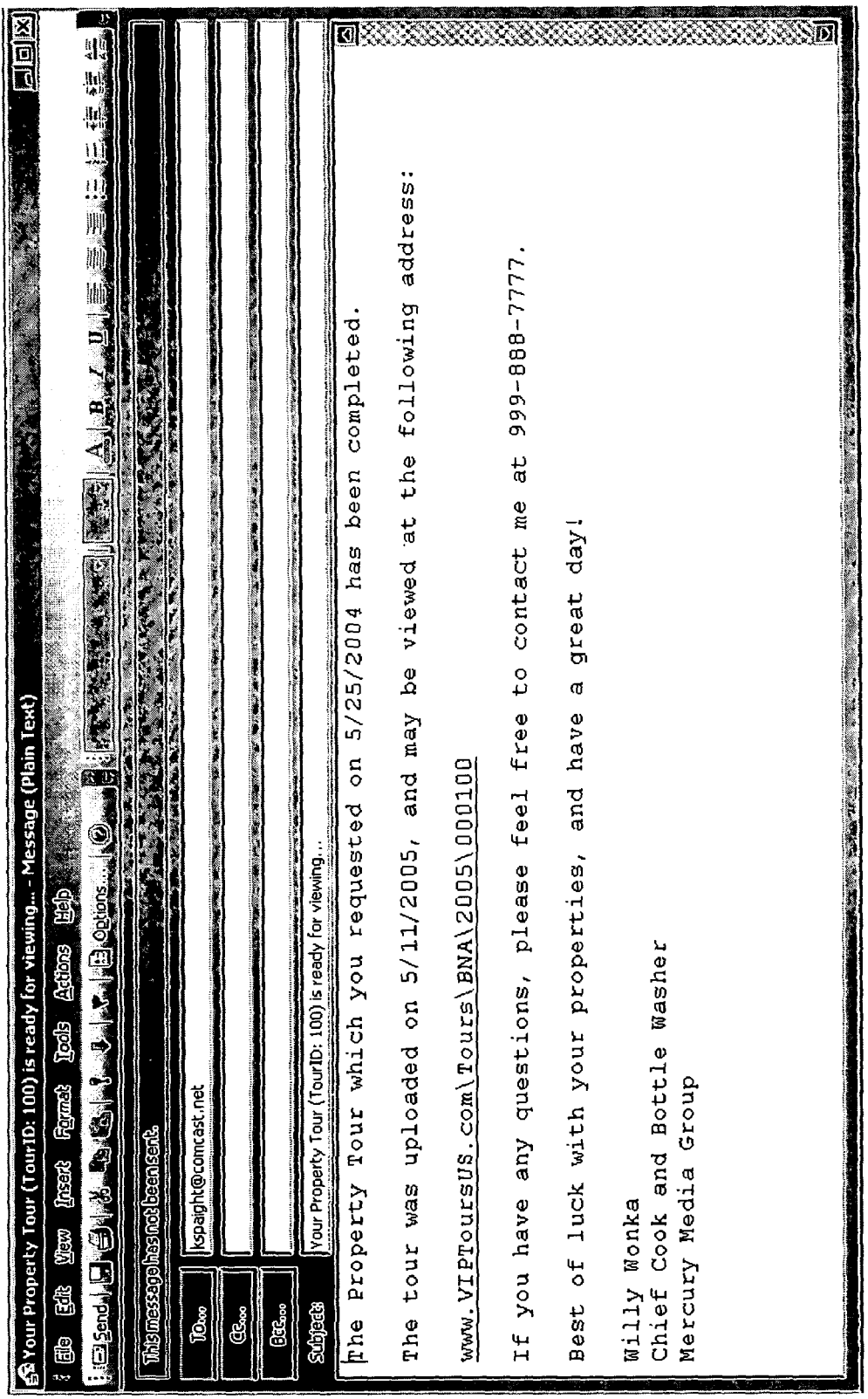
FIG. 18 is an email to be sent to a real estate agent after a Virtual Tour request has been processed.
Figure 21:
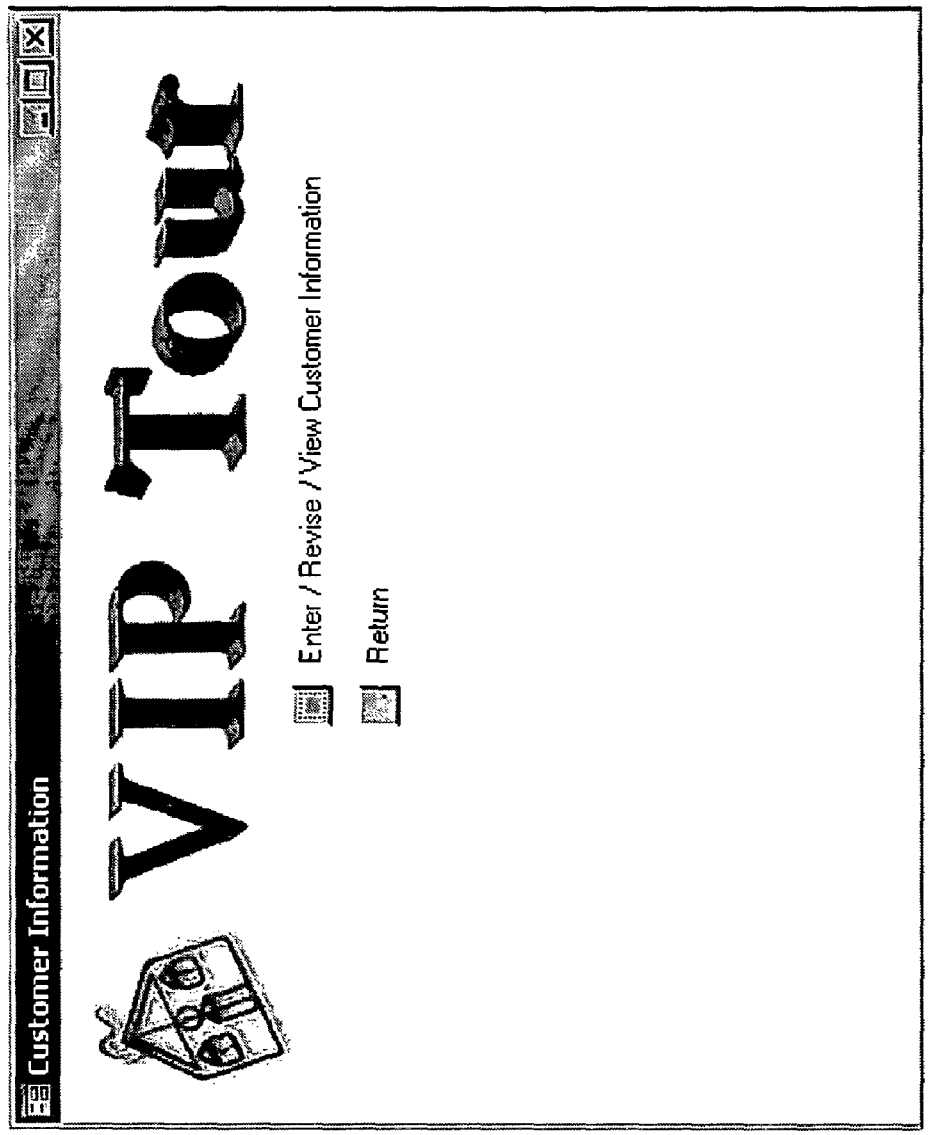
FIG. 21 is a Customer Information menu, which is selected from FIG. 6.
Figure 25:
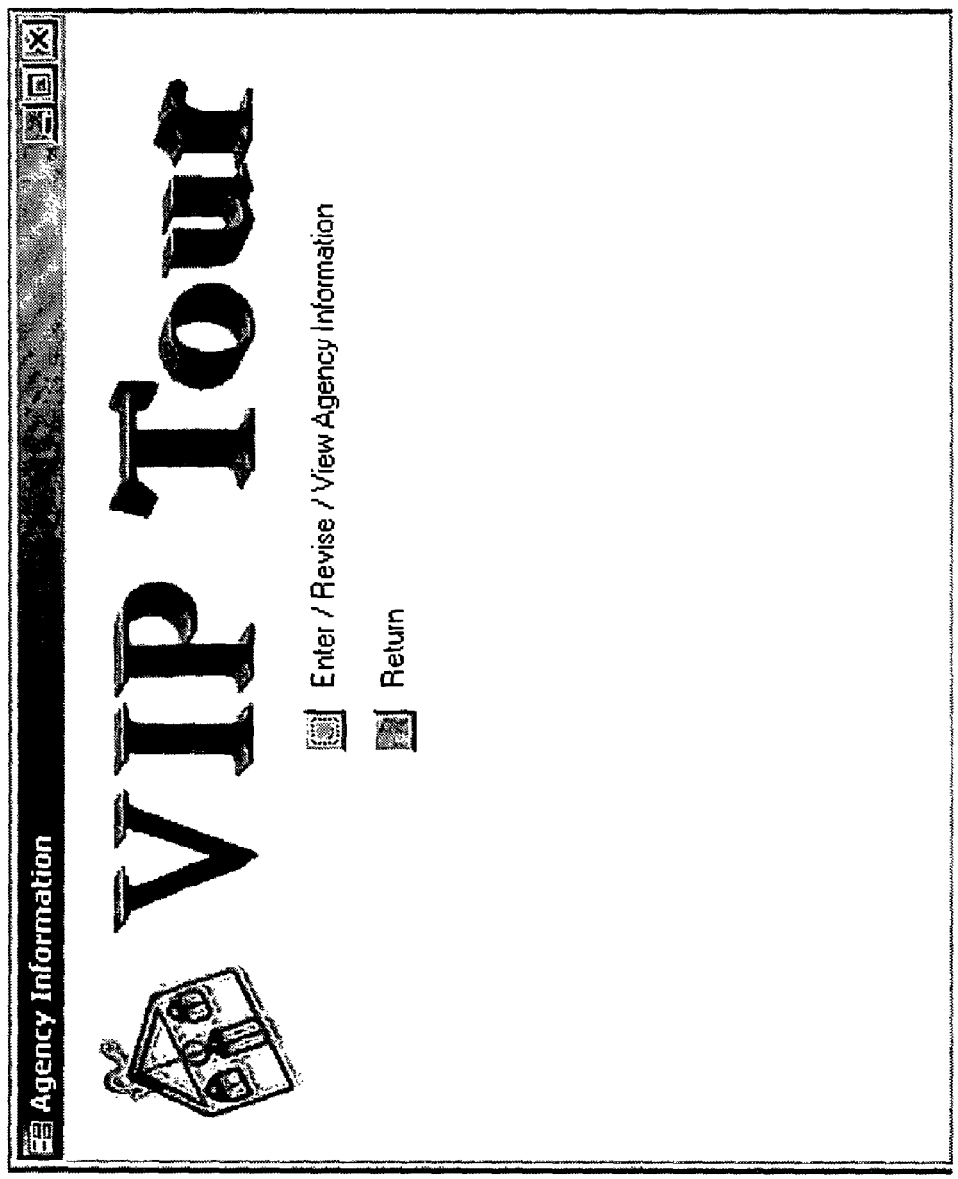
FIG. 25 is an Agency Info menu, which is selected from the Tour Information menu of FIG. 6.

Once the virtual tour is completed internally, FIG. 18 shows how the website may be linked to the real estate agent's website. An email containing the link to the virtual tour's Internet site allows the real estate agent to link the site to the agent's website. Also once the virtual tour is completed, a "Property Tour Information Report" is generated as shown in FIG. 19. This may be emailed or faxed to the customer. This report contains all information pertinent to the tour. In addition, from the "Tour Request" form of FIG. 8, selecting "Print Invoice" button will generate an invoice for the requested tour. This form may be emailed, faxed, sent by PDF, or otherwise communicated as known in the art.

Figure 23:
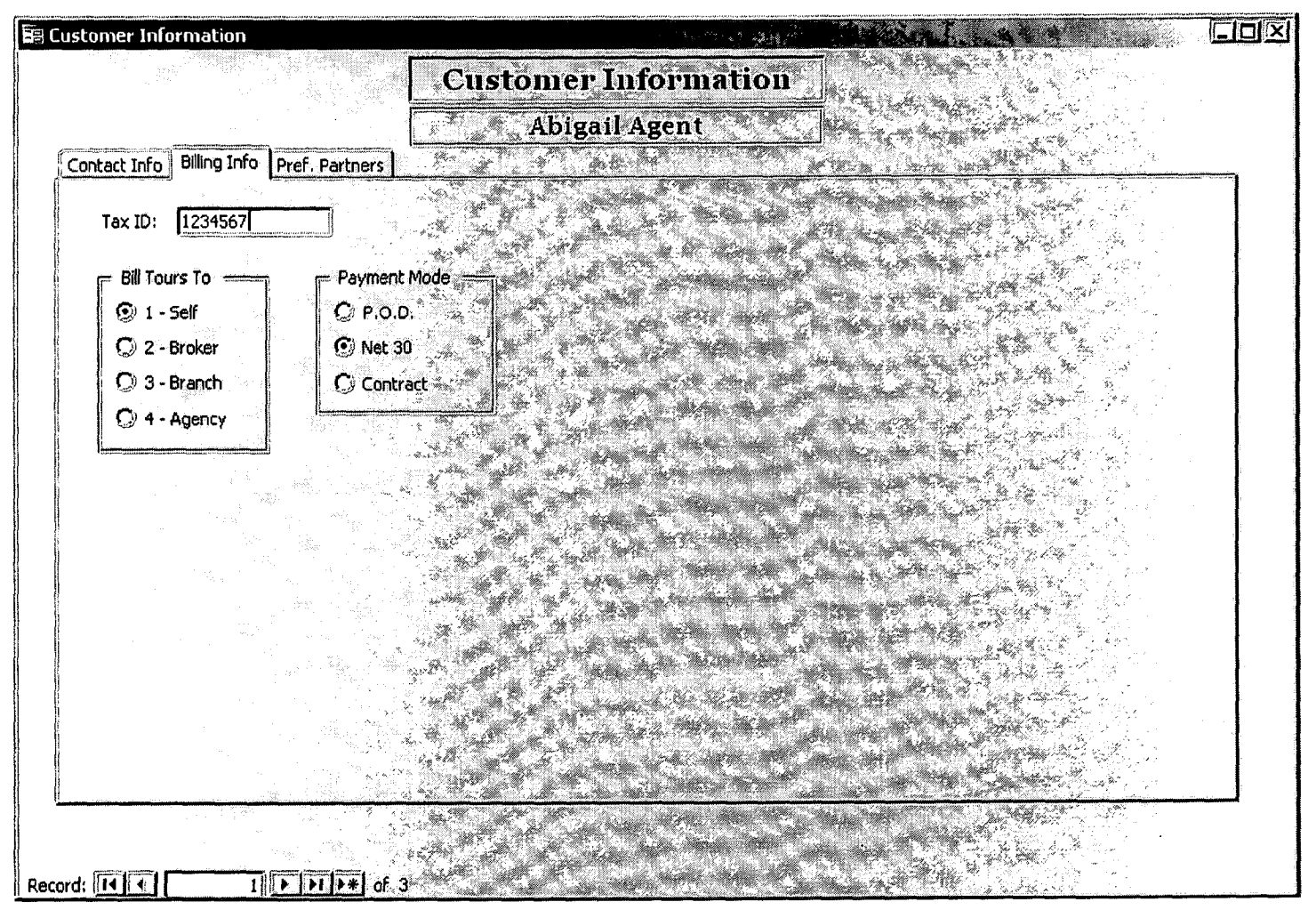

FIGS. 21-24 show menus for entering, revising or viewing customer (individual real estate agent's) information. Depending on the context and where appropriate, as used herein, the term "customer" may also be used to represent real estate agencies, branches or national real estate companies. FIG. 22 collects the contact information for a given real estate agent. In additional, the real estate agent's association is specified within the boxes available in this screen. The real estate agent's contact information, photograph, and other information are recorded and stored. The "Billing Info" menu of FIG. 23 is only visible to the internal member or administrators of the virtual tour platform. This page contains the information required for cases in which the real estate agent is billed directly for the services performed.

Figure 24:
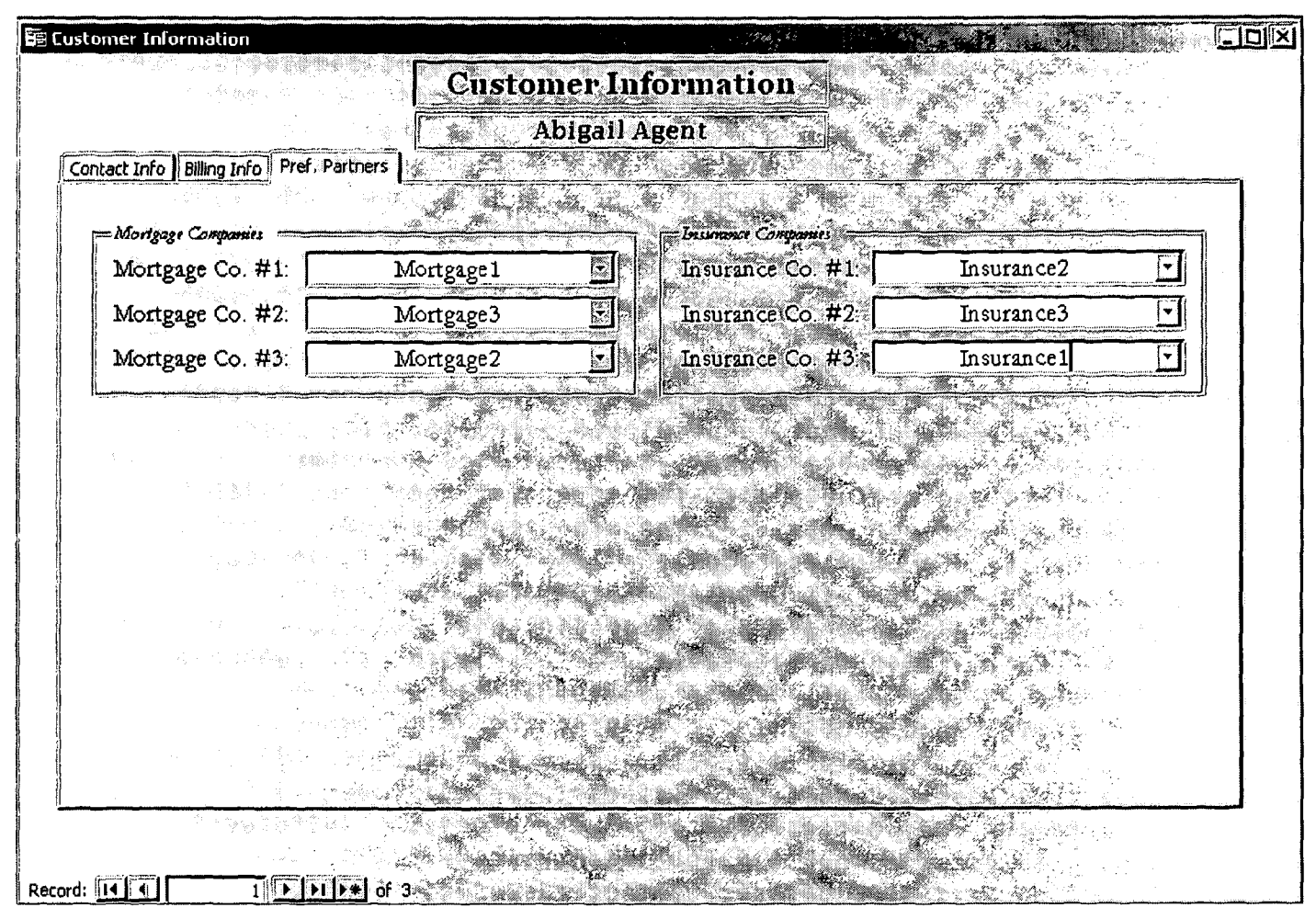

FIG. 24 shows the menu for selecting the preferred partners to be featured at random (as discussed) with the virtual tours. Here, three mortgage companies and three insurance companies may be selected. These are specified for each real estate agent.

Figure 26:
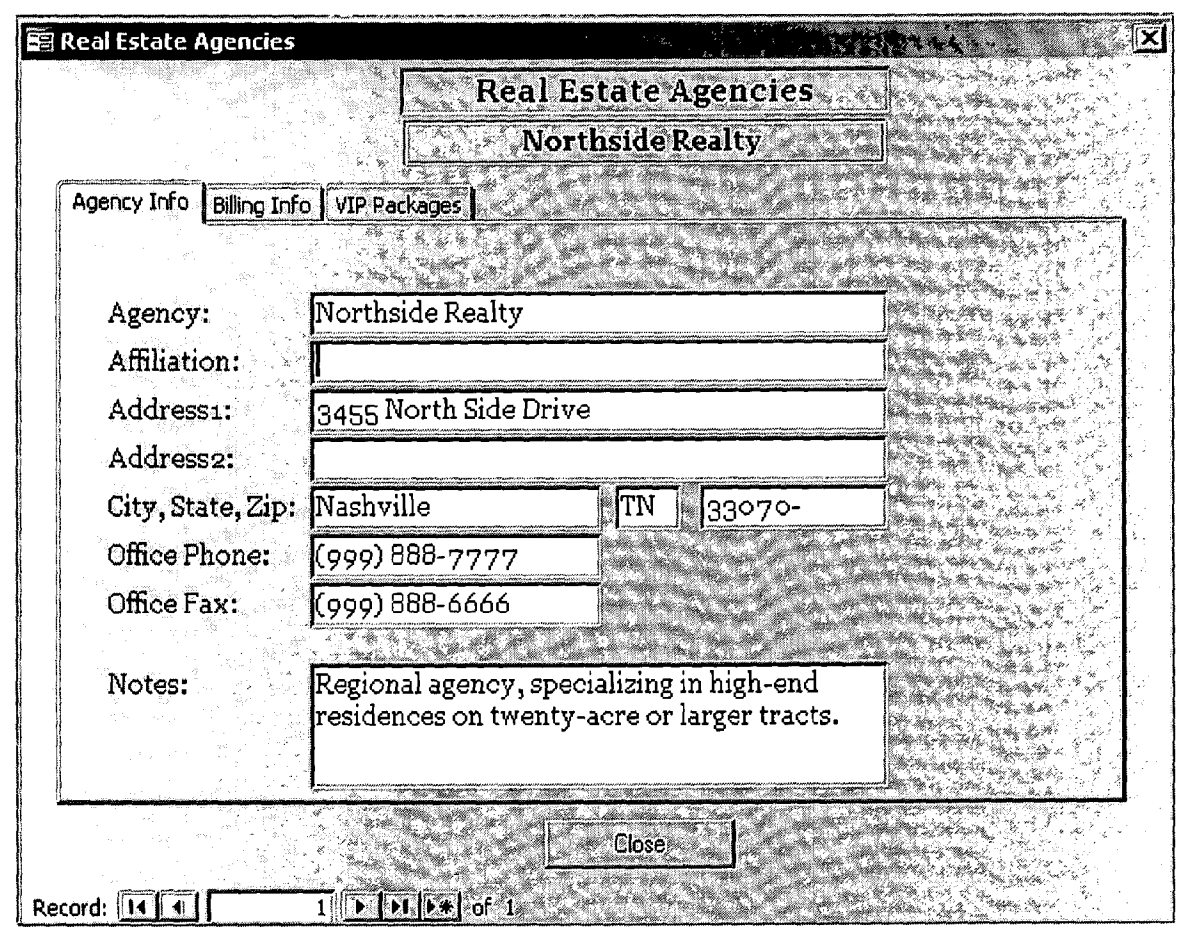
Figure 27:
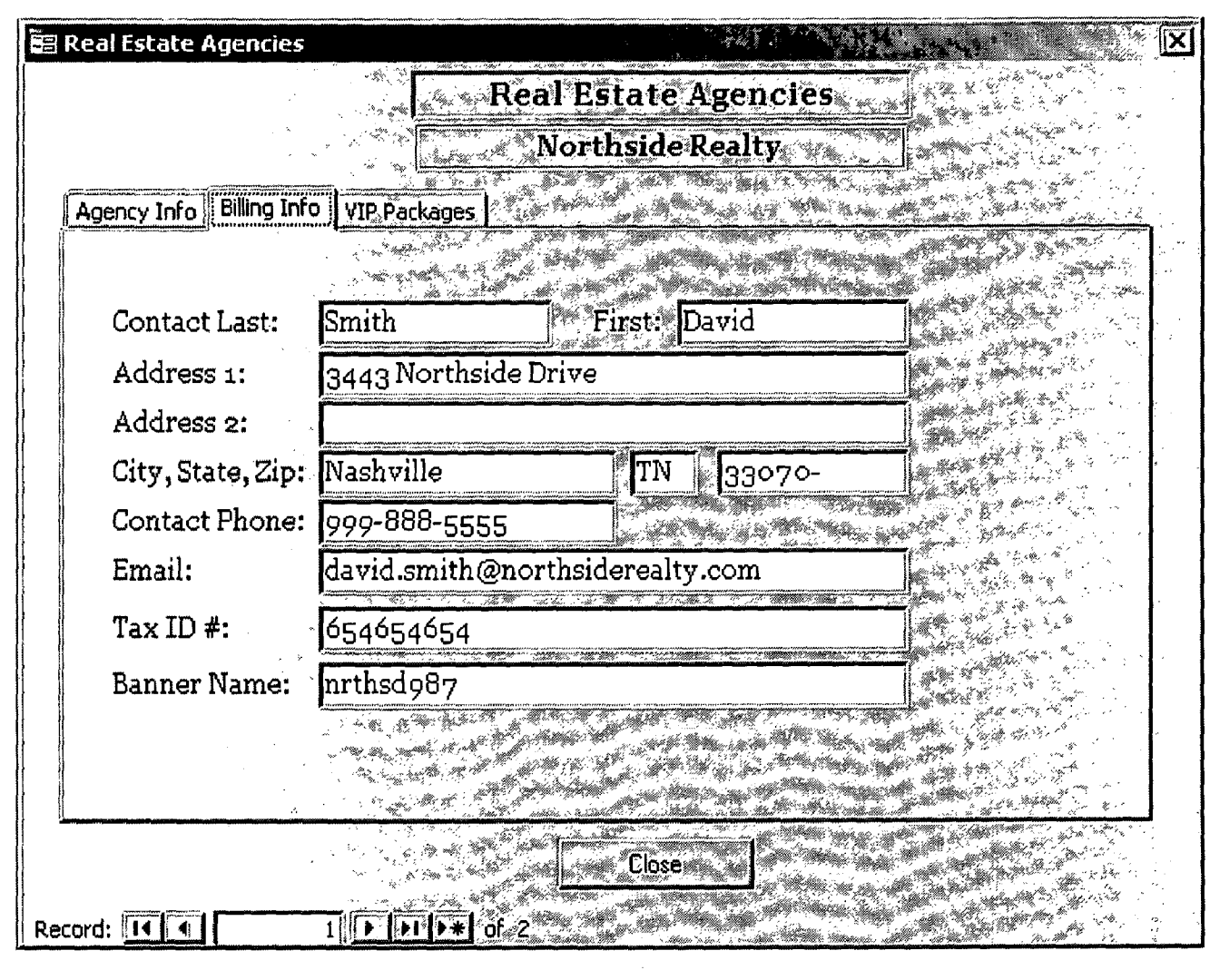
Figure 29:
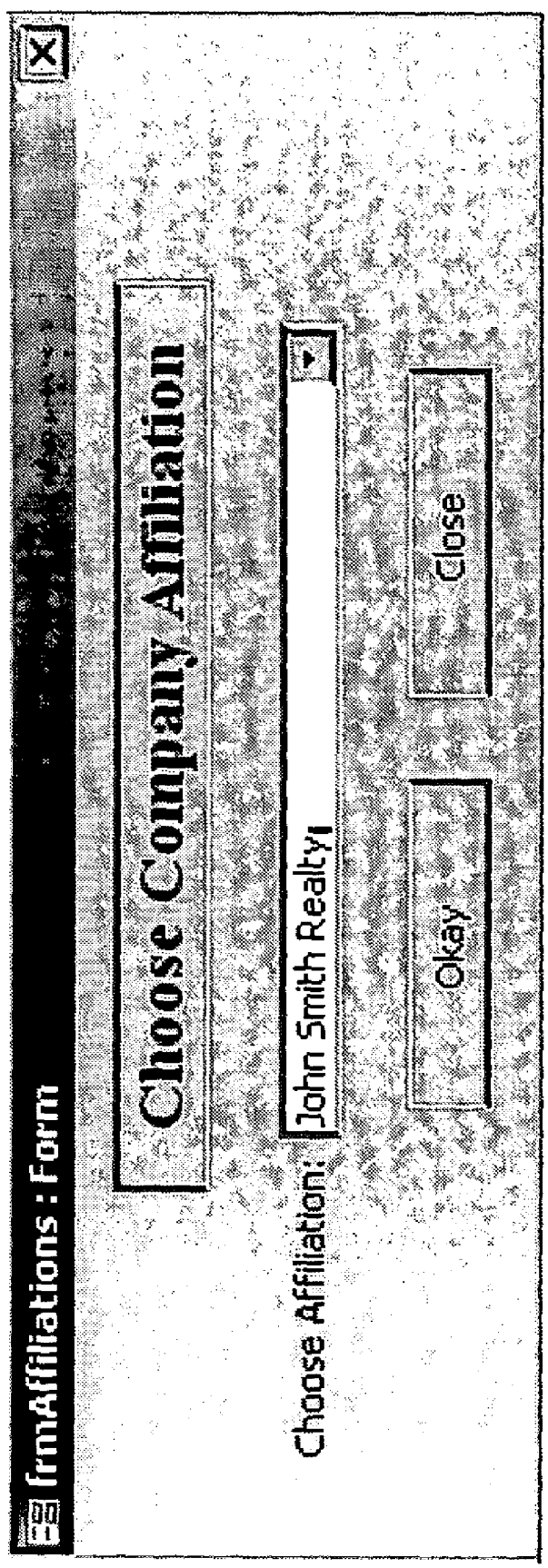
FIG. 29 is a Choose Company Affiliation menu for use by real estate agents.
Figure 32:
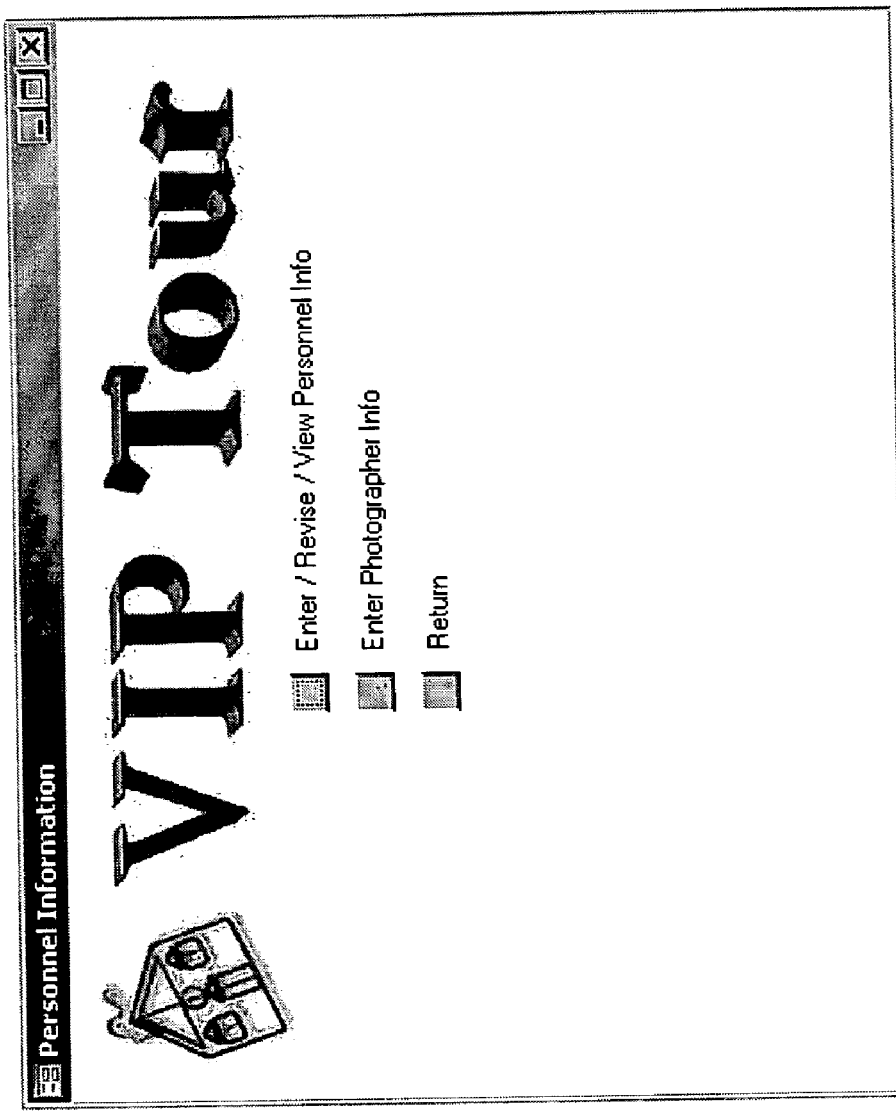
FIG. 32 is a Personnel Info menu, which is selected from the menu in FIG. 6.

FIGS. 25-29 show menus for entering, revising or viewing real estate agency information. As discussed, a national real estate company may be divided into regional branches, which is further divided into local agencies. FIG. 26 allows input of information for a given real estate agency, and not for a specific real estate agent. If the agency is further affiliated with a particular umbrella company, that affiliation may be entered. FIG. 27 shows the "Billing Info" menu, which shows how the agency is billed for services performed. FIG. 28 shows the pricing for the VIP Tour packages, which may be set by contract on an agency-by-agency basis. In the example shown, there are four levels of block purchases defined, at 25, 100, 175 or 250 tours. FIG. 29 shows a menu for selecting company affiliation.

Figure 30:
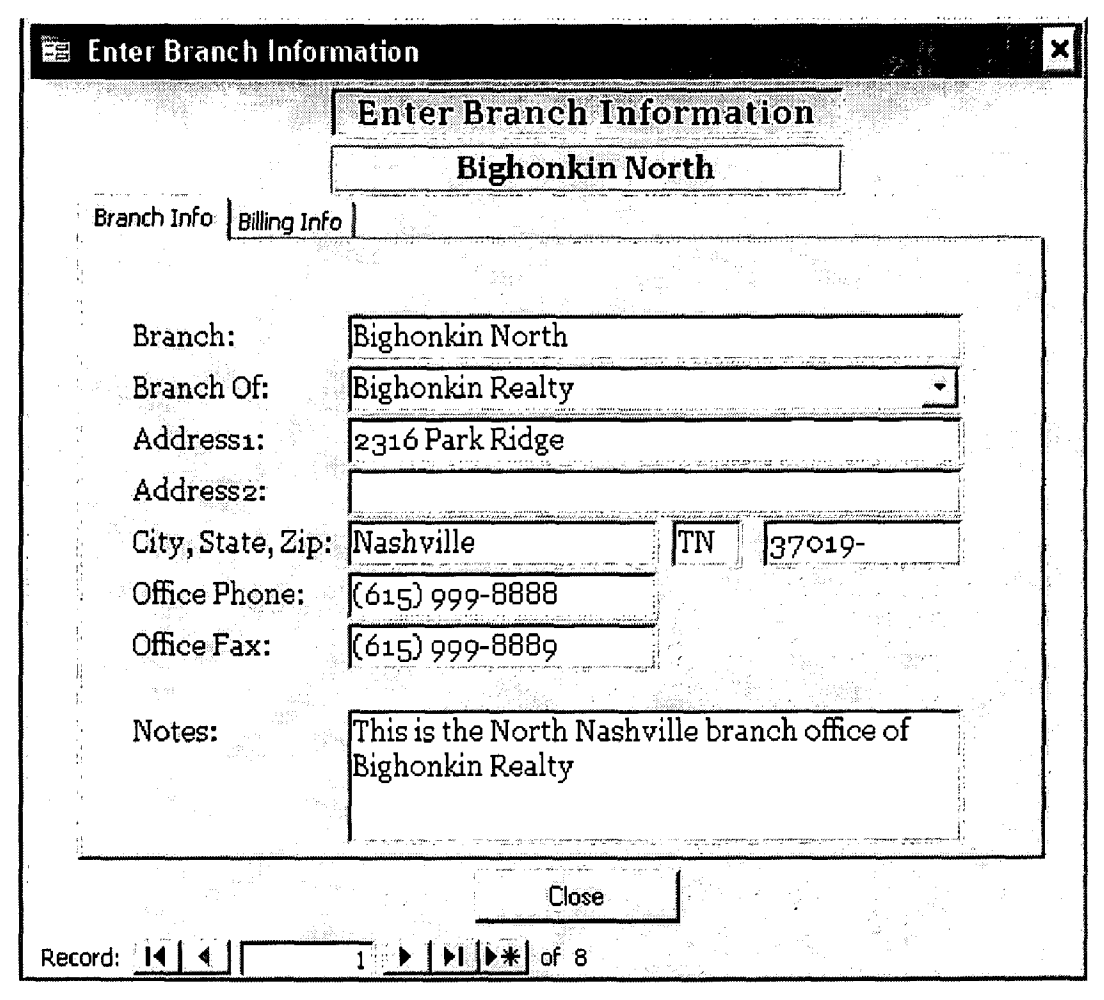

FIGS. 30 and 31 display the name, address, and contact information for a given branch of a real estate agency. Again, FIG. 31 shows the "Billing Info" page, which contains the billing information for the services performed.

Figure 33:
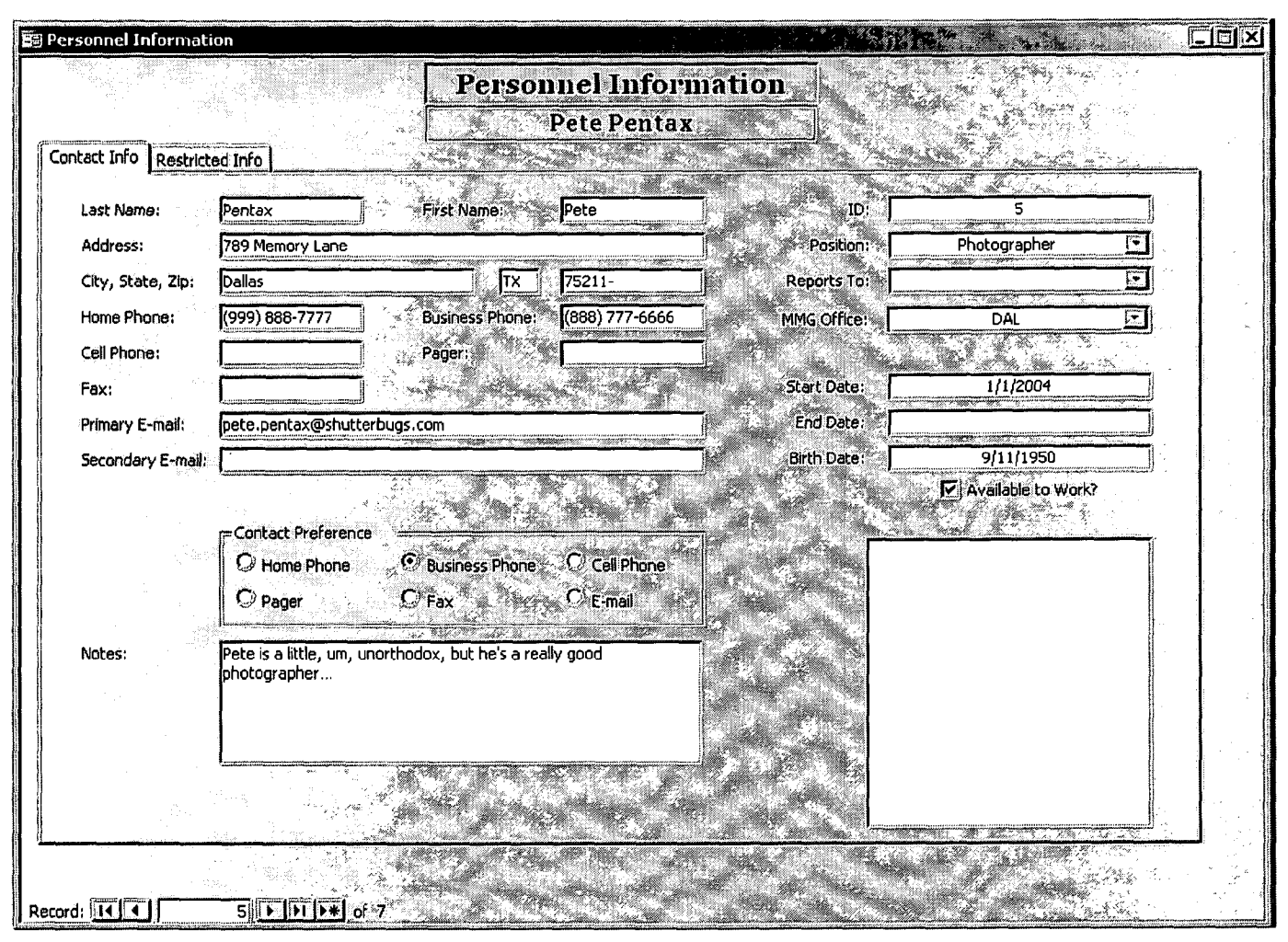
Figure 34:
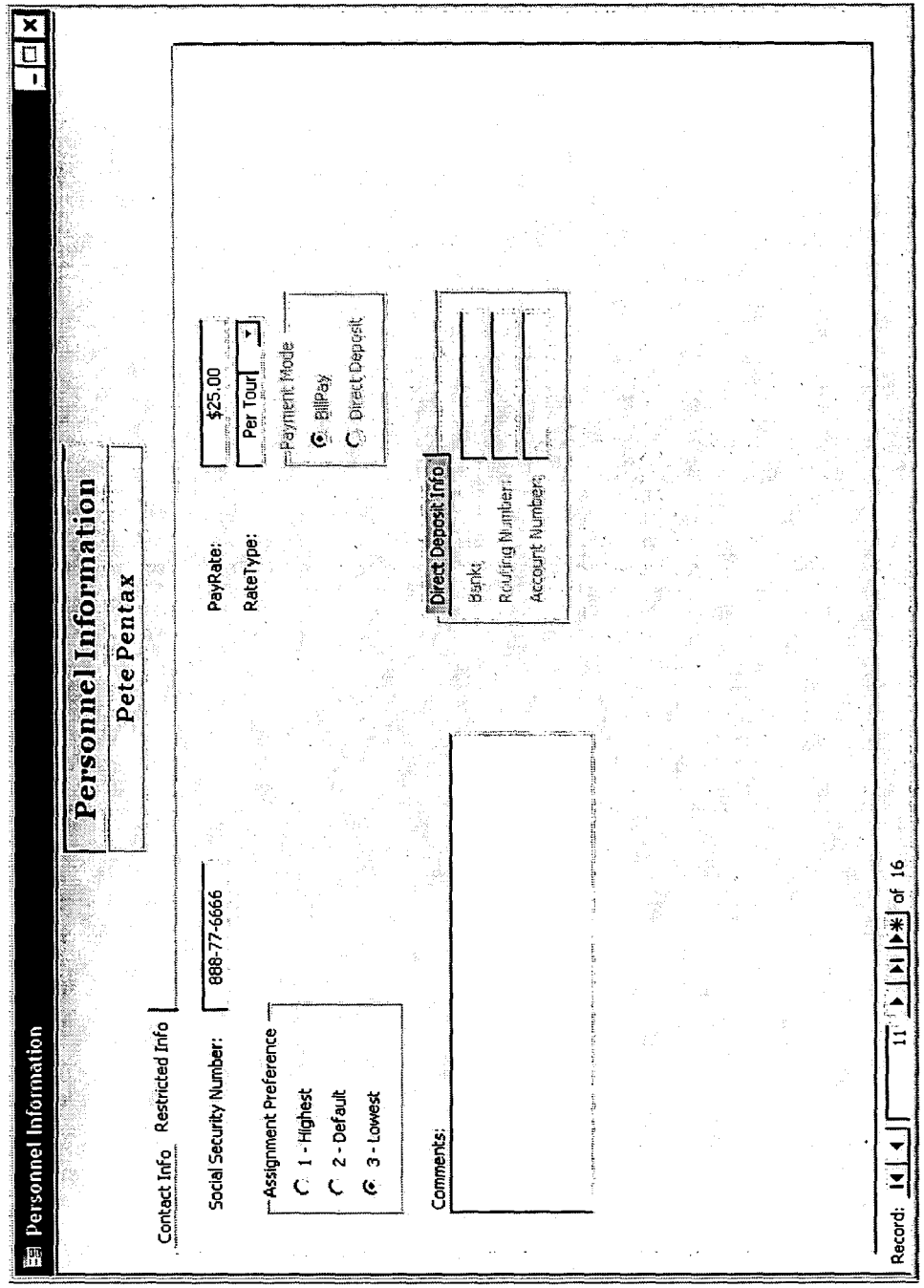
FIG. 34 is a Restricted Info menu of the Personnel Info menu, which is selected from the menu of FIG. 32.
Figure 35:
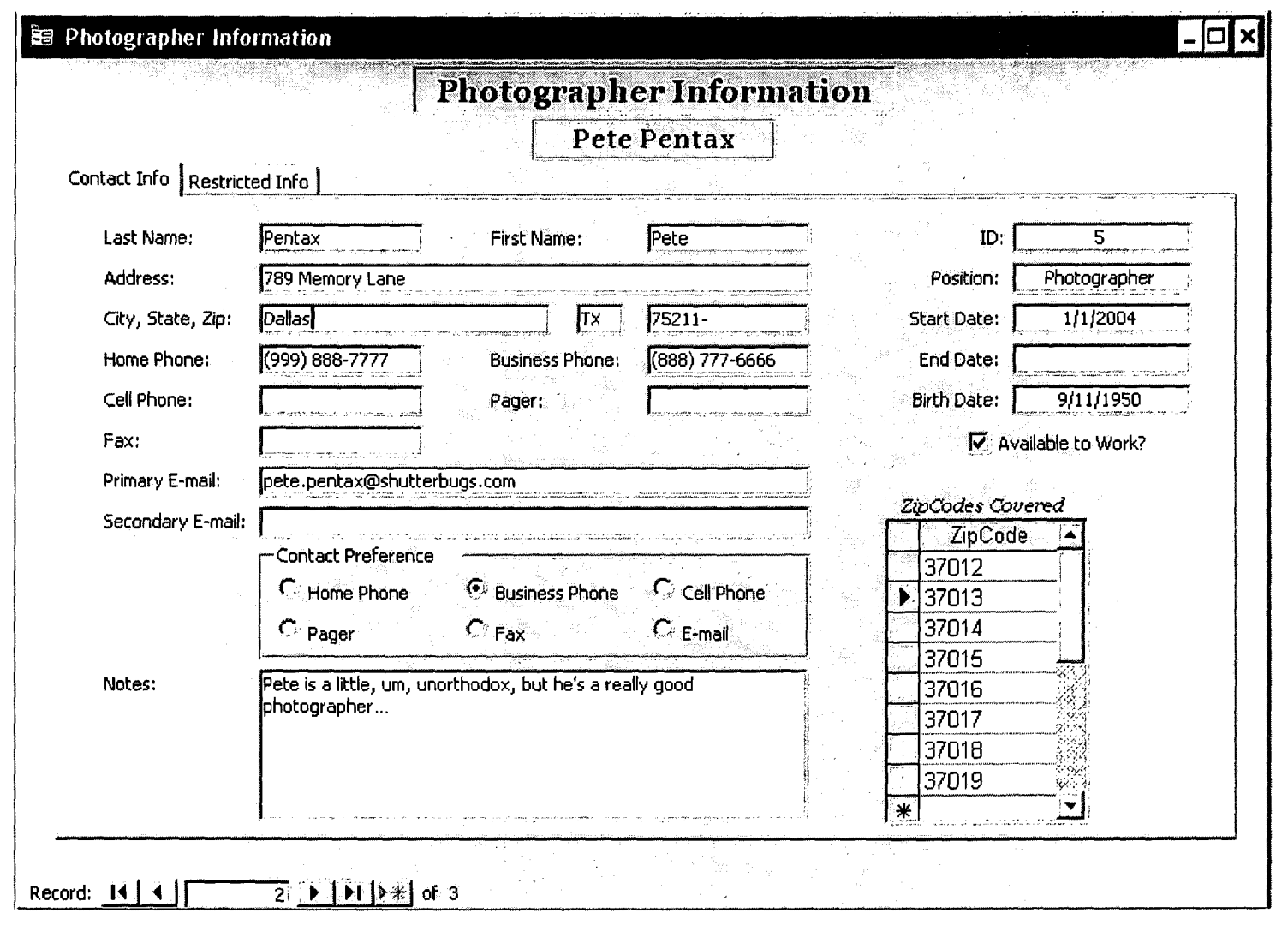

FIGS. 32-35 allow input of internal virtual tour company personnel information as shown. Personnel information menus are shown in FIGS. 33 and 34, and photographer personnel information menu is shown in FIG. 35.

Virtual Décor & Virtual Colorization

Once the digital images are loaded into the virtual tour platform, the virtual tour company readies the images for the virtual décor as described more in detail herein. This method of readying the images will allow visitors of the website to manipulate the property images, whether interior or exterior, to change, among others, the color of the walls, add furniture, replace flooring, modify fixtures, etc. The end user, a potential purchaser of a real estate property, easily and efficiently modifies the image of the real estate property while maintaining life like and realistic feel of the image.

There are numerous methods known in the art for manipulating images. Shortcomings in the known methods, however, are that they are very complicated to use and often require specialized knowledge, equipment and software. They require significant amounts of sophisticated training and time. Furthermore, modifiable images are generally pre-set and limited to a few images. Also, previously known methods may not maintain the realistic look in the image of the property featured. For example, in placing a chair within a room, available methods produce an image where the chair does not appear to be a part of the room. The chair may appear to have been a cut-and-pasted onto the actual image of the room. The cut-and-pasted image may look too large for the image, may not be in the proper configuration, may not account for depth perception, and/or may not account for the pitch and roll of the room, among other deficiencies.

Virtual Décor & Colorization

The present invention concerns a user-friendly software program that allows potential buyers and sellers visiting the virtual tour website to manipulate the digital images for virtual decorating purposes. The software program allows the user to take a pre-existing photo of a building exterior or an interior and ready it for manipulation. Virtual Colorization refers to the software that allows color changes and modification of walls, floors, and other structural elements. Virtual Décor software refers to the software that allows different items, such as furniture, to be placed within a digital image of a property.

The present invention allows for an on-line, real-time, virtual-digital imaging capabilities. In addition to the benefits of viewing properties on-line at the comfort of the user's computer, the present invention allows the user to modify the digital images of the real estate. The user may change the walls for example, from one color to another, and thus, the user may find and design a home to his or her liking. The present invention allows a user to conduct in-depth, pre-purchase planning and designing of a home, which results in an increased likelihood of purchase. The user will be able to virtually configure the home to his or her exact desires. Furthermore, the present invention educates the consumer on new and different options available for design. Unlike other virtual tour or computer-based design services, Virtual Colorization and Virtual Décor will allow end users to insert digital images of design elements, for instance furniture, into a digital photo. These colorization and décor software may be used independently or together or in conjunction with third party software as known in the art.

Generally, once digital images of the homes are taken, the photo images are readied internally at the virtual tour company for use by the end user. Generally, the images are outlined section by section as will be discussed below. The outlining process will allow the Virtual Colorization software to identify the boundaries of areas to color or to modify. Outlining will also allow structural modification to the image.

Next, the virtual tour company identifies the three dimensional layout of the image. This process is referred to herein as gridding. Two dimensional grid of the floor plan and two dimensional grid of the wall surfaces will allow a three dimensional configuration of the digital image. Invisible grid threading will allow the computer to treat the two-dimensional photo image as a three-dimensional figure with depth, height, and width. Each individual item to be inserted, such as furniture, is also grid to give spatial dimensions. Various views of each item are stored in the Virtual Décor's database. Once the furniture items are configured to account for the pitch and roll, they are stored in the Virtual Décor database. The end user, a potential home buyer for example, will be able to use Virtual Colorization and Virtual Décor software through easy to use menus.

One feature of the present invention concerns a method for manipulating the digital image on the virtual tour to provide for color changes to a structure. For example, the present invention allows a potential buyer of a home to take the actual photo image of a bedroom and change the colors of the room. As discussed herein, there are numerous other additional features, including but not limited to adding or taking away furniture, fixtures, window dressing, changing the flooring, and adding different cabinet and countertop surfaces.

Taking the changing the color of the room as an example, a potential buyer will be able to take the pre-outlined digital image in the virtual website and modify the colors of the wall. The software available on the website will allow the user to choose whether a preexisting item on the wall, for example a photo album or a wall shelf, should be removed so that the wall appears as a clean slate without the preexisting items. As an alternative, the user will also be able to choose an option that keeps the preexisting item in place despite the change in the color of the wall. This process is accomplished by outlining as will be demonstrated in more detail below.

The virtual website will also allow the user to pick from a variety of options for colors of the wall, as well as for various types of products and textures for the walls. For example, there may be an option for choosing different wall papers. The user may also optionally be able to select a specific type of molding that matches the texture and/or color of the wall.

As an additional example, a user may alter features of an exterior image. For example, a user may be allowed to pick an option for the outer wall, ranging from brick, log, wood, rock, vinyl, etc. The user will also have the option of changing the color through a convenient drop-down box showing the optional colors. The resulting image will hide the underlying structure and appear life-like and realistic. The website allows for a realistic looking modification.

One embodiment of the invention allows users to add furniture. Furniture arranged by type, price, style, color, or maker can be chosen and inserted into the digital image of the room. The resulting image will again appear realistic and will not stand out or look cartoonish. The selected furniture can be dragged and dropped easily into the photo image and it may be moved around at the user's option. Even if the photographic image is a 360 degree panoramic still, the furniture image may be placed at a specific spot within the panoramic image.

As an additional example, a potential buyer may modify the landscape around the exterior image of a home. This will again allow the user to envision the property with the desired landscaping. The Virtual Tour may also contain banner of landscaping companies available in the geographical location. Landscaping items may be categorized for example by type, style, price, landscaping company, etc. For example, the end user may select a category for a pond and select the exact design she wishes. In addition, specific types of trees, shrubs, plants or flowers may be selected and added to the image. The images may be provided by landscaping companies or the user may insert her own image from various sources. The software may allow the user's image to be modified (sized, cropped, and otherwise altered) for placement in the actual image of the house. Thus, the user may take a photo of a tree from an existing property and insert it for use on the website.

Optionally, the user may be directed to the landscaping or vendor company to purchase the desired item. Optionally, the user may submit a request to purchase directly from the Virtual Tour website. Users may select from variety of landscaping features to customize landscaping view. Multiple images can be arranged in a landscape view, and the landscaping image will blend into the overall view. Added images, such as trees and shrubs will appear as if part of the original image.

Furthermore, the user will not need to individually outline or cut-and-paste the image. Pre-existing images can easily be added with methods as known in the art. For example, after picking the desired tree, the user will be able to click on the image and drag-and-drop the image into the actual image.

The Virtual Tour website allows users to quickly and efficiently modify digital images. Optionally, however, users may use any other images not supplied or available on the Virtual Tour website. For example, a user may wish to insert an image of his or her personal furniture. The present invention contemplates the user uploading the desired images, and the Virtual Tour company readying the images for use in Virtual Décor or Virtual Colorization.

Once the digital images are modified, various known methods for storing the modified the image is contemplated as known in the art. For example, the user may simply forward the webpage by email to her account. In an alternative embodiment, the Virtual Tour website will allow a user to create an account (free or for charge) and store the modified image. Specific pages of the website may also be bookmarked for easy access at a later time.

Optionally, as described herein, additional items available for modifying the digital image include, but is not limited to: furniture items (Furniture items (tables, chairs, sofas, lamps, plants); walls (boarders, crown molding, floor molding, columns)—Ceiling (recessed); wall fixtures (cabinets, framed photos, etc.); flooring (wood, carpet, tiles, rugs etc.); appliances (refrigerators, stoves, etc.); structures (fire places, arches, etc.); fixtures (doors, windows, chandeliers, bars, fans, faucets, etc.); plants; lighting equipment; window treatment (curtains, blinds, shades, etc.); exercise equipment (treadmill, weight machines, etc.). An advantage of listing multiple vendors is also that the consumer will benefit from competitive pricing.

Example of Virtual Décor and Virtual Colorization

Figure 36:
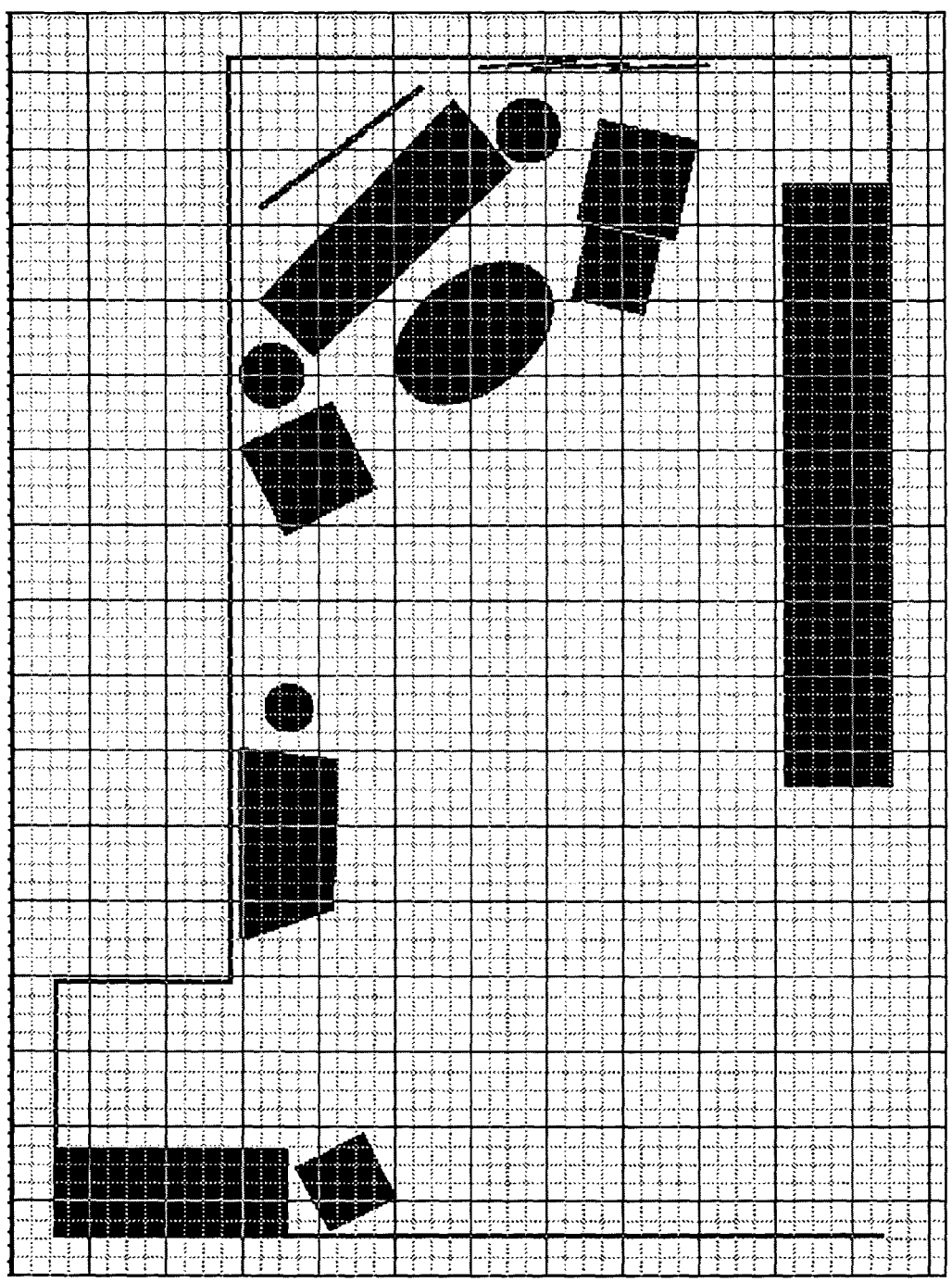
FIG. 36 is a two-dimensional layout of a floor plan of a room.

Shown in FIG. 36 is a two dimensional graph of a floor plan of a room. The floor plan or the two dimensional floor grids shown in FIG. 36 calculates the layout of the floor space. Each of the larger squares in the graph represents a square foot of the floor. As discussed below, laying the two dimensional grid allows the Virtual Décor software to figure out the three dimensional layout of the room.

Using a graph paper as shown in FIG. 36, the layout of the room is entered. This can be done by manually or can be done automatically. In one example, using a graph paper as shown in FIG. 36, the Sketch It software is used to draw the two dimensional graph of the room. The outer lines in FIG. 36 represent the outline of the room's floor space. The dark objects within the lines represent the furniture layout of the room. Since each square represents a square foot, the dimensions of the room may readily be recognized.

Figure 37:
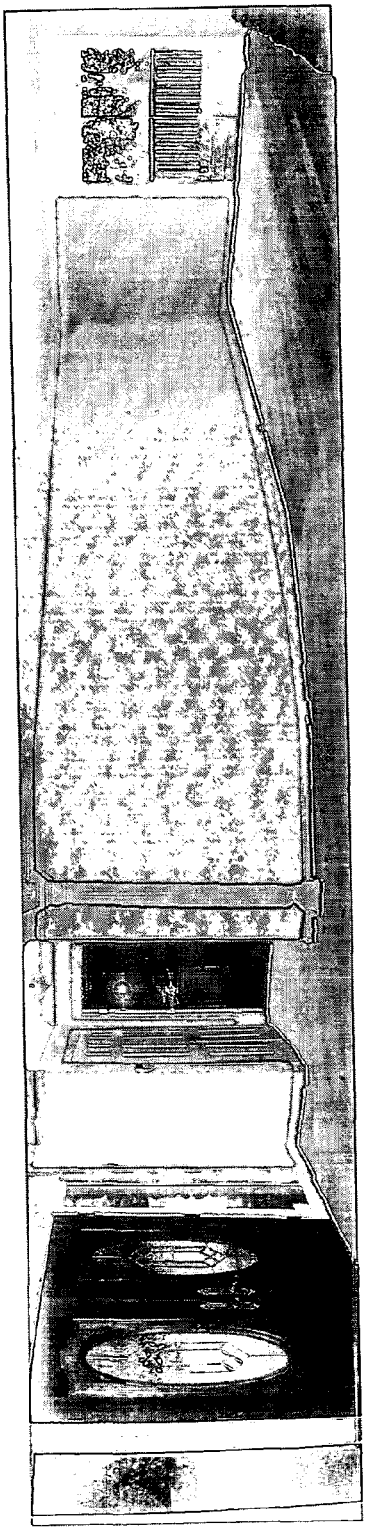
FIG. 37 is an image of a room that has been outlined for Virtual Colorization.

FIG. 37 shows a room that has been outlined in preparation for Virtual Colorization. The borders of contiguous surfaces, such as different portions of a wall, the ceiling, the floor, the column, the doors, etc., are outlined. Starting with a digital image (TIFF, JPEG, PSD, etc.) of the room as shown in FIG. 37, borders of discrete portions of the room are outlined. An outline generally traces the outer edges of the different portions of the room. Outlining (as well as placing the grids as discussed below) is done prior to the end user viewing the digital images of the homes on the Virtual Tour website.

Preferably, a pen tool is used for outlining, but any other methods as known in the art may be used. The process can also be automated for the Virtual Colorization software to recognize natural outlines of the room. Once the software makes a preliminary outlines, the preparer can examine the outlines and modify, delete or keep the different outlines.

Looking at the faux column on the back wall of FIG. 37, the small wall portion to the left of the faux column is outlined separately from the faux column. The faux column is also outlined separately. Then, looking at the wall portion to the right of the faux column, that wall portion is next outlined. Next the sliding glass door is separately outlined, and so on.

Using the Virtual Colorization software, the area inside an outline (or more than one outline) may be altered or changed. For example, the Virtual Colorization software can add a new color for one or more outlined portion of the wall or for all the outlined walls; add a new floor treatment, tile, or carpet; change the color of the flooring, among others.

Once the outlines are in place, the Virtual Colorization software replaces the entire area within the selected outline. Thus, if a window is present within an outline of a wall but was not separately outlined within the wall, the window will disappear when the color of the wall is changed since the new color is added to everything inside the outline. But if the window is separated out within the outline with a separate outline, changing the color of the wall will not change the appearance of the window. Thus, to preserve any structural items, these items should preferably be outlined separately.

Outlining may even alter and modify the structural and architectural elements of a digital image. Since the Virtual Colorization covers over everything within an outline, the outlines may change the actual layout of a room to virtually modify the structure of a room. For example, the large wall space in FIG. 37 (to the right of the faux column) may be modified to alter the height of the walls at any place. The horizontal line where the wall and the ceiling meet may be modified by outlining the line at a different place. For example, the line where the ceiling and the wall meet may be sloped up to create the shape of a vaulted ceiling (not shown in FIG. 37). Because the masking covers everything within the new (modified outline), when a new wall color is inserted into the outline, the room will appear as if having a vaulted ceiling.

Furthermore, outlining will enable the Virtual Colorization software to add new structural items. For example, to input crown molding into a room, an outline of the crown molding can be inserted in the appropriate place. Coloring the crown-molding outline will make the room appear as having white moldings. But as described, to the extent that architectural elements are outlined and preserved, they will remain the same as in the original, actual image.

Once the outlines are placed, various known software may be used to insert different colors and structural items for use in the Virtual Colorization software. Such known softwares may also be able to automatically account for the shading and differences in color gradient within an outline. The software may detect subtle lighting and color differences within the outline and adjust accordingly. The shadowing effect provides more realistic results.

Once a photo image of a furnished room is outlined, the furniture can be removed by re-coloring all the walls and the floor. The structural elements of the room that have been separately outlined are preserved as discussed. This blanking allows the end users to start with a blank slate of a room and to insert furniture and other furnishings of choice.

Figure 38:
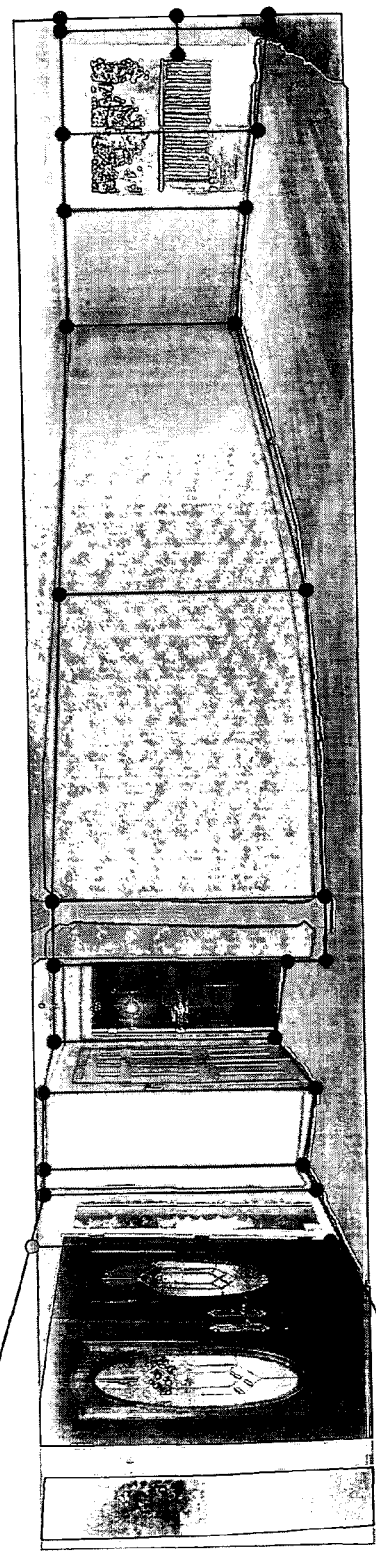
FIG. 38 is an image of a room that has been prepared for gridding with dots and lines for the outer edges of each grid.

Outlining of digital images, as shown in FIG. 37 is not necessary, but helpful, for making the vertical space grids seen in FIG. 38. Outlining is used mainly for Virtual Colorization. It is not necessary for making the three dimensional grid shown in FIGS. 39 and 42 as discussed below. Outlining does, however, provide convenient reference points for constructing the vertical grids of FIG. 38.

Figure 42:
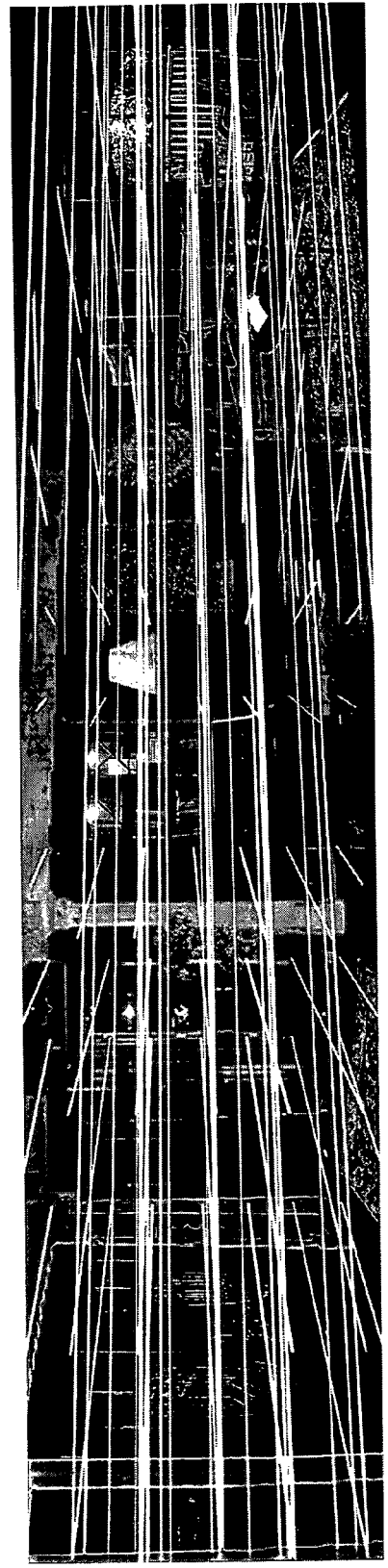
FIG. 42 is an image of a room that shows the grid threading.

A variety of known methods for assigning spatial dimensions may be used. One embodiment used in Virtual Décor is described as follows. Grids or graphs are placed on the vertical surfaces and the floor space of the room in FIG. 39. This allows for the setting up of a three dimensional grid or a three dimensional spatial system as seen in FIG. 42. As with the outlining, the grids are placed in the photo before the end user (such as a potential real estate buyer) sees the prepared images.

Figure 39:
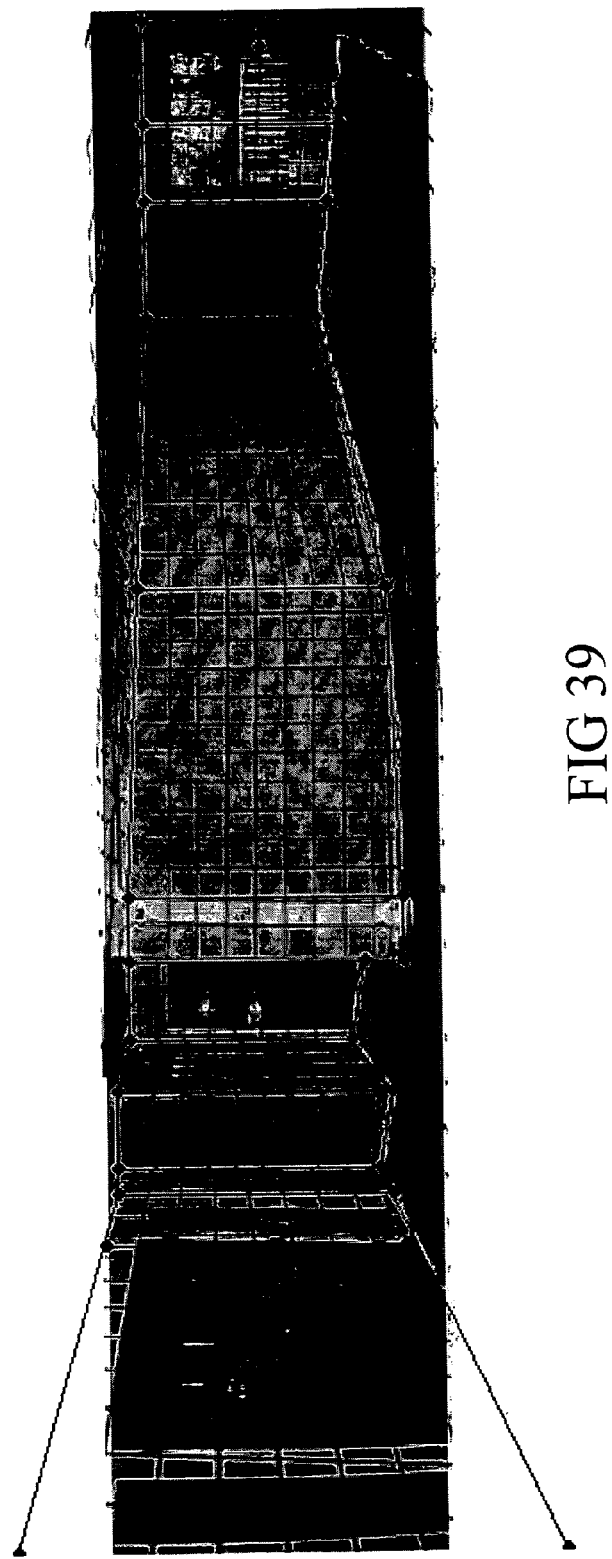
FIG. 39 is an image of a room whose vertical surfaces and floor space has been graphed or grid.

Before the vertical grid system in FIG. 39 is laid out, the outer edges of the grids are prepared. This can be done again either manually using a pen tool or can be done automatically. The dots at first placed at the edges of the blocks for the grid. The dots are then connected manually or automatically with a line. The lines may be altered as desired. Grids can be placed at the outer edges of the photo images. For example, a dot (not pictured) may be placed at the lower right corner of FIG. 38 and connected by a line to a dot (not pictured) at the bottom midsection of the front doors on the bottom edge of FIG. 38. This may further help the Virtual Décor software calculate the square footage of the floor. The two-dimensional grid in FIG. 36 may also be used as described. Furthermore, the grid can be placed beyond the photo image as seen in the left most portion of FIG. 38. The final grids, however, may preferably only graph what appears in the image. The dots and lines in FIG. 38 disappear when finished. Once the outer edges of the vertical grids are put in place, the Virtual Décor software automatically graphs these grids as shown in FIG. 39.

Closer objects in a photo image will appear larger. Thus, to accurately deal with depth perception, personnel preparing the grids enter the dimensions for the lines in FIG. 38. For example, the Virtual Décor is told that all the vertical lines from the floor to the ceiling are 9 ft. Even though the vertical lines by the sliding glass doors appear shorter in height than the vertical lines by the faux column, the computer is told that these vertical lines are all 9 feet. Thus, the computer accounts for the difference in view and perspective.

Some photo images may require additional attention. 360 degree images, for example, may appear distorted. For some 360 degree images, multiple still images are pieced together. With these images, care should be taken to ensure that the proportions should coincide in areas where the photos merge. In other 360 degree images, one continuous 360 degree photo is taken by special cameras. These photos often show distortions in the photo. The Virtual Décor software may automatically detect these distortions. In other embodiments, the constant height of the walls should be specified to insure uniformity despite the distortions.

In the vertical grids shown in FIG. 39, each of the different grids can be assigned different identifiers or names. Once the dotting and lining of FIG. 38 is completed, the gridding can be accomplished by instructing the Virtual Décor software to insert the grids. The computer will assign the square footage graphs as seen in FIG. 39. The vertical grids and graphs provide the z-axis (of the three dimensional area within the room.

The Virtual Décor software places items only on the inside of the grids. The space outside of the grids, i.e. outside the room, does not have any spatial orientation, as the outside area would be missing one or more of the x, y and/or z-axis required for spatial positioning.

Figure 40:
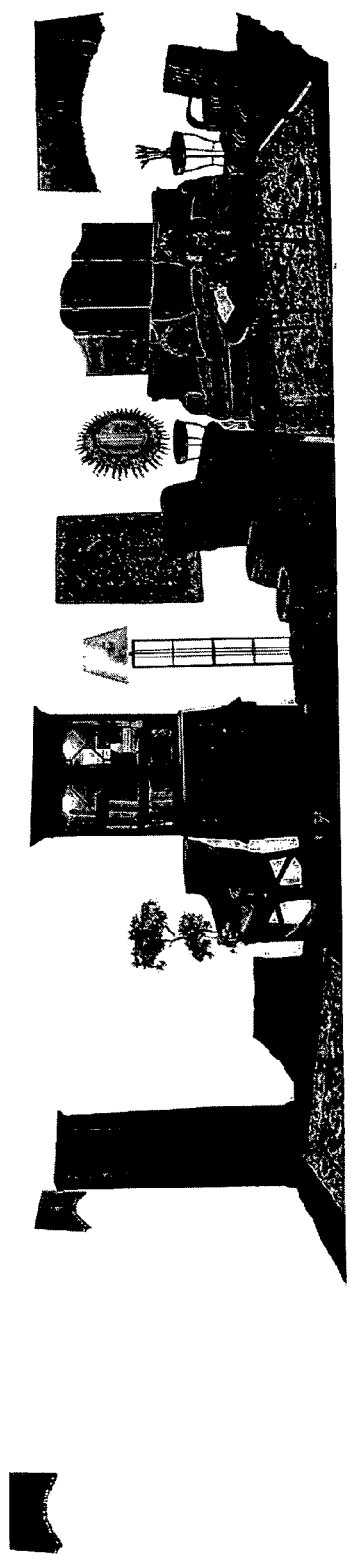
FIG. 40 is an illustrative example of furniture pieces placed within a gridded virtual room.

FIG. 40 shows how different furniture items may be moved within the room. As will be discussed below, furniture pieces may be placed within the three dimensional grid of the room. FIG. 40 is an illustrative example of different furniture items having been inserted into the room. (Vertical surfaces, such as walls and ceilings, are not shown for illustrative purposes). The Virtual Décor contains a database of pre-stored and pre-treated images (as discussed below) that may be quickly and easily be inserted and modified.

Figure 41:
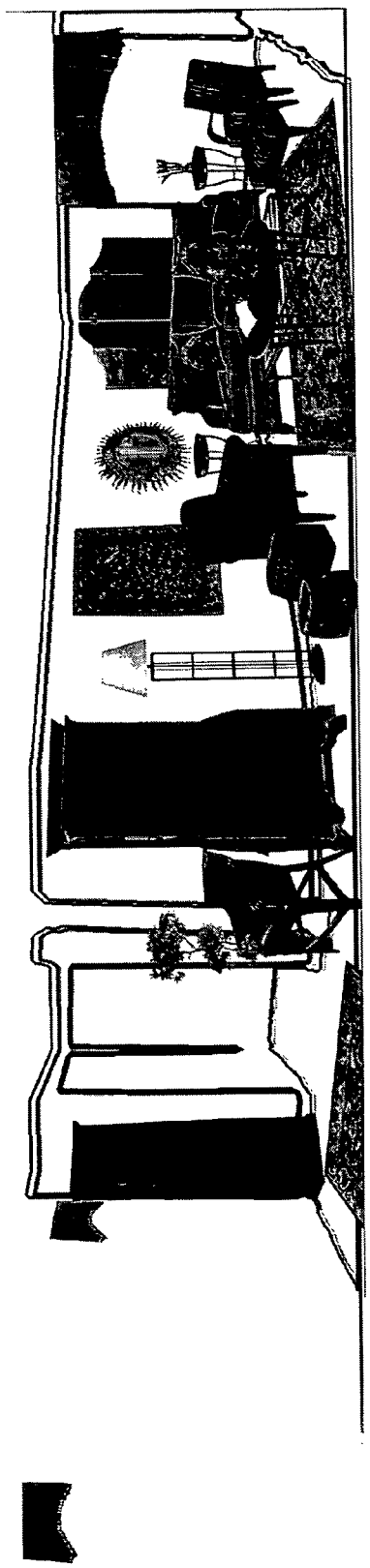
FIG. 41 is an illustrative example of furniture pieces placed within a virtual room, showing the outlining.

Therefore, the digital images of a home (or other real estate property) is prepared by outlining the room, changing the colors and the surfaces of the outlines, optionally coloring over the room to empty the room, inserting the vertical and flooring grids, and inserting the furniture (or other) items. FIG. 40 shows one example of how different furniture images may be inserted. FIG. 41 additionally shows the outline of the room. The background has been blanked out to illustrate the outlines and the furniture items inserted using Virtual Décor.

After the walls have been grid as seen from FIG. 39, the software is told to grid the entire room in three dimensions as seen in FIG. 42. The Virtual Décor software inserts the white threads seen in FIG. 42. The entire room is now spatially mapped with each cubic foot having identifiable location and exact spatial orientation. The spatial positioning system is now complete. The white lines that appear in the image are the grid threading, which disappears when the image is in use for Virtual Décor. The visitors or end users, who use the Virtual Décor, preferably do not see the grid threading. Notice that the three dimensional grids account for depth perception and points of view. For example the cubes appear to be viewed at different angles and the cubes become smaller further into the room.

Figure 43:
FIG. 43 is an image of a room that shows the grid threading and shows the initial stage of placing a chair as shown.
Figure 44:
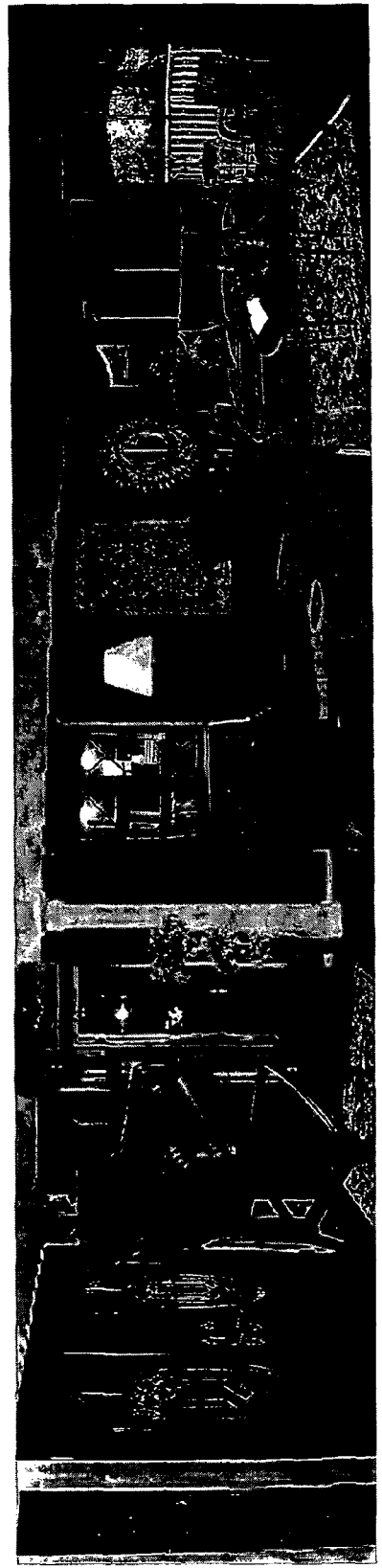
FIG. 44 is same as the image in FIG. 43 without the grid threading being visible.

As will be explained in more detail below, the first step in placing a piece of furniture inside the grid system is shown in FIG. 43. In this embodiment, as a default, the furniture to be placed (the chair) appears in the grids closest to the front of the image as seen in FIG. 43. The end user does not see the grid threading. FIG. 44 is the same image as FIG. 43, except for the grid threading being invisible.

From the initial positioning of FIG. 44, the chair can then be moved anywhere in the room as seen in FIG. 45. The chair in FIG. 44 has been rotated 180 degrees. As will be discussed below, each item stored in the Virtual Décor database will have multiple views. The end user will be able to choose the desired view of the chair. Furthermore, the chair is moved to the desired location within the room. In one embodiment, the chair is told to move to specifically identified grids. In another embodiment, the chair is moved to the desired location using control mechanisms such as a mouse or keys. For example the arrows in the keyboard can be used to move the chair back and forth and side to side in the image. Using the arrows in conjunction with the control button may also move the image of the chair up and down vertically in the room. In another embodiment, the mouse can be used alone or in conjunction with one or more keys to move the furniture item to its desired location. Any suitable known methods may be used.

As discussed, the three dimensional grid accounts for depth variances. As furniture pieces are moved back in the image, they should appear smaller, and vice versa. Thus, the computer software of Virtual Décor accounts for the size of the furniture piece.

Figure 46:
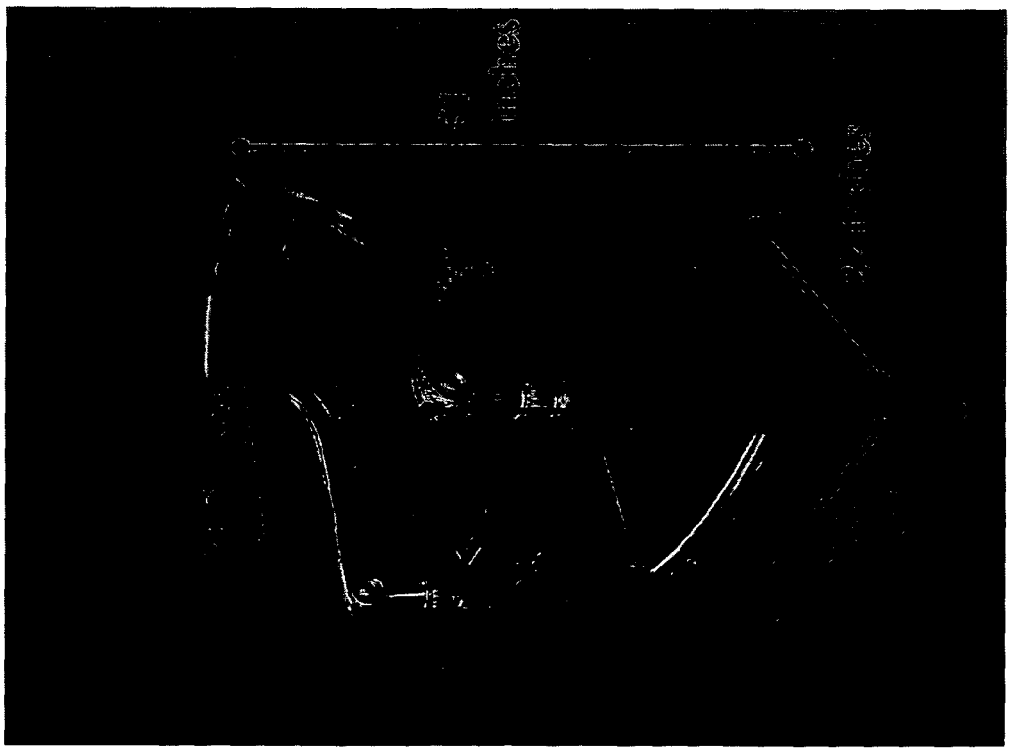
FIG. 46 is an image of a chair showing its dimensions.

FIG. 46 shows one embodiment used to measure the size, volume, and shape of a piece of furniture. In FIG. 46, the length, height and width of the chair are identified. This can also be done automatically by the computer. Thus, the spatial dimensions of the chair is known by the Virtual Décor software, and when the chair is moved around inside the three dimensional grid, the software adjusts the size of the chair accordingly.

Figure 47:
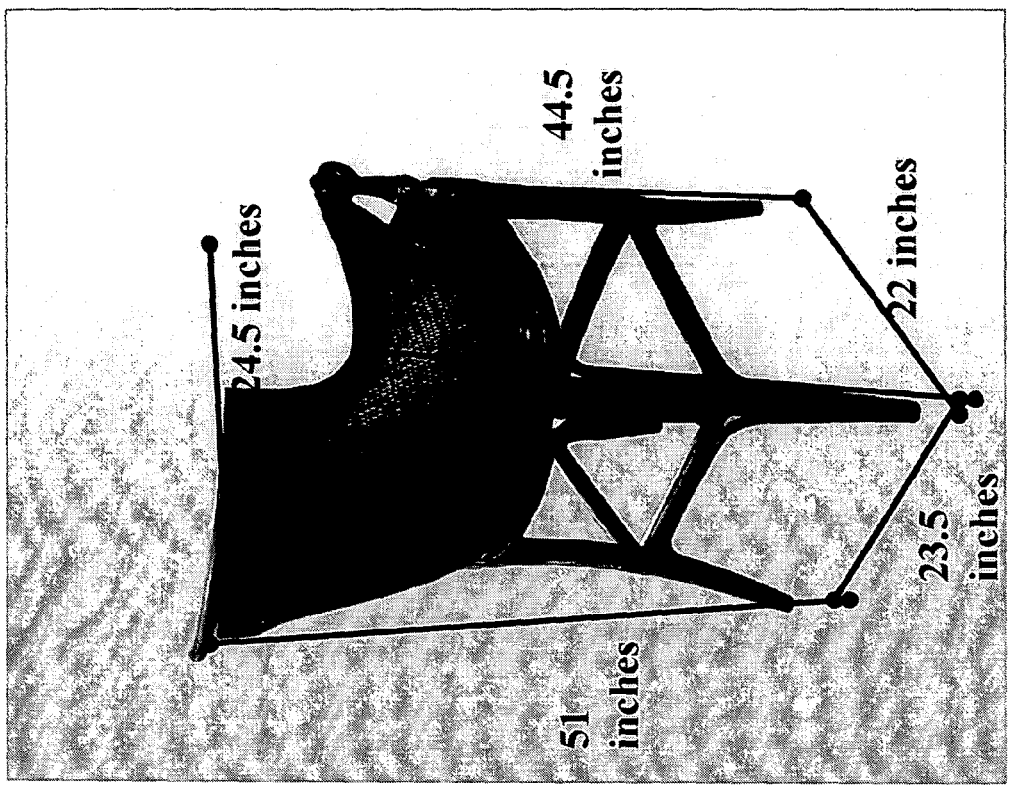
FIG. 47 is another image of the chair in FIG. 46.

FIGS. 46 and 47 show 180 degree perspectives of the same chair. In one embodiment, multiple images of an individual furniture pieces are inserted into the Virtual Décor database. Approximately 4-10 additional images of the chair of FIGS. 46 and 47 are inserted into the database. The Virtual Décor software then uses these images and makes duplicate mirror images to create the entire 360 degree perspectives of the chair.

The floating images of the chair in FIGS. 46 and 47 may initially be cut out from PDF or PSD files for example so the furniture piece may appear to be floating without any background. These and other known programs can be used to remove the background. Thus, when a piece of furniture is placed in a room using Virtual Décor, the background shows through the empty spaces within the chair as seen in FIG. 45.

Figure 48:
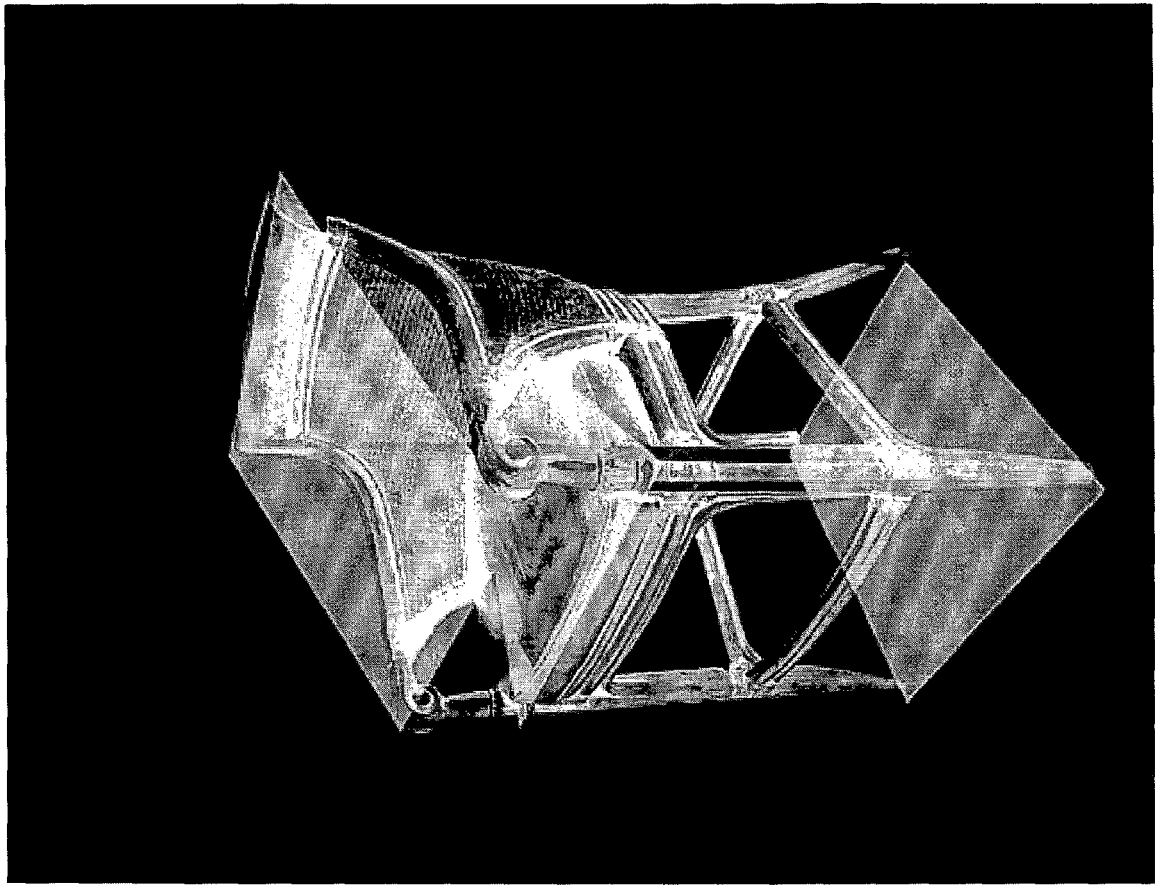
FIG. 48 is an image of the chair enclosed in a three dimensional box.

In one embodiment as shown in FIG. 48, the Virtual Décor software may create a three dimensional box around the furniture. The bottom of the box, for example, may then serve as a point of reference for contact with the flooring in the grid.

Figure 49:
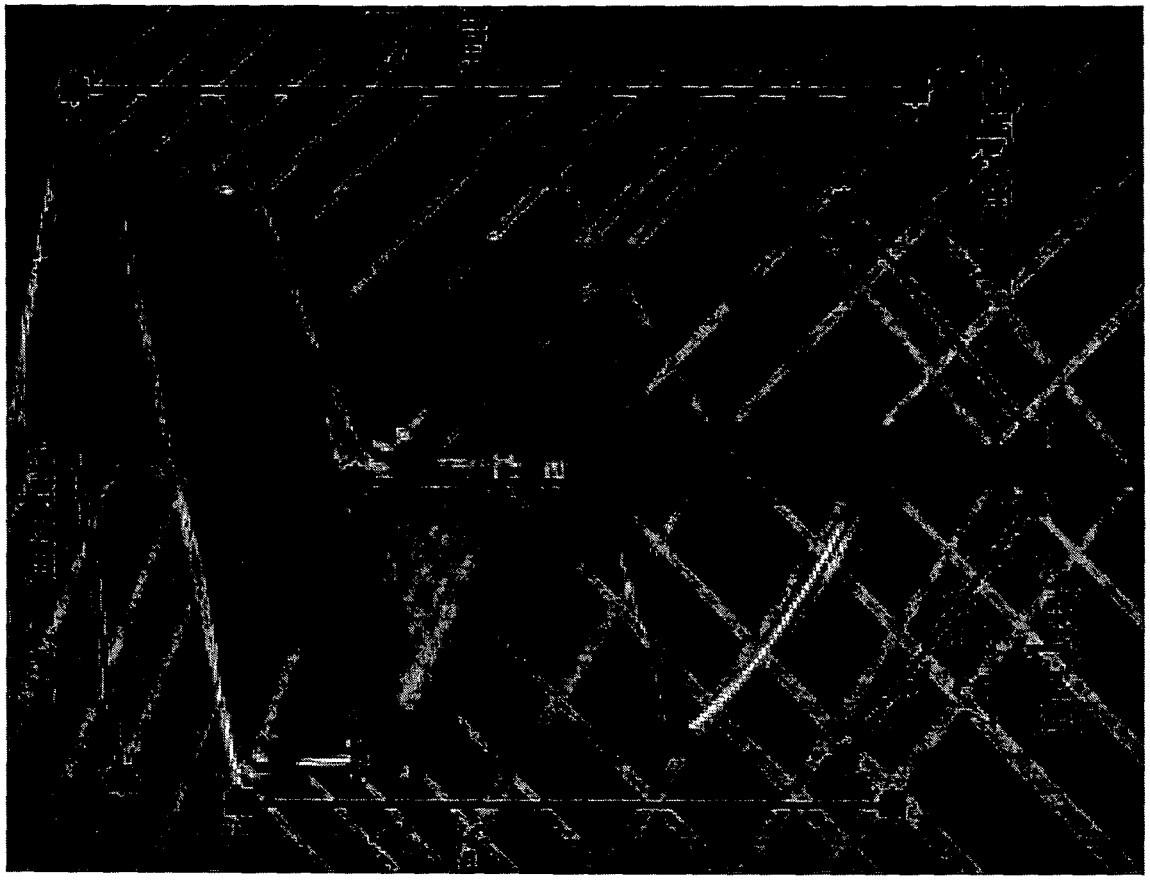
FIG. 49 is an image of a chair that has been grid to be able to pitch and roll when inserted into an image of a room.

The items to be inserted into the room should preferably be able to pitch and roll. Digital images of an interior room may be taken from different angles. Thus, if the photo is taken from a higher vantage point, more of the flooring will appear in the image, whereas if the photo is taken from a lower vantage point, less of the flooring will appear in the image. The furniture images inserted into the room should account for these differences to appear natural. The Virtual Décor software is able to account for these differences. FIG. 49 shows how each piece of furniture image stored in the database may be prepared to account for the pitch and roll. Any other suitable known methods for enabling pitch and roll may be used. Depending on the image of the room being used, the chair in FIG. 49 may need to pitch and/or roll. For example, the right arm rest may need to be lowered and the left armrest may need to be raised to insert the chair image into a room to match the perspective of the room.

In the embodiment shown in FIG. 49, the Virtual Décor software images the chair using a pitch-and-roll grid. The lines meet at a central reference point in the image. Here, the front left leg of the chair is used as the reference point. Thus, the threading in the pitch-and-roll grid meets at about this point of reference. The Virtual Décor software preferably automatically inserts the pitch-and-roll grid for each piece of furniture view. Thus, this process is preferably repeated for the different images or views of the same piece of furniture.

For each individual furniture item, after assigning the three dimensional perspective and assigning the pitch and roll, all the different views are stored in the Virtual Décor database. Thus, once this process is completed for each furniture item, the furniture images can be used over and over to decorate all the different rooms using Virtual Tour, Virtual Colorization and Virtual Décor.

Figure 50:
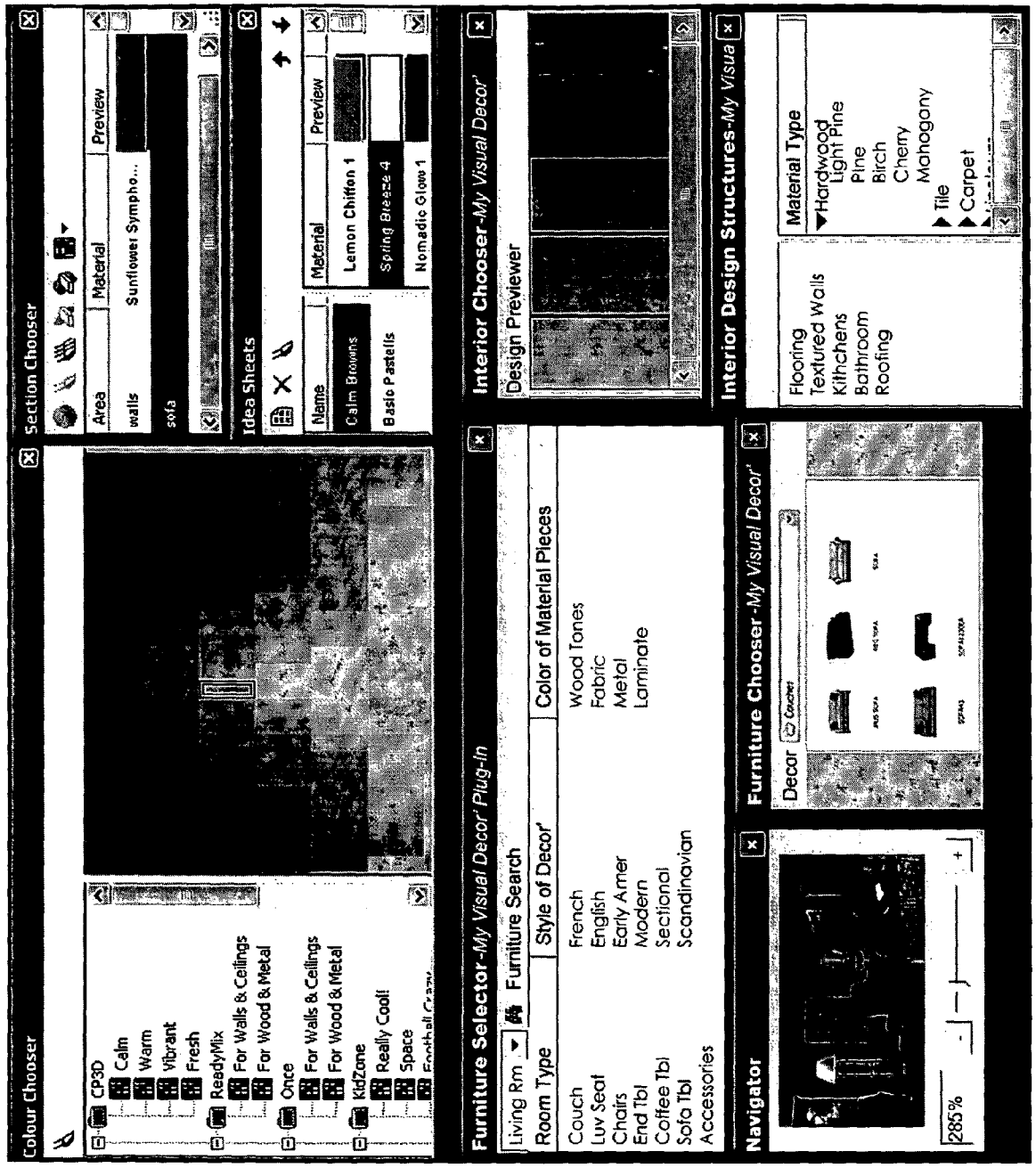
FIG. 50 is a collection of menus for used in Virtual Décor and Virtual Colorization.

FIG. 50 shows one embodiment of menus used in Virtual Décor and Virtual Colorization. When the Decorator icon is selected from FIG. 51, the menus in FIG. 50 appear. The different menus in FIG. 50 may appear together as shown or in groups as desired. These menus may be viewed with the image of the room shown in FIG. 51 while being modified by Virtual Décor or Virtual Colorization.

Going counterclockwise from the upper right corner, the first menu is the Section Chooser used for Virtual Colorization. For example, the Area chosen may be the walls. As seen here, Virtual Colorization is used not only for painting surfaces, but also may be used to insert wall treatments, flooring, and other optional features. Here, wall paper chosen in Sunflower Symphony. The preview menu gives the user a quick glimpse of the chosen option.

The second menu is the Color Chooser used with Virtual Colorization. Various colors can be grouped into different categories. For example, as shown, pre-set color swatches appear on the right side of the menu to easily illustrate the available colors. The colors are grouped by characteristics.

Options groups include ReadyMix, which allow users to mix their own individual colors, and KidZone, which show colors that are more children oriented. Selecting the desired color on the color swatches from the right side of the Colour Chooser selects the color.

The next menu is the Furniture Selector menu used for selecting the desired furniture in Virtual Décor. Optional selections for the Virtual Décor may include as discussed landscape items for the exterior of the home, fixtures such as lighting and window treatments, etc. In FIG. 50, the Living Room option has been chosen in the Furniture Selector Menu. Furthermore, the Room (or Furniture) Type has been chosen as a Couch and the Style Décor, which further divides the available types, has been selected as Sectional. Finally, the Color of Material Pieces has been chosen as Fabric.

The next menu in the lower left hand corner of FIG. 50, titled Navigator, previews the sectional couch as would be incorporated in the photo image of the Virtual Décor. The couch in the Navigator shows the final results after the couch has been moved into place. The Furniture Chooser further displays individual couch images. As the different selection in the Furniture Selector menu is changed, these furniture images change accordingly.

Next, the Interior Design Structures menu allows for modification of internal structural design items in the Virtual Décor and Virtual Colorization. In FIG. 50, various types of structural options, ranging from Flooring to Roofing, are shown. Under the Flooring option, further categories such as Hardwood, Tile, and Carpet are shown. Each of these categories is further subdivided into subcategories as shown. As discussed, various optional features, even those not featured, are contemplated by the present invention.

With the selection of Hardwood in the Interior Design Structures menu, the next counterclockwise menu, the Interior Chooser menu offers illustrative examples of the different types of Hardwood, ranging from Light Pine to Mahogany. The user will be able to preview the actual color of selected Hardwoods.

Finally, the Idea Sheets menu of FIG. 50 gives additional color options that are available for use with the Virtual Colorization software.

Figure 51:
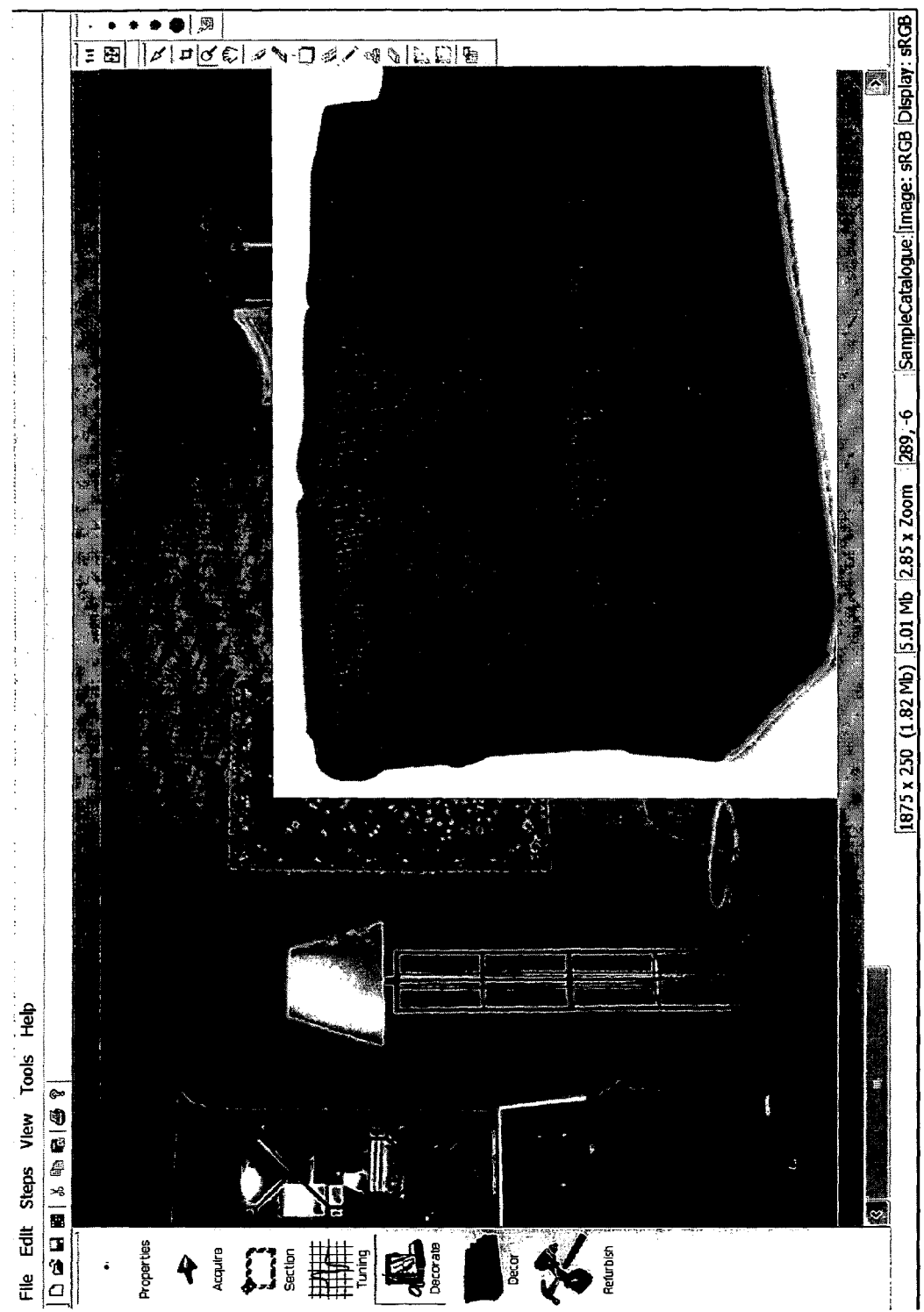
FIG. 51 is an image of a room in Virtual Tour, which has a couch selected for insertion.

FIG. 51 shows the initial appearance of the Virtual Décor webpage when the user selects the couch (selections Living Room, Couch, Sectional, Cloth, etc. in the Furniture Selector menu) as shown in FIG. 50. Initially, the image of the couch appears within a box with a white background to denote that this image is being added. The white background box disappears when the couch is selected on the webpage. Optionally, the couch may appear without the white background.

Figure 52:
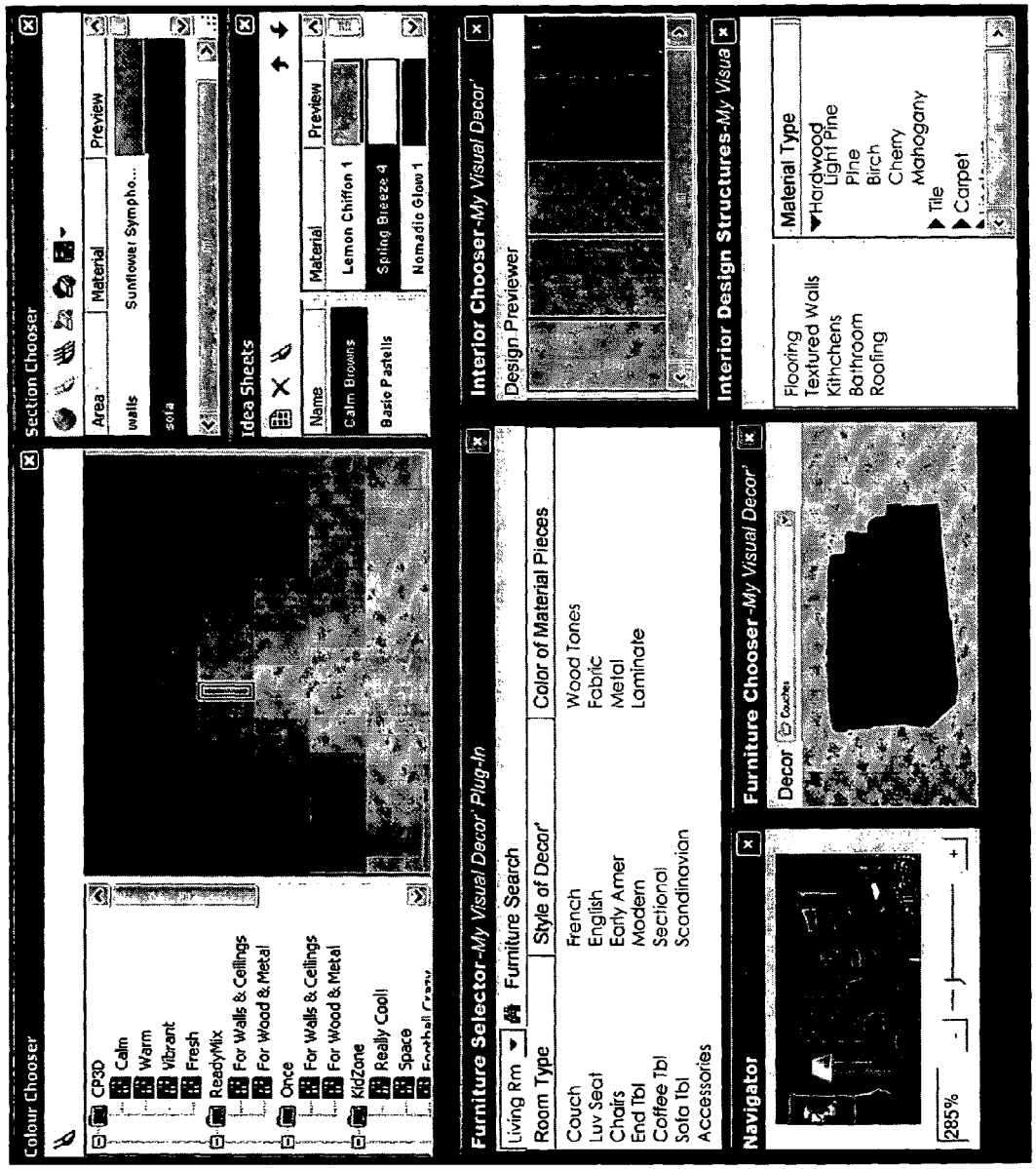
FIG. 52 is the collection of menus in FIG. 50, showing that a specific couch has been selected in the Furniture Chooser menu.

FIG. 52 shows the couch being selected in the Furniture Chooser menu (at lower middle). When this specific couch was selected, the remaining optional items may optionally disappear as shown in the Furniture Chooser menu of FIG. 52.

Figure 53:
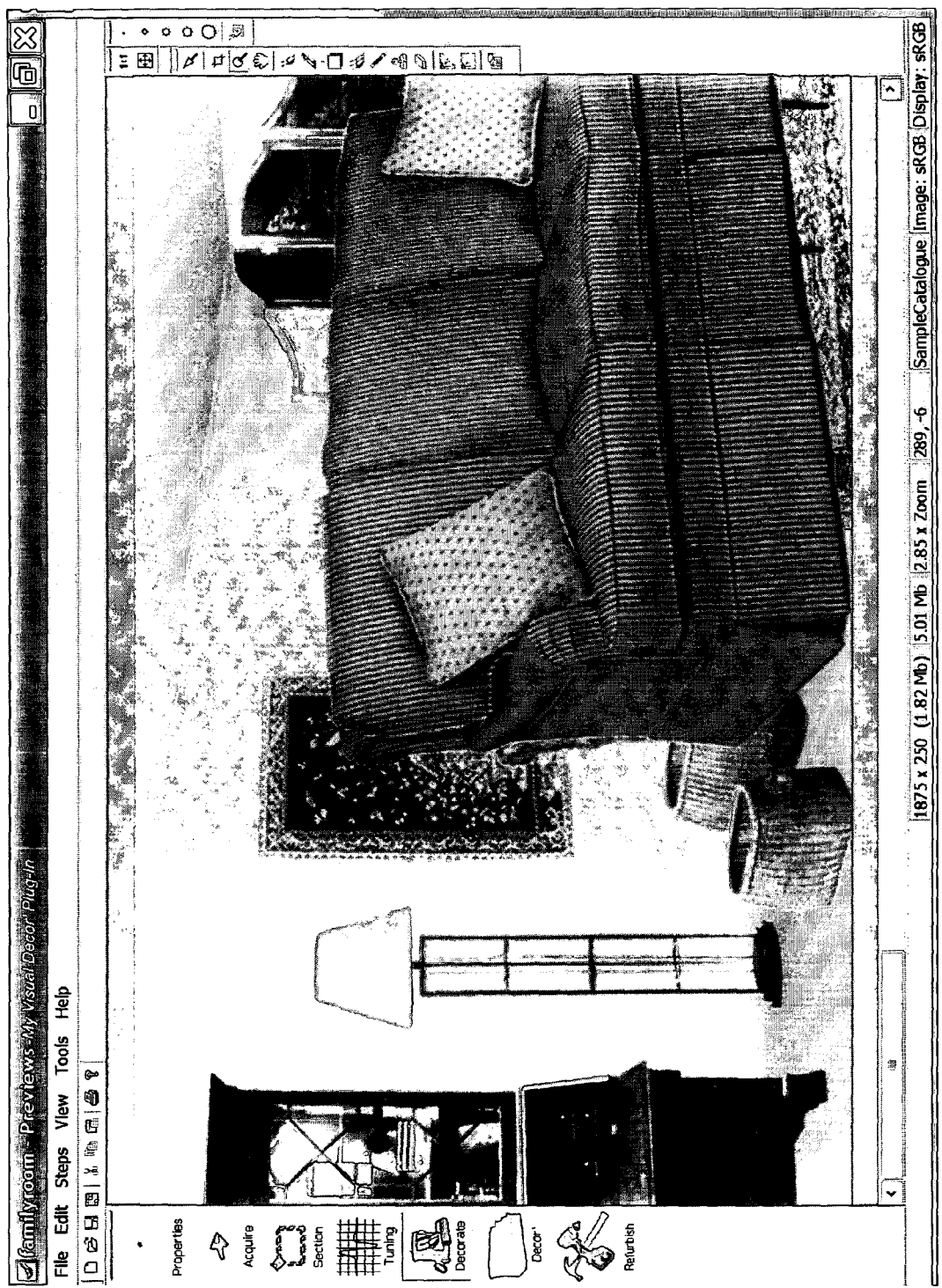
FIG. 53 is the same image as in FIG. 51 without the white background box around the couch.

FIG. 53 shows the couch without the white background box. The couch initially appears large and may need to be resized. The couch may also be resized automatically. As described, the furniture appears initially in the most forefront grid boxes. Although the grid threads are not visible in FIG. 53, the room has already been grid to include the threads.

Figure 54:
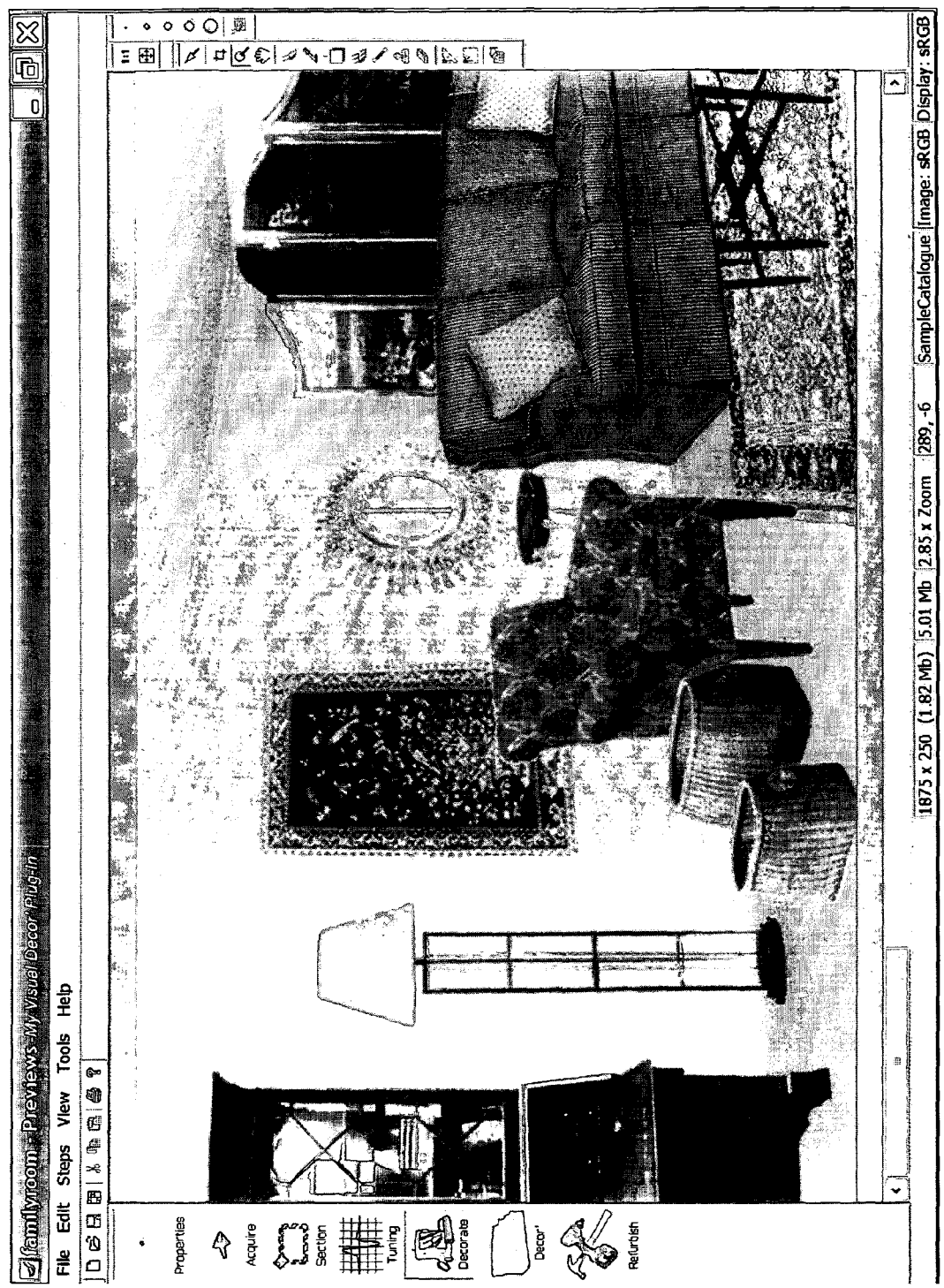
FIG. 54 is an image of the room with the couch placed in its desired location or grids.

Using the controls as discussed or by telling the couch to move to a specific location in the room as discussed, the user places the couch in the desired location of the room as shown in FIG. 54. As seen in FIG. 54, parts of the couch and the coffee table share some of the boxes within the grid. When this happens, the user can instruct the Virtual Décor software which item should appear in front and which item should appear in the back.

Figure 55:
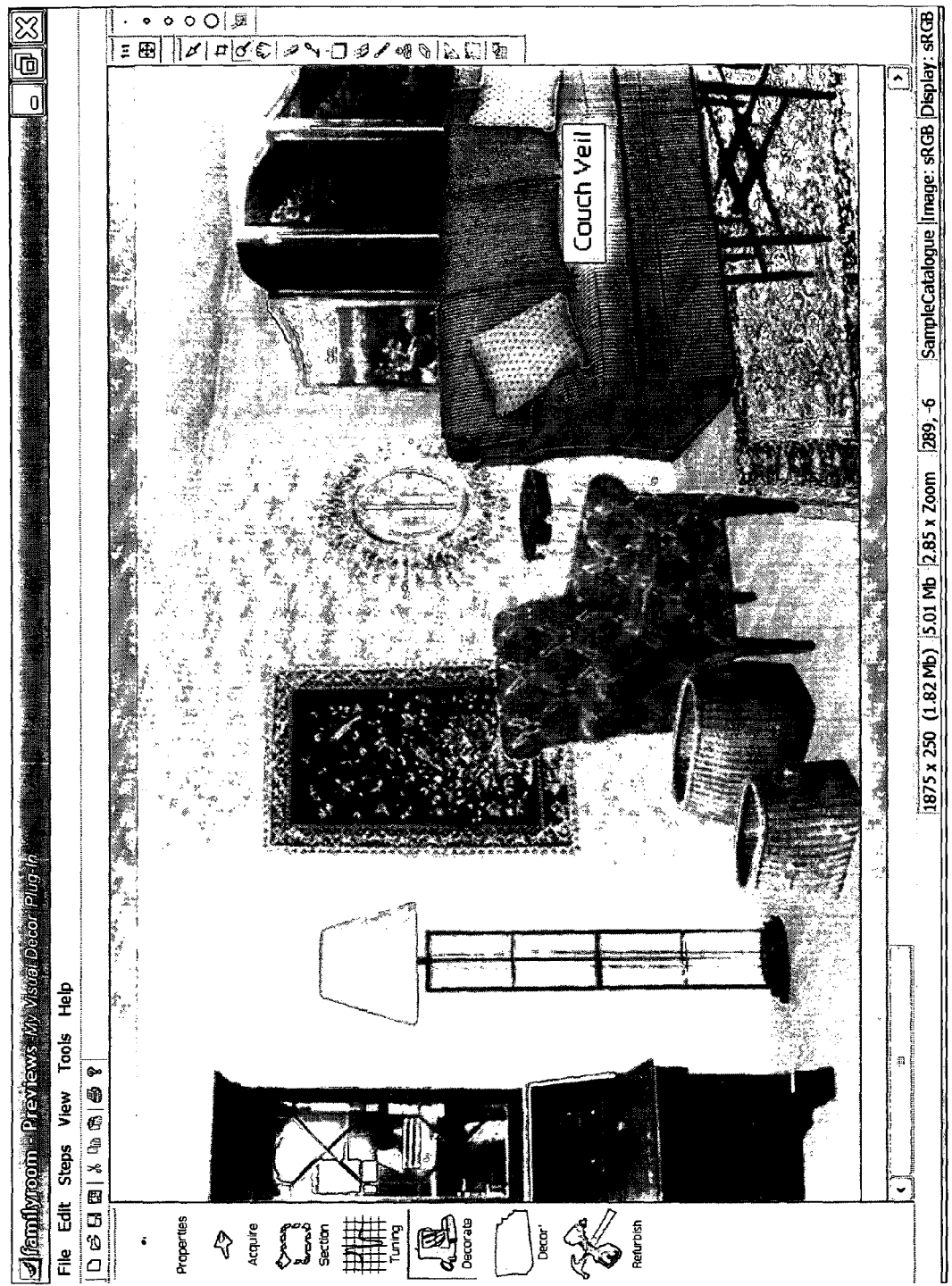
FIG. 55 is the image of FIG. 54 with the Veiling option selected to move the couch to appear behind the coffee table.
Figure 56:
FIG. 56 is the image of FIG. 55 with the coffee table appearing in front of the couch after veiling (also has an added couch cushion).

In the embodiment shown in FIG. 55, right clicking a mouse over the couch with the user's mouse pops up a signal for "Couch Veil". Scrolling the mouse forward or backward tells the Virtual Décor software whether the couch should appear in front or behind the coffee table. Other methods as known for staggering the images may be used. The result of proper "veiling" is shown in FIG. 56. Here, the couch appears properly behind the coffee table while being in front of the room divider shown behind the couch. In addition, FIG. 56 shows an additional seat cushion having been added to the couch.

Figure 57:
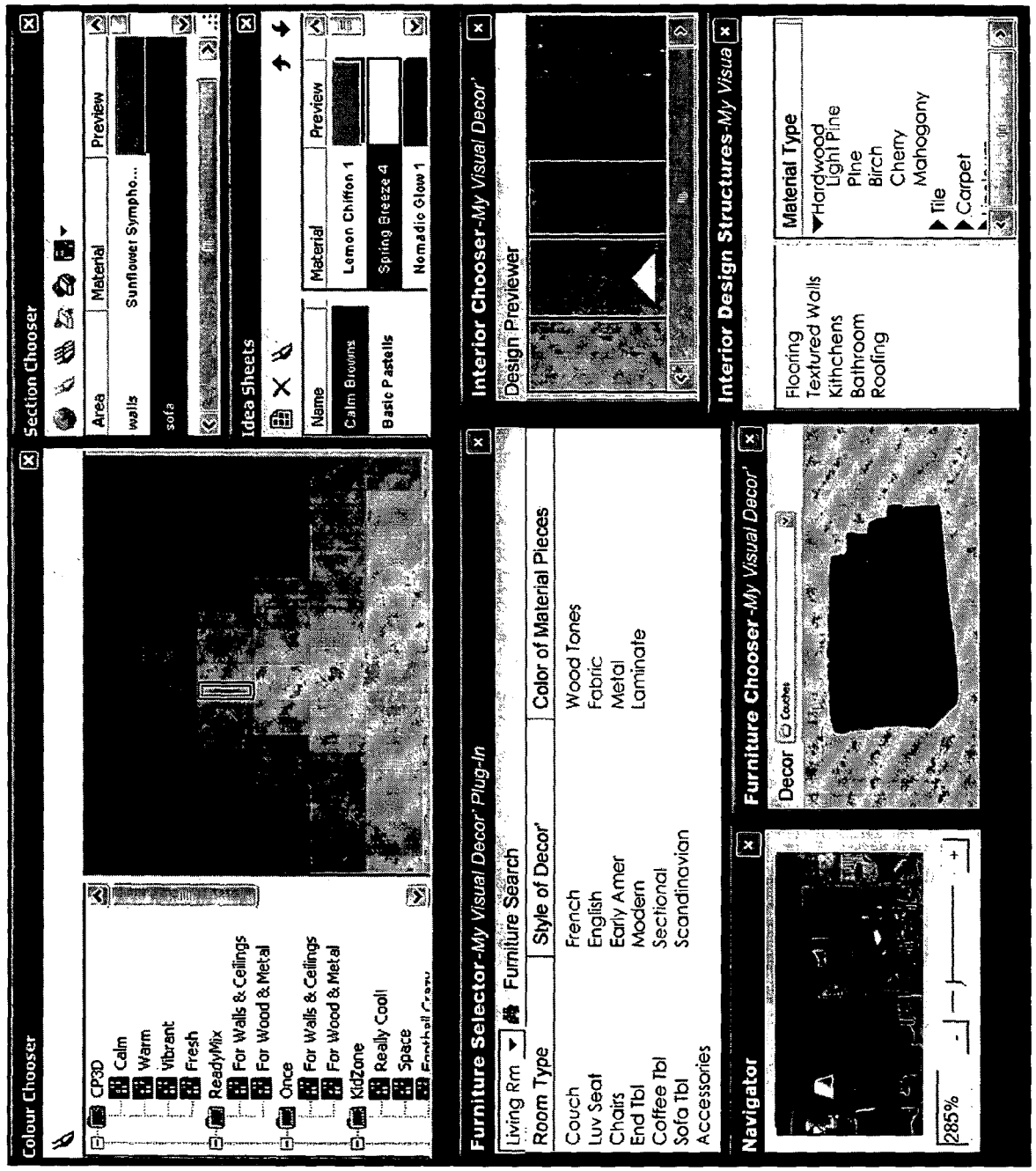
FIG. 57 is the collection of menus in FIG. 52, with the Hardwood option selected in the Interior Design Structures menu.
Figure 58:
FIG. 58 is the image of FIG. 56 with the floor having been changed to hardwood.

FIG. 58 shows that the flooring, for example, has been changed from the same room shown in FIG. 56. As seen in FIG. 57, the Interior Design menu at the lower right hand corner has been modified. Selecting the Flooring, and more specifically the Hardwood option, and more specifically Light Pine colored Hardwood option, the room in FIG. 58 shows the room in FIG. 57 now having a light-pine colored hardwood floor. The color of the wall may be changed as well using the optional features shown.

Figure 59:
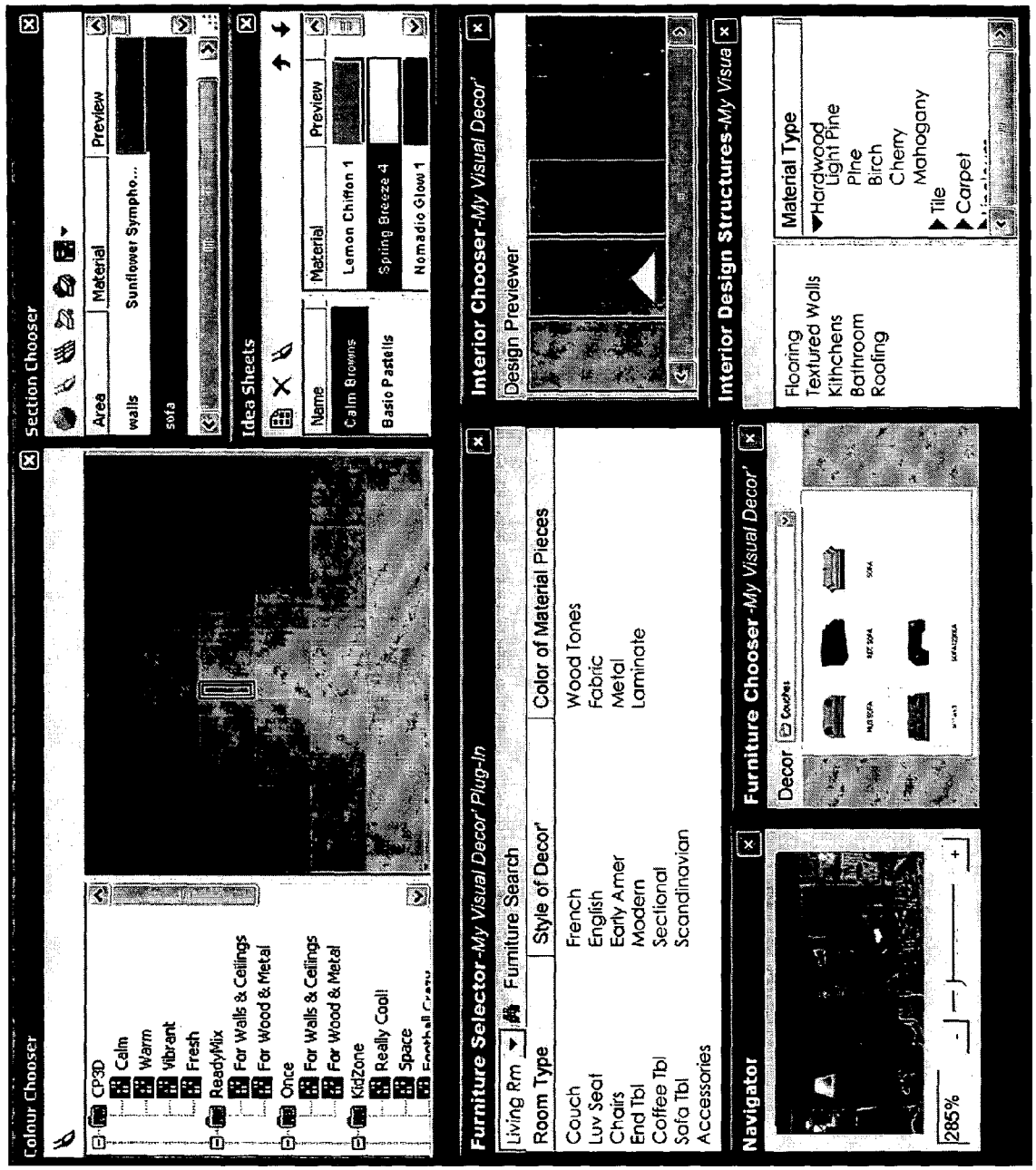
FIG. 59 is the collection of menus in FIG. 57, with a different couch selected in the Furniture Chooser menu.
Figure 60:
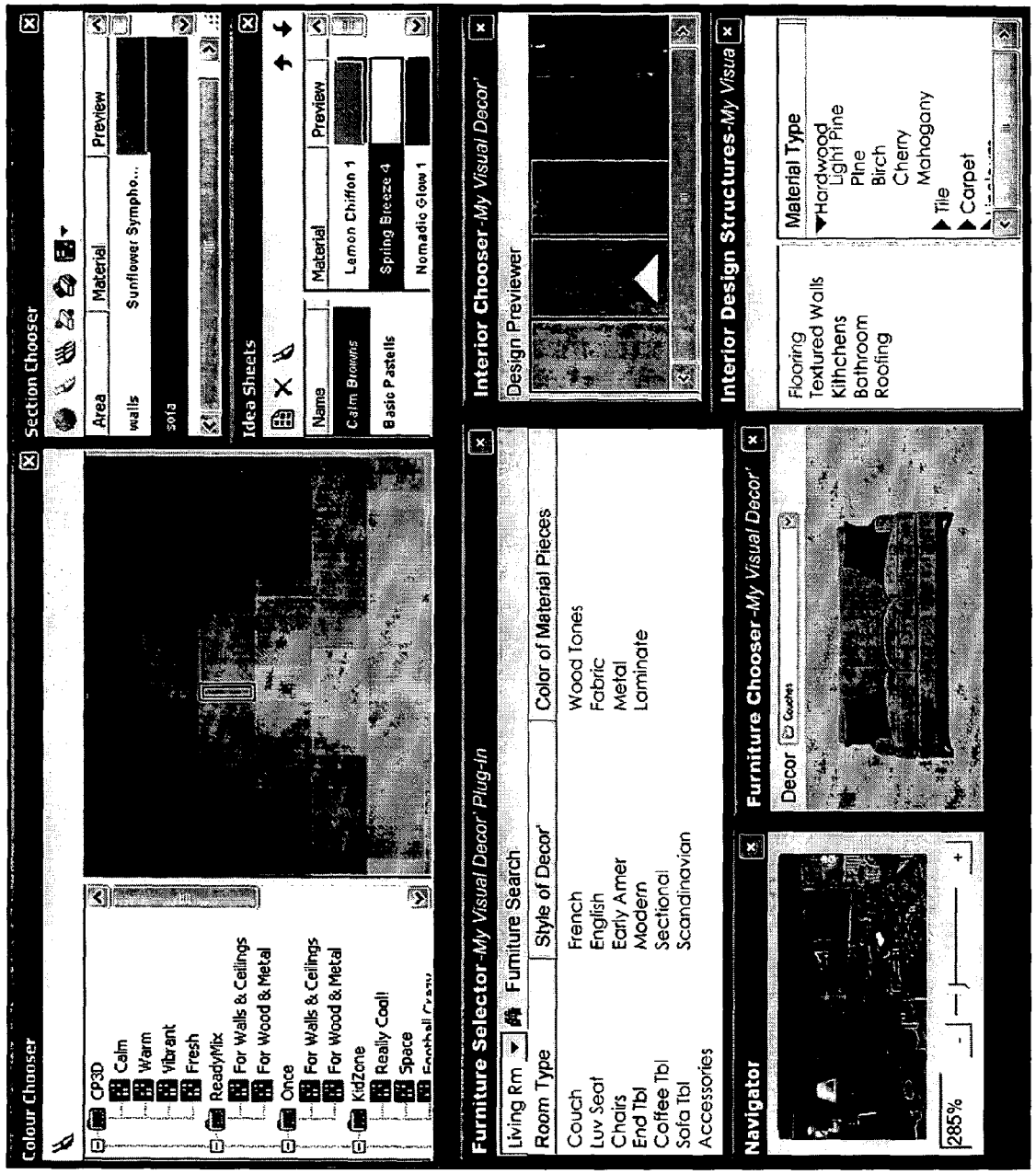
FIG. 60 is the collection of menus in FIG. 59, with the couch selected for incorporation into the room.
Figure 61:
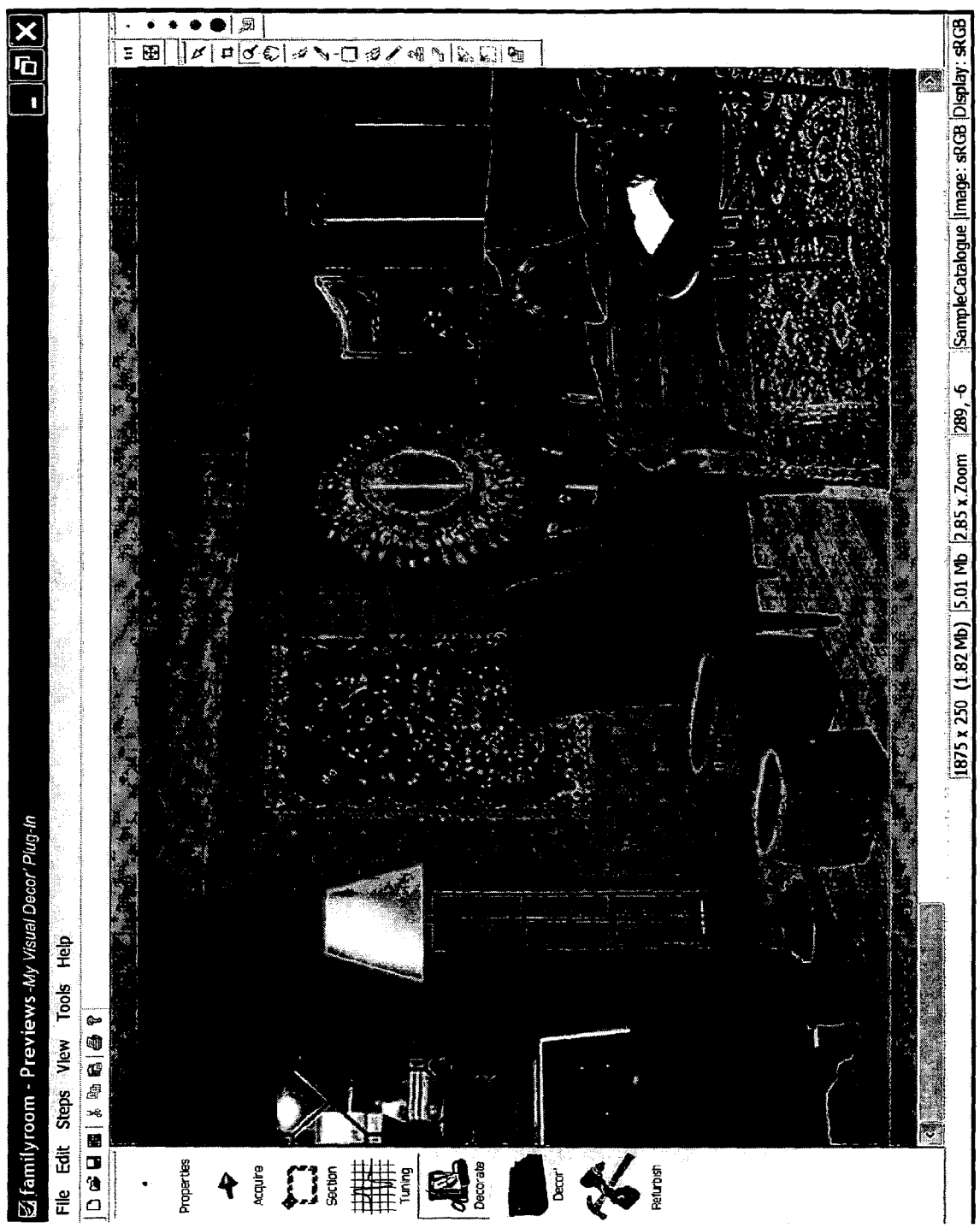
FIG. 61 is the image of FIG. 58 with the newly selected couch of FIG. 60 placed in the place of the previously selected couch.

FIG. 59 shows how a different couch may be inserted in place of the previously shown couch. In the Furniture Choose menu (lower middle) of FIG. 59, the user may simply select a different couch. When a specific couch is selected, the selection fills the Furniture Chooser menu and the other options disappear as shown in FIG. 60. FIG. 61 shows the room with the newly selected couch.

Figure 62:
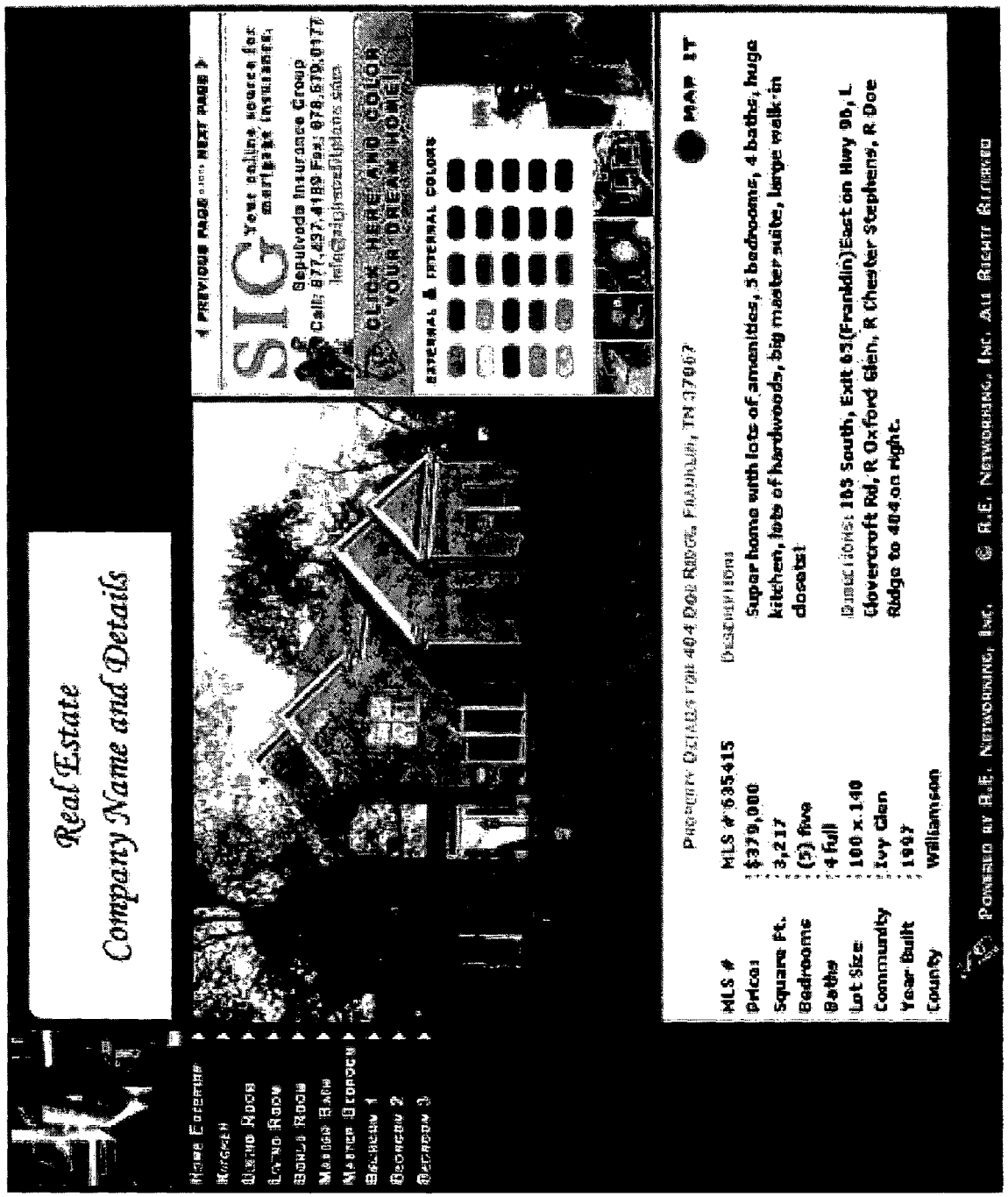
FIG. 62 is an example of a Virtual Tour webpage.

FIG. 62 shows one embodiment of the VIP Virtual Tour. As seen in the left hand column of FIG. 62, the user may select the different areas of the home for viewing. Photos may be static, movable, 360 degrees or otherwise as known in the art. On the page shown in FIG. 62, an insurance company is advertised as discussed. The insurance company, as well with mortgage companies and other real-estate related companies, may be chosen to appear at random from a group of candidates, some of which may have been pre-selected (e.g. one of out N probability as discussed).

Figure 63:
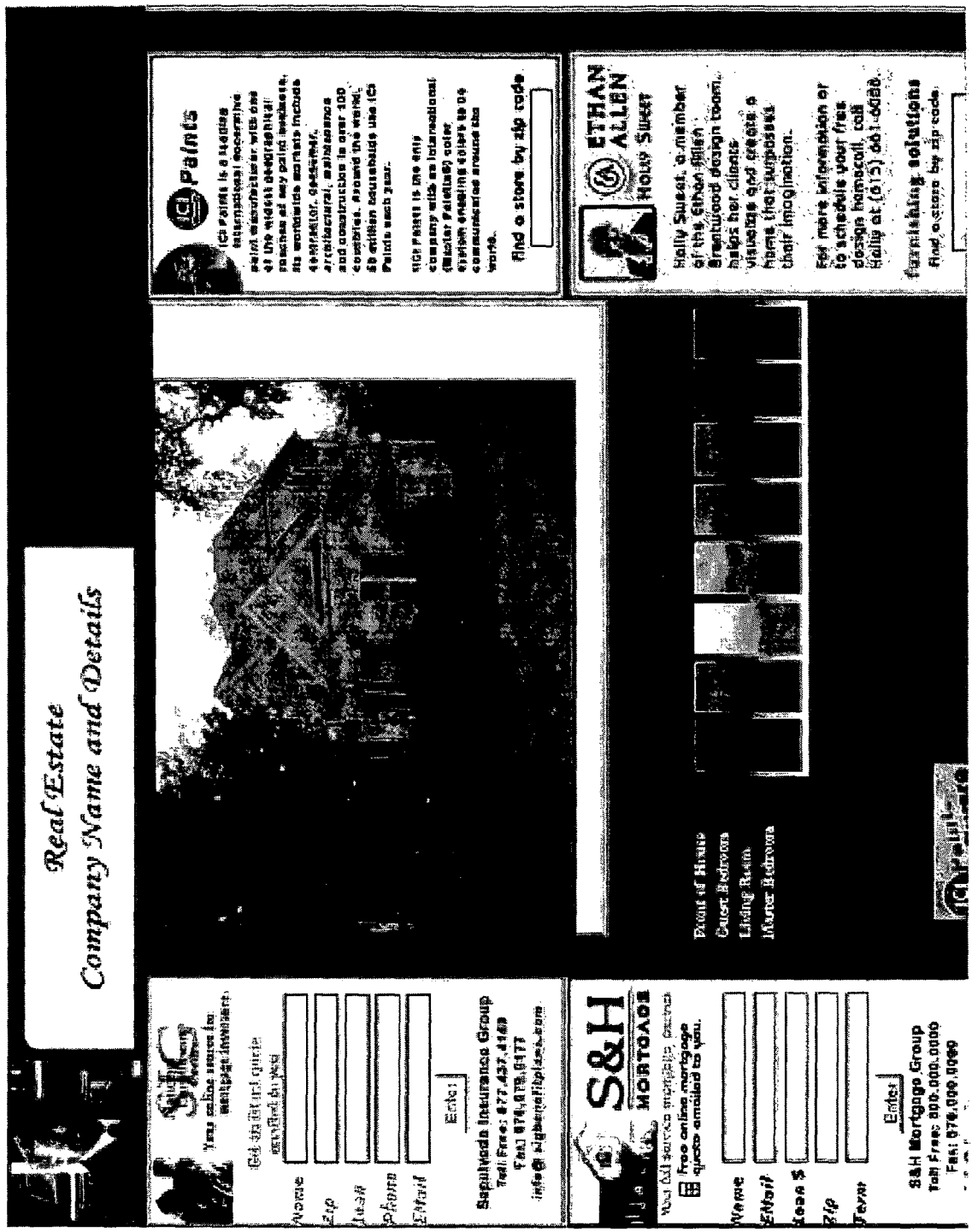
FIG. 63 is an example of a Virtual Tour webpage showing an exterior view of a house and having the Virtual Colorization and Virtual Décor capabilities.

FIG. 63 shows additional embodiments of a Virtual Tour. Here, the Virtual Tour enables Virtual Colorization to allow users to select different colors for the exterior of the featured home. Various advertisers are featured on this webpage. For example, insurance companies and mortgage companies are shown. They may be selected at random as discussed. Furthermore, other real-estate related companies, such as a paint company and a furniture company are featured in the right side of the webpage. FIG. 64 is another example of a Virtual Tour/Virtual Colorization webpage of an interior of a home.

Figure 65:
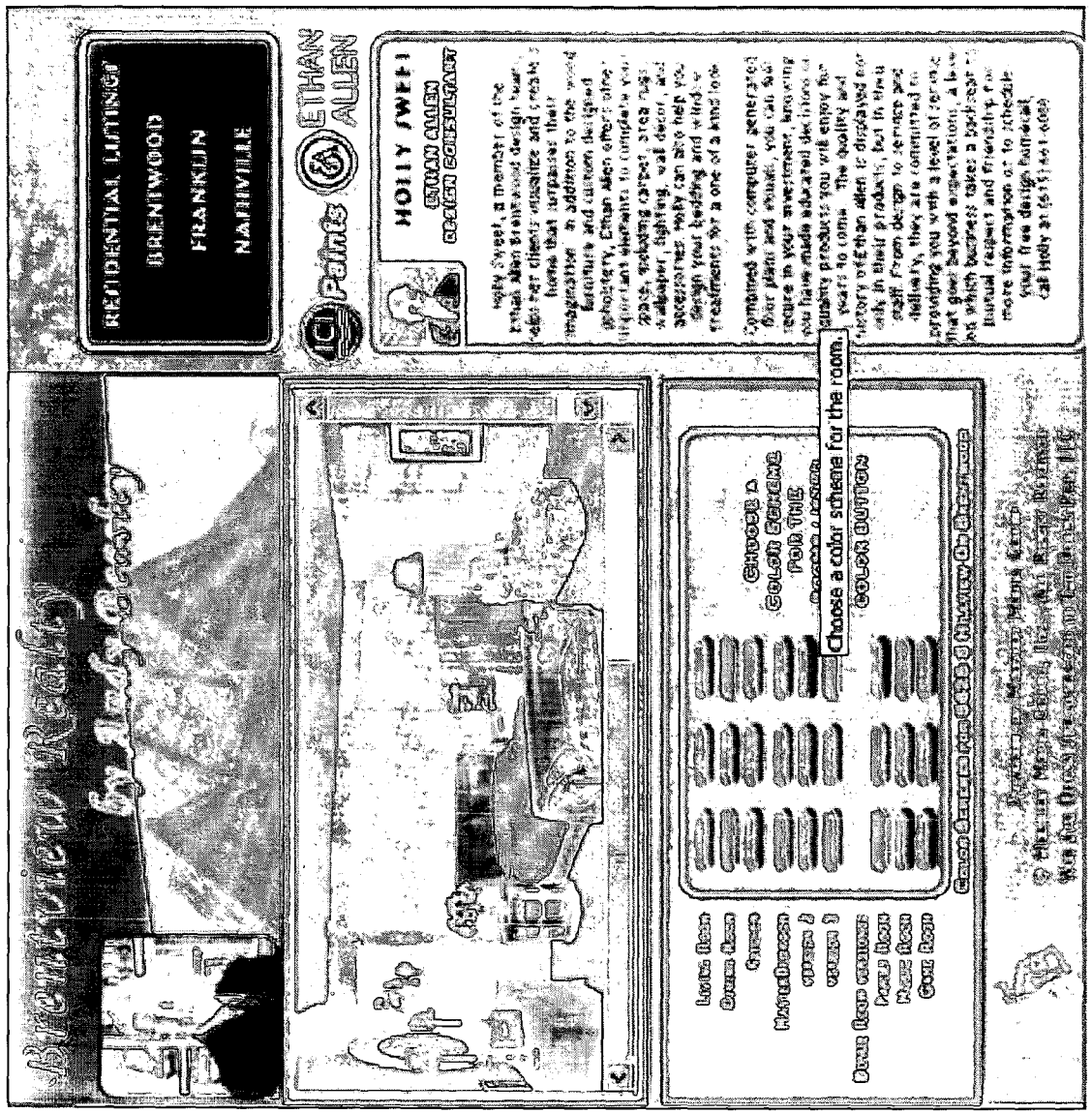
FIG. 65 is an example of a Virtual Tour page showing an image of a room having been designed with Virtual Décor and Virtual Colorization.
Figure 66:
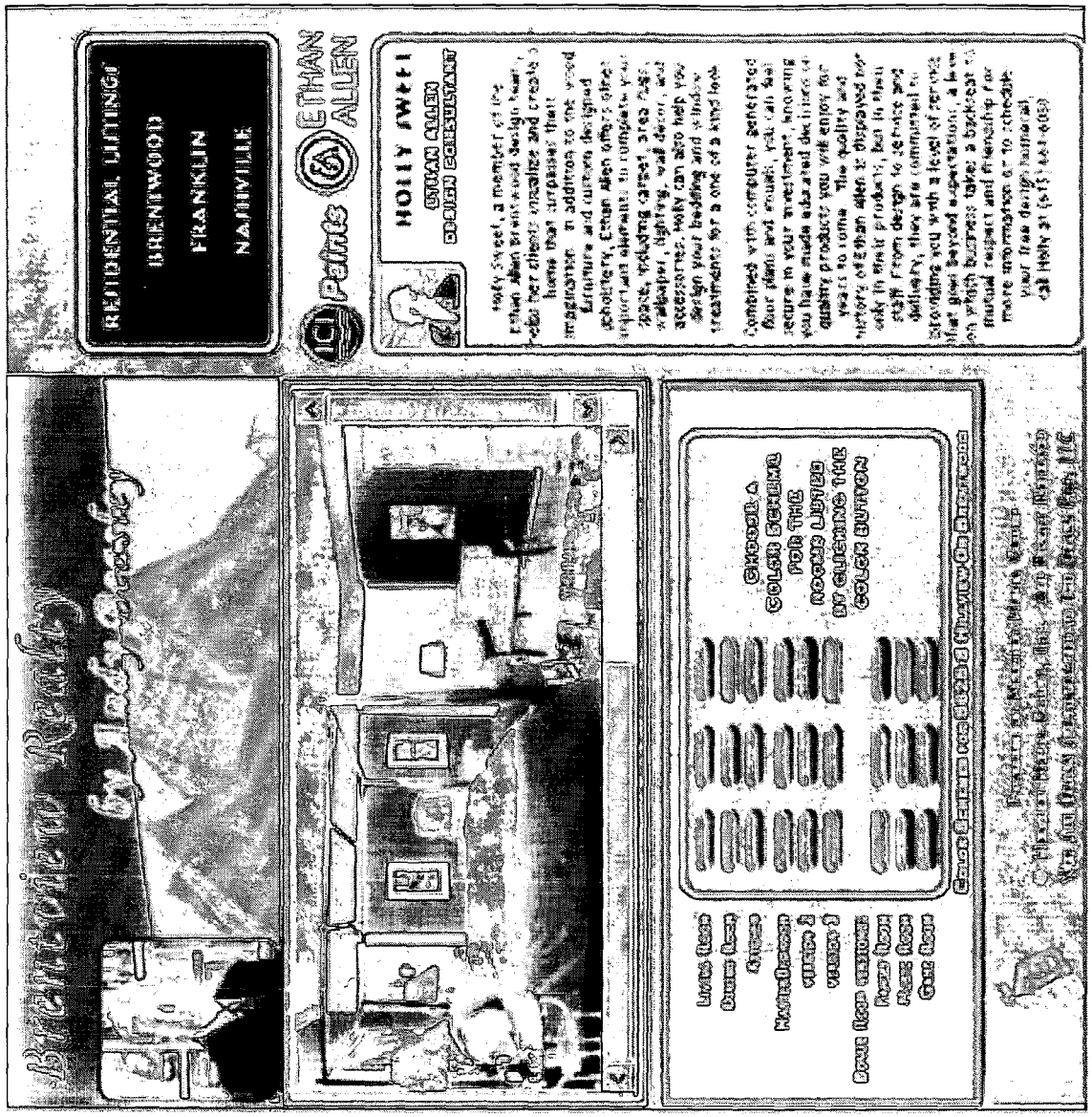
FIG. 66 is the same room shown in FIG. 66, having been designed alternatively using Virtual Décor and Virtual Colorization.

FIGS. 65 and 66 are examples of an interior room that have been decorated differently using the Virtual Décor software and the Virtual Colorization software. The user has modified the color, flooring, fixtures, and/or the furniture of the room as desired.

Although not shown, using the methods discussed above, the Virtual Décor and Virtual Colorization software may modify the exterior of real estate property.

I claim:

1. A real estate, virtual tour computer system for manipulating a photo image of a real estate property comprising:
    a virtual colorization feature for changing the appearance, color, texture, material, or surface of one or more outlined portions of the photo image, wherein the virtual colorization feature further allows outlining all surfaces of real estate architectural elements within the photo image wherein the virtual colorization feature further allows modification of structural elements, architectural elements, or fixtures in the photo image by modifying the outlines of outlined portions; and a virtual decor feature that assigns a three dimensional grid to the photo image by mapping edges of the real estate property and by allowing inputting of a spatial dimension of height, width or depth of the edges; wherein the virtual decor feature further allows insertion and manipulation of an item in the photo image.

2. The virtual tour platform according to claim 1, wherein the virtual colorization feature modifies or replaces the area within one or more outlined portions with a new appearance, color, texture, material or surface.

3. The virtual tour platform according to claim 1, wherein the virtual colorization feature adjusts for the shading and color gradient differences when changing the appearance, color, texture, material or surface of one or more outlined portions of the photo image.

4. The virtual tour platform according to claim 1, wherein the virtual colorization feature is a computer software program.

5. The virtual tour platform according to claim 1, wherein the virtual decor feature allows the inserted item to be moved about within the three dimensional grid.

6. The virtual tour platform according to claim 1, wherein the virtual decor feature allows for pitch and roll modification of the inserted item.

7. The virtual tour platform according to claim 1, wherein the virtual decor feature allows for veiling of the inserted item to make it appear in front or behind other items in the photo image.

8. The virtual tour platform according to claim 1, wherein the virtual decor feature is a computer software program.

9. The virtual tour platform according to claim 1, wherein a separate computer software program is installed on a remote user's computer to allow for manipulation of the photo image on the virtual tour platform.

10. A method of manipulating a photo image of a real estate property in a virtual tour computer system comprising:
    preparing the photo image comprising outlining all surfaces of real estate architectural elements within the photo image;
    changing the appearance, color, texture, material or surface of area within one or more outlines;
    inserting grids to establish a three dimensional spatial orientation by mapping edges of the real estate property and by assigning spatial dimension of height, width or depth to the edges; and
    preparing an image of an item for insertion into the prepared photo image comprising measuring the three dimensional layout of the item; and
    preparing the image to pitch and roll; and
    inserting the prepared image of the item into the prepared photo image;
    positioning the inserted image to its desired location in the prepared photo image; and
    veiling the positioned image of the item.

11. The method according to claim 10, further comprising modifying one or more outlines of the outlined portions.

12. The method according to claim 10, further comprising modifying or changing the area within one or more outlined portions of the photo image with a new appearance color, texture, material or surface.

13. The method according to claim 10, further comprising emptying a room by modifying or changing the area within one or more outlined portions.

14. The method according to claim 10, further comprising modifying structural elements, architectural elements or fixtures by modifying the outlines of said structural elements, architectural elements or fixtures into the photo image.

15. The method according to claim 10, further comprising adjusting for shading or color gradient differences when modifying or changing the appearance, color, texture, material or surface of the area within an outlined portion.

16. The method according to claim 10, further comprising adjusting pitch and roll of the positioned image of the item.

17. The method according to claim 10, further comprising preparing a two-dimensional grid of the floor space of the photo image of the real estate property.

18. The method according to claim 10, further comprising assigning spatial identifiers to areas created by the grids.

19. The method according to claim 10, further comprising preparing multiple images of the item from different views.

20. A method of manipulating a photo image of a real estate property in a virtual tour computer system comprising preparing the photo image comprising outlining various portions of the photo image; changing the colors or surfaces of area within one or more outlines; preparing the outer edges of grids; and inserting grids to establish a three dimensional spatial orientation; and assigning spatial dimension of height, width or depth to the edges of grids; and preparing an image of an item for insertion into the photo image comprising measuring the three dimensional layout of the item; and preparing the image to pitch and roll; and inserting the prepared image of the item into the prepared photo image; positioning the inserted image to its desired location in the prepared photo image; adjusting for the pitch and roll of the positioned image; and veiling the positioned image.

21. A system that allows a prospective real-estate purchaser to view existing real estate over a globally connected computer network comprising:
    a server to store an advertisement for the sale of an existing real estate property including a two-dimensional digital photo of the existing real estate property;
    a software program, installed on a computer system that communicates with the server, comprising the steps of gridding the two-dimensional digital photo by mapping edges of the existing real estate property to a three-dimensional space and by allowing inputting of a spatial dimension of height, width or depth of the edges, whereby a grid is formed, outlining all surfaces of real estate architectural elements within the two-dimensional digital photo; and
    a website, configured to communicate with said server and with web browsers across a globally connected computer network, comprising the steps of assisting modifying at least one aspect of at least one surface of real estate architectural elements within the two-dimensional digital photo, whereby modified real estate architectural surface is formed, displaying, after the step of assisting modifying, the advertisement including a realistic digital image in two dimensions using the perspective of the two-dimensional digital photo and including the modified real estate architectural surface, whereby a modified two-dimensional digital photo is formed.

22. The system of claim 21 wherein:
    the two-dimensional digital photo comprises a photo selected from the group consisting of static, 360 degree, fish-eye, panoramic, and combinations thereof;
    wherein the aspect comprises at least one aspect selected from the group consisting of color, texture, material, and combinations thereof.

23. The system of claim 21 wherein:
    the steps of assisting modifying further comprises the steps of
    presenting a pre-set option-group of aspects,
    wherein the pre-set option-group is selected from the group of aspects consisting of carpeting, flooring, floor coverings, tile, wall paper, paint, rugs, wood, moldings, wall coverings, and combinations thereof.

24. The system of claim 21 further comprising:
a database, operably connected to said server, to store information about an item,
wherein the information comprises a view of the item,
wherein the information comprises spatial dimensions of the item, including depth, height, and width,
wherein the information comprises a point of reference upon the item for indicating appropriate contact with the grid;
wherein said software program further comprises the steps of
    assigning depth, height and width to the grid;
    assisting proportionally positioning the item upon the grid using the information;
wherein the step of displaying further comprises the steps of
    showing the realistic digital image with the view of the item, positioned by using the information within the two-dimensional digital photo using the perspective of the two-dimensional digital photo.

25. The system of claim 24 wherein:
said software program further comprises the step of
veiling the surface to indicate its position on the grid; and
wherein the steps of assisting modifying further comprises
    allowing positioning of the item behind the surface;
        wherein the step of displaying further comprises the step of showing the item behind the surface.

26. The system of claim 24 wherein:
said website further comprises the steps of
allowing uploading of buyer-item images from the prospective real-estate purchaser to said database as an item; and
allowing selecting of the buyer-item during the step of allowing proportionally positioning the buyer-item.

27. The system of claim 24 wherein:
the two-dimensional digital photo comprises a 360 degree view; and
wherein the view of the item comprises three dimensions.

28. The system of claim 24 wherein:
the website further comprises the steps of
    presenting a menu for selecting an item by item type;
    wherein item type includes a room type and color.

29. The system of claim 24 wherein:
the step of assisting proportionally positioning further comprises the step of
    pitching and rolling the item along the grid.

30. The system of claim 24 wherein:
the step of displaying further comprises the steps of
    detecting lighting differences within the realistic digital image; and
    shadowing the realistic digital image.

31. The system of claim 24 wherein:
the step of displaying further comprises the steps of
    detecting color gradient differences within the realistic digital image; and
    adjusting the color gradient of the realistic digital image.

\* \* \* \* \*